US007716060B2

(12) United States Patent
Germeraad et al.

(10) Patent No.: US 7,716,060 B2
(45) Date of Patent: May 11, 2010

(54) PATENT-RELATED TOOLS AND METHODOLOGY FOR USE IN THE MERGER AND ACQUISITION PROCESS

(76) Inventors: Paul B. Germeraad, 14606 Horseshoe Dr., Saratoga, CA (US) 95070; Sheryl A. Heaton, 2509 Buena Vista Ave., Belmont, CA (US) 94002; Luke Hohmann, 306 Windmill Park La., Mountain View, CA (US) 94043; Irving S. Rappaport, 1500 Edgewood Dr., Palo Alto, CA (US) 94303; Kevin G. Rivette, 2165 Waverly St., Palo Alto, CA (US) 94303

( * ) Notice: Subject to any disclaimer, the term of this patent is extended or adjusted under 35 U.S.C. 154(b) by 1316 days.

(21) Appl. No.: 09/790,897

(22) Filed: Feb. 23, 2001

(65) Prior Publication Data

US 2002/0035499 A1 Mar. 21, 2002

Related U.S. Application Data

(63) Continuation-in-part of application No. 09/560,889, filed on Apr. 28, 2000, now abandoned, and a continuation-in-part of application No. 09/545,564, filed on Apr. 7, 2000, now abandoned, and a continuation-in-part of application No. 09/260,079, filed on Mar. 2, 1999, now abandoned.

(51) Int. Cl.
*G06Q 40/00* (2006.01)

(52) U.S. Cl. .................... 705/1; 705/4; 705/36; 702/1; 707/3; 707/100; 715/526

(58) Field of Classification Search ................. 715/526; 707/100, 3; 702/1; 705/36 R, 4, 7, 1
See application file for complete search history.

(56) References Cited

U.S. PATENT DOCUMENTS 4,205,780 A 6/1980 Burns et al.

(Continued)

FOREIGN PATENT DOCUMENTS

EP 0 239 884 A1 10/1987

(Continued)

OTHER PUBLICATIONS

Francis Narin "Tech-Line Backgroun Paper", CHI Research, Inc., Hadden Hieghts, NJ 08035.*

(Continued)

*Primary Examiner*—Harish T Dass
(74) *Attorney, Agent, or Firm*—Sterne, Kessler, Goldstein & Fox P.L.L.C.

(57) ABSTRACT

The present invention is related to patent-related tools, and methodologies involving those tools, for assisting in all stages of the merger and acquisition process. The IPAM server may be used in conjunction with the tools and methodologies to aid in the merger and acquisition process. These tools or methods include, but are not limited to, a topographic map, a technology classification, a SIC classification, a radar diagram, a patent citation tree, a citation root tree, a citation count report, a citation frequency graph, a citation frequency report, a patent count/year, an application count/year, a patent aging graph, a U.S. primary class/subclass, an international patent class, an assignee patent count report by primary class/subclass, a patent count graph by number of patents, a top assignees primary class/subclass by percent of total, a months to issue patents, a features grouping, a document annotation, an inventor patent count/assignee, an inventor patent count graph, and inventor data.

30 Claims, 98 Drawing Sheets

U.S. PATENT DOCUMENTS 4,270,182 A 5/1981 Asija
4,486,857 A 12/1984 Heckel
4,533,910 A 8/1985 Sukonick et al.
4,555,775 A 11/1985 Pike
4,613,946 A 9/1986 Forman
4,622,545 A 11/1986 Atkinson
4,686,590 A 8/1987 Kunii et al.
4,716,476 A 12/1987 Okada et al.
4,719,523 A 1/1988 Kutaragi
RE32,632 E 3/1988 Atkinson
4,736,308 A 4/1988 Heckel
4,748,618 A 5/1988 Brown et al.
4,752,889 A 6/1988 Rappaport et al.
4,772,882 A 9/1988 Mical
4,785,408 A 11/1988 Britton et al.
4,788,538 A 11/1988 Klein et al.
4,812,834 A 3/1989 Wells
4,847,604 A 7/1989 Doyle
4,868,733 A 9/1989 Fujisawa et al.
4,873,623 A 10/1989 Lane et al.
4,884,223 A 11/1989 Ingle et al.
4,899,136 A 2/1990 Beard et al.
4,914,732 A 4/1990 Henderson et al.
4,931,783 A 6/1990 Atkinson
4,935,865 A 6/1990 Rowe et al.
4,939,507 A 7/1990 Beard et al.
4,959,769 A 9/1990 Cooper et al.
4,977,455 A 12/1990 Young
4,985,863 A 1/1991 Fujisawa et al.
4,991,087 A 2/1991 Burkowski et al.
5,008,853 A 4/1991 Bly et al.
5,021,989 A 6/1991 Fujisawa et al.
5,029,013 A 7/1991 Hiratsuka et al.
5,062,060 A 10/1991 Kolnick
5,072,412 A 12/1991 Henderson, Jr. et al.
5,120,944 A 6/1992 Kern et al.
5,142,674 A 8/1992 Barker et al.
5,148,154 A 9/1992 MacKay et al.
5,155,806 A 10/1992 Heober et al.
5,157,768 A 10/1992 Hoeber et al.
5,163,104 A 11/1992 Ghosh et al.
5,179,643 A 1/1993 Homma et al.
5,183,404 A 2/1993 Aldous et al.
5,206,830 A 4/1993 Isobe et al.
5,222,160 A 6/1993 Sakai et al.
5,228,123 A 7/1993 Heckel
5,237,158 A 8/1993 Kern et al.
5,241,671 A 8/1993 Reed et al.
5,251,294 A 10/1993 Abelow
5,253,362 A 10/1993 Nolan et al.
5,276,616 A 1/1994 Kuga et al.
5,283,894 A 2/1994 Deran
5,319,745 A 6/1994 Vinsonneau et al.
5,327,235 A 7/1994 Richards
5,334,030 A 8/1994 Brilliott
5,349,170 A 9/1994 Kern
5,353,059 A 10/1994 Lawlor et al.
5,359,428 A 10/1994 Kubota et al.
5,359,508 A 10/1994 Rossides
5,381,175 A 1/1995 Sudo et al.
5,392,428 A 2/1995 Robins
5,402,336 A 3/1995 Spiegelhoff et al.
5,404,295 A 4/1995 Katz et al.
5,404,514 A 4/1995 Kageneck et al.
5,428,778 A 6/1995 Brookes
5,430,681 A 7/1995 Sugawara et al.
5,432,897 A 7/1995 Tatsumi et al.
5,434,962 A 7/1995 Kyojima et al.
5,440,481 A 8/1995 Kostoff et al.
5,442,778 A 8/1995 Pedersen et al.
5,444,615 A 8/1995 Bennett et al.
5,444,779 A 8/1995 Daniele
5,452,018 A 9/1995 Capitant et al.
5,481,666 A 1/1996 Nguyen et al.
5,511,186 A 4/1996 Carhart et al.
5,519,857 A 5/1996 Kato et al.
5,530,520 A 6/1996 Clearwater
5,537,526 A 7/1996 Anderson et al.
5,540,597 A 7/1996 Budman et al.
5,544,302 A 8/1996 Nguyen
5,544,352 A 8/1996 Egger
5,550,976 A 8/1996 Henderson et al.
5,551,055 A 8/1996 Matheny et al.
5,553,216 A 9/1996 Yoshioka et al.
5,557,722 A 9/1996 DeRose et al.
5,557,785 A 9/1996 Lacquit et al.
5,559,942 A 9/1996 Gough et al.
5,568,639 A 10/1996 Wilcox et al.
5,576,954 A 11/1996 Driscoll
5,581,686 A 12/1996 Koppolu et al.
5,583,982 A 12/1996 Matheny et al.
5,584,035 A 12/1996 Duggan et al.
5,592,607 A 1/1997 Weber et al.
5,592,608 A 1/1997 Weber et al.
5,594,837 A 1/1997 Noyes
5,596,700 A 1/1997 Darnell et al.
5,604,901 A 2/1997 Kelley et al.
5,615,112 A 3/1997 Liu Sheng et al.
5,615,328 A 3/1997 Hadderman et al.
5,615,362 A 3/1997 Jensen et al.
5,619,632 A 4/1997 Lamping et al.
5,623,679 A 4/1997 Rivette et al.
5,623,681 A 4/1997 Rivette et al.
5,628,003 A 5/1997 Fujisawa et al.
5,630,125 A 5/1997 Zellweger
5,632,031 A 5/1997 Velissaropoulos et al.
5,634,012 A 5/1997 Stefik et al.
5,634,051 A 5/1997 Thomson
5,638,519 A 6/1997 Haluska
5,642,502 A 6/1997 Driscoll
5,692,176 A 11/1997 Holt et al.
5,696,963 A 12/1997 Ahn
5,721,910 A 2/1998 Unger et al.
5,732,216 A 3/1998 Logan et al.
5,748,956 A 5/1998 Lafer et al.
5,754,840 A 5/1998 Rivette et al.
5,761,497 A 6/1998 Holt et al.
5,765,152 A 6/1998 Erickson
5,774,833 A 6/1998 Newman
5,787,424 A 7/1998 Hill et al.
5,794,257 A 8/1998 Liu et al.
5,799,325 A 8/1998 Rivette et al.
5,806,079 A 9/1998 Rivette et al.
5,808,615 A 9/1998 Hill et al.
5,809,318 A 9/1998 Rivette et al.
5,826,252 A 10/1998 Wolters, Jr. et al.
5,832,476 A 11/1998 Tada et al.
5,848,409 A 12/1998 Ahn
5,870,770 A 2/1999 Wolfe
5,875,431 A 2/1999 Heckman et al.
5,892,900 A 4/1999 Ginter et al.
5,918,236 A 6/1999 Wical
5,924,090 A 7/1999 Krellenstein
5,933,841 A 8/1999 Schumacher et al.
5,950,214 A 9/1999 Rivette et al.
5,963,941 A 10/1999 Hirakawa
5,990,897 A 11/1999 Hanratty
5,991,751 A 11/1999 Rivette et al.
5,999,907 A 12/1999 Donner
6,003,033 A 12/1999 Amano et al.
6,006,257 A 12/1999 Slezak
6,041,323 A 3/2000 Kubota
6,067,528 A 5/2000 Breed et al.
6,078,913 A 6/2000 Aoki et al.

| | | | | |
|---|---|---|---|---|
| 6,151,595 | A | 11/2000 | Pirolli et al. | |
| 6,169,995 | B1 | 1/2001 | Yoshimura et al. | |
| 6,175,824 | B1 * | 1/2001 | Breitzman et al. | 705/36 R |
| 6,279,014 | B1 | 8/2001 | Schilit et al. | |
| 6,282,545 | B1 | 8/2001 | Coats | |
| 6,339,767 | B1 | 1/2002 | Rivette et al. | |
| 6,389,434 | B1 | 5/2002 | Rivette et al. | |
| 6,393,406 | B1 | 5/2002 | Eder | |
| 6,460,034 | B1 | 10/2002 | Wical | |
| 6,499,026 | B1 | 12/2002 | Rivette et al. | |
| 6,556,992 | B1 | 4/2003 | Barney et al. | |
| 6,581,039 | B2 * | 6/2003 | Marpe et al. | 705/7 |
| 6,963,920 | B1 | 11/2005 | Hohmann et al. | |
| 7,437,471 | B2 | 10/2008 | Hohmann et al. | |
| 7,523,126 | B2 | 4/2009 | Rivette et al. | |
| 2002/0007373 | A1 | 1/2002 | Blair et al. | |
| 2002/0055924 | A1 | 5/2002 | Liming | |
| 2002/0077835 | A1 * | 6/2002 | Hagelin | 705/1 |
| 2002/0082778 | A1 * | 6/2002 | Barnett et al. | 702/1 |
| 2003/0204514 | A1 | 10/2003 | Owens et al. | |
| 2007/0078886 | A1 | 4/2007 | Rivette et al. | |
| 2007/0136116 | A1 | 6/2007 | Germeraad et al. | |
| 2007/0208669 | A1 | 9/2007 | Rivette et al. | |

FOREIGN PATENT DOCUMENTS

| | | | |
|---|---|---|---|
| EP | 0 694 829 | A1 | 1/1996 |
| WO | WO 93/25974 | A1 | 12/1993 |
| WO | WO 94/14122 | A1 | 6/1994 |
| WO | WO 95/00896 | A2 | 1/1995 |
| WO | WO 95/14280 | A1 | 5/1995 |
| WO | WO 98/16890 | A1 | 4/1998 |
| WO | WO 98/55945 | | 12/1998 |
| WO | WO 00/11575 | A1 | 3/2000 |
| WO | WO 00/52618 | A2 | 9/2000 |
| WO | WO 00/60495 | A2 | 10/2000 |
| WO | WO 01/73657 | A1 | 10/2001 |

OTHER PUBLICATIONS

2002 NAICS Matched to 1987 SIC; NAICS Mining; UD Census Bureau.*

Catchings et al., "Retrieval Technologies Inc.: re:Search 2.0," PC Week, v. 8, n. 20, p. 121(2), May 1991.

Jordan, K.A. And Zawilski, A.J., "Specification of a Rapid Prototyping Capability for the Automated Patent System," IEEE, 1990, pp. 76-81.

Liebeherr, J. et al., "The Effect of Index Partitioning Schemes on the Performing of Distributed Query Processing," IEEE Transactions on Knowledge and Data Engineering, vol. 5, No. 3, Jun. 1993, pp. 510-522.

Bobbie, P.O., "Clustering Relations of Large Databases for Parallel Querying," Proceedings of the Twenty-Seventh Annual Hawaii International Conference on System Sciences, 1994, pp. 246-252.

Omiecinski, E. et al., "Performance Analysis of a Concurrent File Reorganization Algorithm for Record Clustering," IEEE Transactions on Knowledge and Data Engineering, vol. 6, No. 2, Apr. 1994, pp. 248-257.

English Abstract for Japanese Patent Publication No. 06-231141, supplied by the Japanese Patent Office, 2 pages.

Lamping, J. et al., "The Hyperbolic Browser: A Focus + Context Technique for Visualizing Large Hierarchies," Journal of Visual Laguage and Computing 7(1): 33-55, Academic Press, London, GB (Mar. 1996).

International Search Report from PCT Appl. No. PCT/US00/05080, 6 pages, mailed Dec. 18, 2000.

International Search Report from PCT Appl. No. PCT/US98/10923, 2 pages, mailed Oct. 19, 1998.

International Search Report from PCT Appl. No. PCT/US99/19050, 1 page, mailed Nov. 19, 1999.

International Search Report from PCT Appl. No. PCT/US01/09584, 1 page, mailed Jun. 8, 2001.

Kevin G. Rivette et al., U.S. Appl. No. 08/341,129, filed Nov. 18, 1994, entitled Method and Apparatus for Synchronizing, Display and Manipulating Text and Image Documents.

Kevin G. Rivette et al., U.S. Appl. No. 09/138,368, filed Aug. 21, 1998, entitled "System, Method, and Computer Program Product for Managing and Analyzing Intellectual Property (IP) Related Transactions."

Kevin G. Rivette et al., U.S. Appl. No. 09/260,079, filed Mar. 2, 1999, entitled "Intellectual Property Asset Manager (IPAM) for Context". Processing of Data Objects.

Paul B. Germeraad, U.S. Appl. No. 09/545,564, filed Apr. 7, 2000, entitled "Patent-Related Tools and Methodology for Use in Research and Development Projects".

Paul B. Germeraad et al., U.S. Appl. No. 09/560,618, filed Apr. 28, 2000, entitled "Patent-Related Tools and Methodology for Use in the Licensing Process".

Paul B. Germeraad, U.S. Appl. No. 09/560,619, filed Apr. 28, 2000, entitled "Patent-Related Tools and Methodology for Use in the General Management of a Business".

Paul B. Germeraad et al., U.S. Appl. No. 09/560,889, filed Apr. 28, 2000, entitled "Patent-Related Tools and Methodology for Use in the Merger & Acquisition Process".

Paul B. Germeraad et al., U.S. Appl. No. 09/564,828, filed May 4, 2000, entitled "Patent-Related Tools and Methodology for Use in the Licensing Process".

Paul B. Germeraad et al., U.S. Appl. No. 09/565,126 filed May 4, 2000, entitled "Patent-Related Tools and Methodology for Use in the General Management of a Business".

Paul B. Germeraad et al., U.S. Appl. No. 10/178,540, Jun. 22, 2002, entitled "Using Hyperbolic Trees to Visualize Data Generated by Patent-Centric and Group-Oriented Data Processing".

Australian Examiner's First Report from Appl. No. 36091/00, mailed May 21, 2003, 2 pages.

Halperin, M.R. et al. "Firm and Industry Characteristics Influencing Publication of Scientists in Large American Companies," R.D. Management 17: 167-173; reprinted online in Essays of an Information Scientist: 1998. Science Literacy, Policy, Evaluation, and Other Essays, vol. 11, location at <http://www.garlield.library.upenn.edu/essays/v11p246y1998.pdf>, last accessed on Jul. 14, 2009, pp. 246-250.

Thoma, Elke et al. "Entwicklungen bei Patentdatenbanken," NfD 46:331-340 (1995). (German language document and English translation).

* cited by examiner

Flowchart of the Stages of the
Merger and Acquisition Process

Reference Guide of Specific Tools

| | | | Merger & Acquisition Phases | | | |
|---|---|---|---|---|---|---|
| | | | 102 Identify Targets | 104 Evaluate, Analyze | 106 Due Diligence | 108 Negotiation |
| | HIGH LEVEL LANDSCAPE | | | | | |
| 202 | Topographic Map ◆ | Overall view of related art, uses | 1 | 1,2,3 | | 2,3 |
| 204 | Technology Classification ◆ | Identifies technologies in company's patent portfolio | 17 | 17 | | |
| 206 | SIC Classification ◆ | Identifies market segments that can use the product/services | | 18 | | |
| 208 | Radar Diagram ◆ | Identifies technology synergy of merger | 26 | 26 | | |
| | CITATION HISTORY | | | | | |
| 210 | Patent Citation Tree ◆ | View of which companies are blocking and/or can circumvent other's patents | | 8a,c | 8a,c | 8a,b,c |
| 212 | Citation Root Tree X | Prediction of related technology/markets under exploration | | 10b | 10a,b | 10a,b |
| 214 | Citation Count Report $ | Identifies frequently cited patents having the most value in the portfolio | | 4 | 4 | |
| 216 | Citation Frequency Graph $ | Identifies companies affected by merger | | 5,9 | 5,9 | |
| 218 | Citation Frequency Report $ | Identifies which patents from which companies have most value | | 6,7 | 6,7 | |
| | VELOCITY AND AGE DISTRIBUTION | | | | | |
| 220 | Patent Count/year ● | Identifies intensity of development in portfolios | | 12a,b,13 | 12a,b,13 | 12a,13 |
| 222 | Application Count/year ● | Identifies level and rate of change in portfolios | | | 14 | 14 |
| 224 | Patent aging graph X | Identifies the number of years to patent expiration | | | 15,16 | 15,16 |
| | DETAIL LANDSCAPE | | | | | |
| 226 | US Primary Class/Subclass ◆ | Determines highest patent count by primary class/subclass | | 19 | 19 | |
| 228 | International Patent Class $ | Determines highest patent count by international class | | 19a | 19a | |
| 230 | Assignee Patent Count Report by Primary Class/Subclass X | Overall view of competitive landscape for both companies by class/subclass | | 20,23,24 | | 20,23 |
| 232 | Patent Count Graph by number of patents X | Overall view of competitive landscape for both companies by number of issued patents | | 24 | | |
| 234 | Top Assignees Primary Class/Subclass by percent of Total $ | Overall view of competitive landscape for both companies by percent of total in class/subclass | | 22,25 | | |
| 236 | Months to Issue - patents X | Is all art at the negotiation table? | | | 11 | 11 |
| 238 | Features Grouping X | Are products/services' features covered? | | 31A | 31 | 31,31A |
| 240 | Document Annotation ● | Immediate, linked, searchable documentation of facts and ideas | | 32 | 32 | 32 |
| | INVENTORS | | | | | |
| 242 | Inventor Patent Count/Assignee ● | Are there JDA/ventures which will impact merger? | | 27,28 | 27,28 | 27,28 |
| 244 | Inventor Patent Count Graph ● | Identifies inventors with most inventions in portfolio | | | 29 | 29 |
| 246 | Inventor Data ● | Identifies average number of inventors per patent | | | 30 | 30 |

| LEGEND | |
|---|---|
| ◆ | Strategic Fit |
| $ | Reward |
| X | Risk |
| ● | Capability |

#8c Patent Citation Tree

This is created by running the citation frequency report for each patent class (technology area) of the company, then taking the most highly cited patent and running the forward citation analysis on it

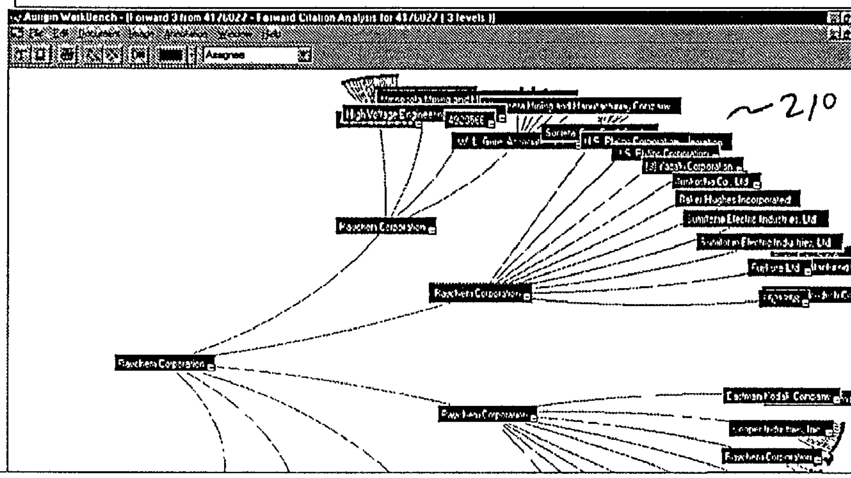

This citation tree shows how unique, mature, expansive, and inner-related the technology is that stems from the patent being evaluated. When dates are put in the nodes it also shows the M&A Analysis team how fast moving the various branches of the tree are growing.

The M&A Analysis team can see at a glance if other companies are focused in a specific effort to work in just one branch of the technology, or are working in many areas. Companies working in many areas will be good candidates for a post-merger assertion and license out analysis. This can generate a cash flow stream to help justify the merger deal. Where cited patents are from either merger company, the nodes of the tree can be color coded or marked with an icon or box shape, so that the M&A team can see at a glance the strength of the combined "picket fence" the merger will create.

FIG. 16

#10b Patent Citation root-tree

For the company's fastest moving technology areas, patents in these areas are analyzed for spill-over technology drift. The map is created by going one citation back, then three forward using the Aureka system. The results are cut and pasted into a PowerPoint slide for visualization.

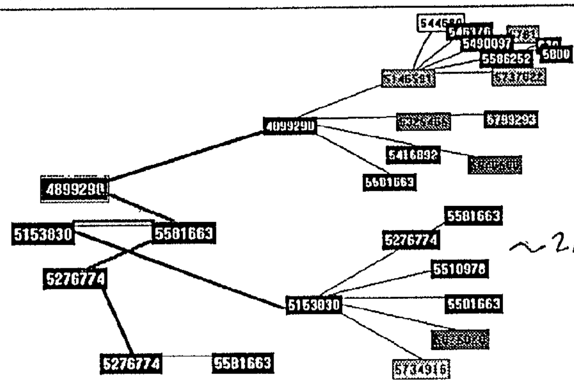

~212

The citation root-tree shows which companies competitive intelligence should do a preliminary investigation for possible infringing products and services. The citation root-tree also shows other companies that might be interested in sub-licensing the art, thus generating extra cash flow and value from the merger.

Implication is that the company acquiring the patent may have an opportunity to sub-license further, and thereby mitigate or influence the value paid for the merger.

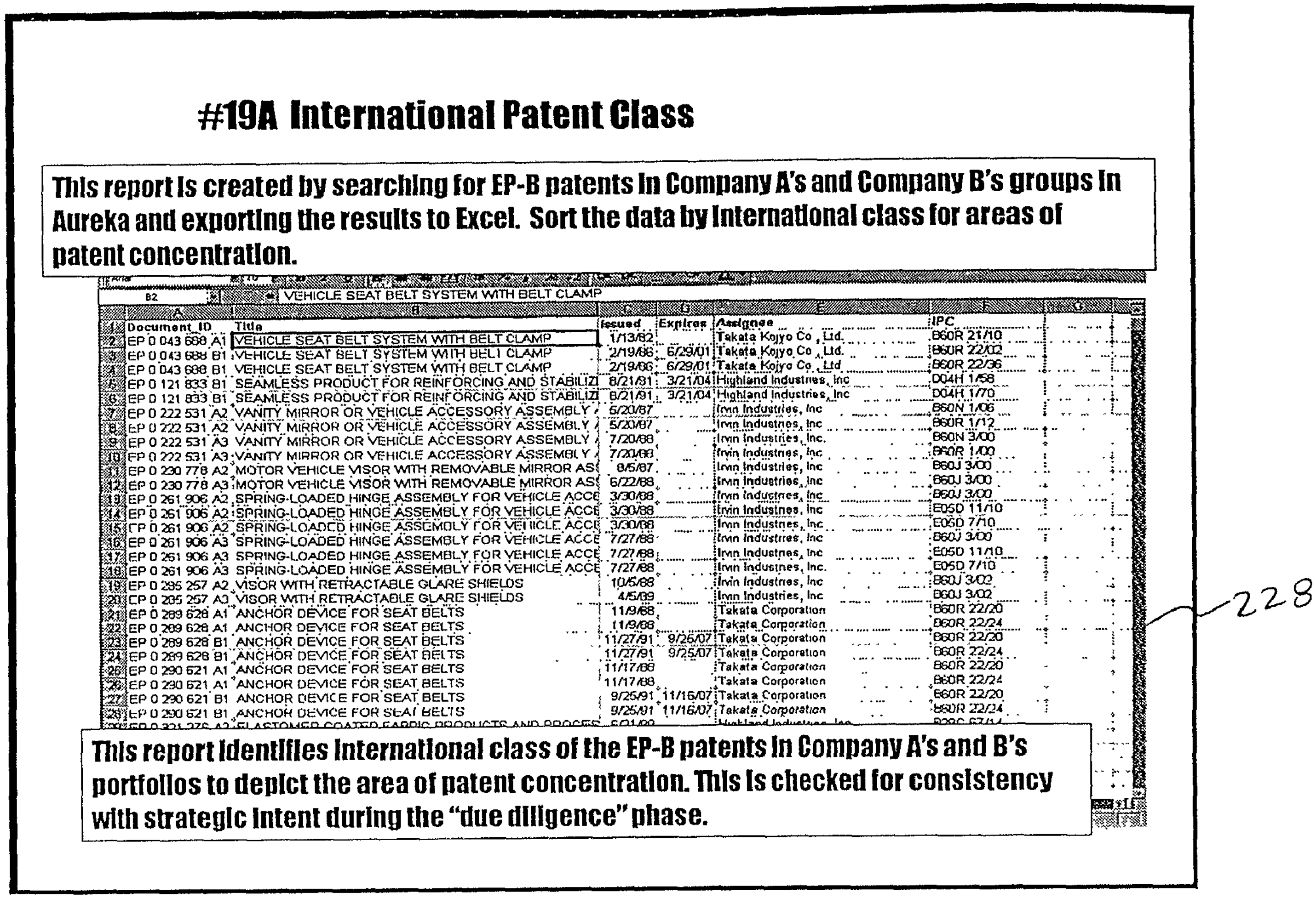

| | Document_ID | Title | Issued | Expires | Assignee | IPC |
|---|---|---|---|---|---|---|
| 2 | EP 0 043 688 A1 | VEHICLE SEAT BELT SYSTEM WITH BELT CLAMP | 1/13/82 | | Takata Kojyo Co., Ltd. | B60R 21/10 |
| 3 | EP 0 043 688 B1 | VEHICLE SEAT BELT SYSTEM WITH BELT CLAMP | 2/19/86 | 6/29/01 | Takata Kojyo Co., Ltd. | B60R 22/02 |
| 4 | EP 0 043 688 B1 | VEHICLE SEAT BELT SYSTEM WITH BELT CLAMP | 2/19/86 | 6/29/01 | Takata Kojyo Co., Ltd | B60R 22/36 |
| 5 | EP 0 121 833 B1 | SEAMLESS PRODUCT FOR REINFORCING AND STABILIZI | 8/21/91 | 3/21/04 | Highland Industries, Inc | D04H 1/58 |
| 6 | EP 0 121 833 B1 | SEAMLESS PRODUCT FOR REINFORCING AND STABILIZI | 8/21/91 | 3/21/04 | Highland Industries, Inc | D04H 1/70 |
| 7 | EP 0 222 531 A2 | VANITY MIRROR OR VEHICLE ACCESSORY ASSEMBLY | 5/20/87 | | Irvin Industries, Inc | B60N 1/06 |
| 8 | EP 0 222 531 A2 | VANITY MIRROR OR VEHICLE ACCESSORY ASSEMBLY | 5/20/87 | | Irvin Industries, Inc | B60R 1/12 |
| 9 | EP 0 222 531 A3 | VANITY MIRROR OR VEHICLE ACCESSORY ASSEMBLY | 7/20/88 | | Irvin Industries, Inc. | B60N 3/00 |
| 10 | EP 0 222 531 A3 | VANITY MIRROR OR VEHICLE ACCESSORY ASSEMBLY | 7/20/88 | | Irvin Industries, Inc | B60R 1/00 |
| 11 | EP 0 230 778 A2 | MOTOR VEHICLE VISOR WITH REMOVABLE MIRROR AS | 8/5/87 | | Irvin Industries, Inc | B60J 3/00 |
| 12 | EP 0 230 778 A3 | MOTOR VEHICLE VISOR WITH REMOVABLE MIRROR AS | 6/22/88 | | Irvin Industries, Inc | B60J 3/00 |
| 13 | EP 0 261 906 A2 | SPRING-LOADED HINGE ASSEMBLY FOR VEHICLE ACCE | 3/30/88 | | Irvin Industries, Inc | B60J 3/00 |
| 14 | EP 0 261 906 A2 | SPRING-LOADED HINGE ASSEMBLY FOR VEHICLE ACCE | 3/30/88 | | Irvin Industries, Inc | E05D 11/10 |
| 15 | EP 0 261 906 A2 | SPRING-LOADED HINGE ASSEMBLY FOR VEHICLE ACCE | 3/30/88 | | Irvin Industries, Inc | E05D 7/10 |
| 16 | EP 0 261 906 A3 | SPRING-LOADED HINGE ASSEMBLY FOR VEHICLE ACCE | 7/27/88 | | Irvin Industries, Inc | B60J 3/00 |
| 17 | EP 0 261 906 A3 | SPRING-LOADED HINGE ASSEMBLY FOR VEHICLE ACCE | 7/27/88 | | Irvin Industries, Inc | E05D 11/10 |
| 18 | EP 0 261 906 A3 | SPRING-LOADED HINGE ASSEMBLY FOR VEHICLE ACCE | 7/27/88 | | Irvin Industries, Inc. | E05D 7/10 |
| 19 | EP 0 295 257 A2 | VISOR WITH RETRACTABLE GLARE SHIELDS | 10/5/88 | | Irvin Industries, Inc | B60J 3/02 |
| 20 | EP 0 295 257 A3 | VISOR WITH RETRACTABLE GLARE SHIELDS | 4/5/89 | | Irvin Industries, Inc | B60J 3/02 |
| 21 | EP 0 289 628 A1 | ANCHOR DEVICE FOR SEAT BELTS | 11/9/88 | | Takata Corporation | B60R 22/20 |
| 22 | EP 0 289 628 A1 | ANCHOR DEVICE FOR SEAT BELTS | 11/9/88 | | Takata Corporation | B60R 22/24 |
| 23 | EP 0 289 628 B1 | ANCHOR DEVICE FOR SEAT BELTS | 11/27/91 | 9/25/07 | Takata Corporation | B60R 22/20 |
| 24 | EP 0 289 628 B1 | ANCHOR DEVICE FOR SEAT BELTS | 11/27/91 | 9/25/07 | Takata Corporation | B60R 22/24 |
| 25 | EP 0 290 621 A1 | ANCHOR DEVICE FOR SEAT BELTS | 11/17/88 | | Takata Corporation | B60R 22/20 |
| 26 | EP 0 290 621 A1 | ANCHOR DEVICE FOR SEAT BELTS | 11/17/88 | | Takata Corporation | B60R 22/24 |
| 27 | EP 0 290 621 B1 | ANCHOR DEVICE FOR SEAT BELTS | 9/25/91 | 11/16/07 | Takata Corporation | B60R 22/20 |
| 28 | EP 0 290 621 B1 | ANCHOR DEVICE FOR SEAT BELTS | 9/25/91 | 11/16/07 | Takata Corporation | B60R 22/24 |

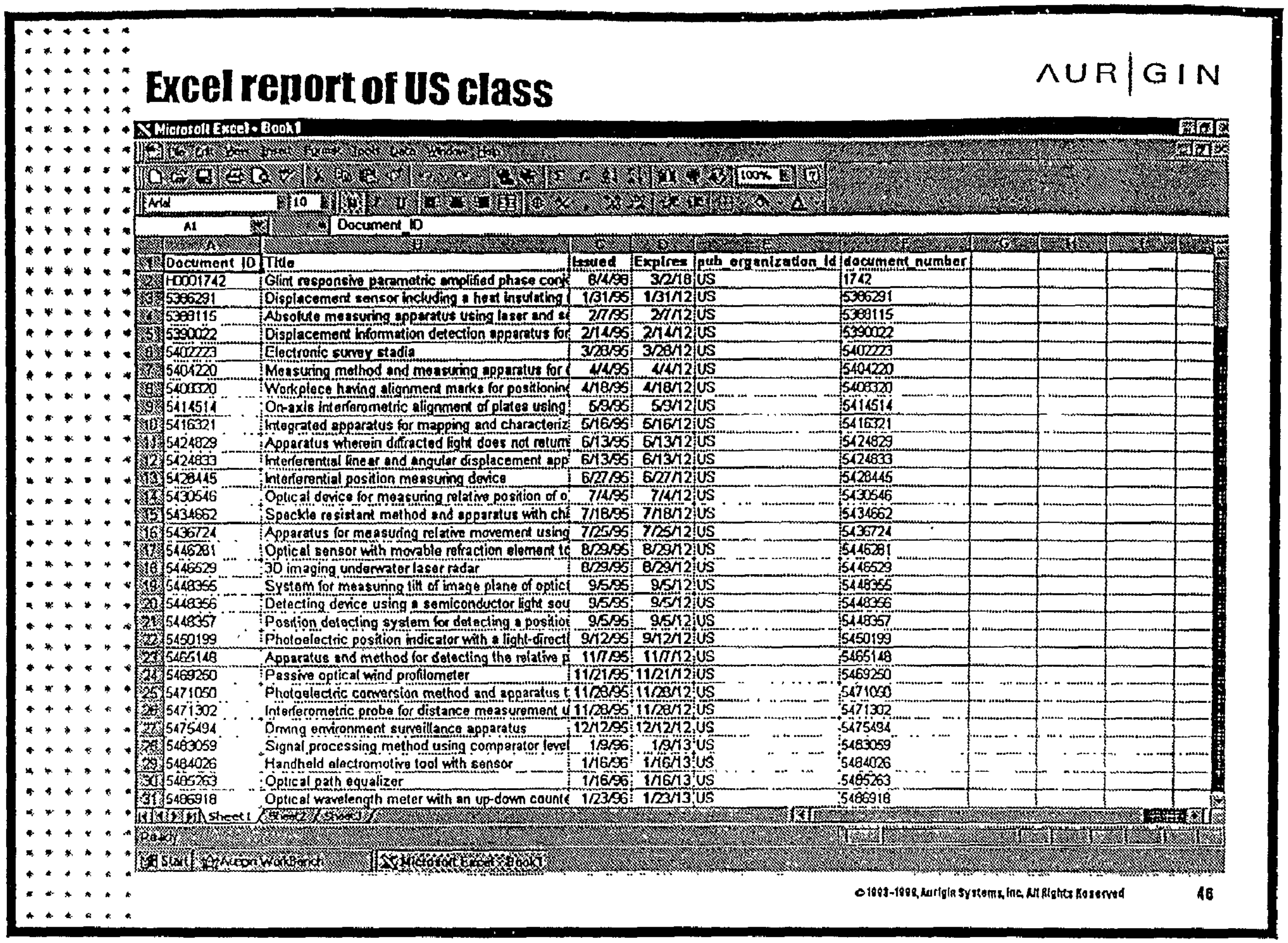

| | Document ID | Title | Issued | Expires | pub organization id | document number |
|---|---|---|---|---|---|---|
| 2 | H0001742 | Glint responsive parametric amplified phase conj | 8/4/98 | 3/2/18 | US | 1742 |
| 3 | 5386291 | Displacement sensor including a heat insulating | 1/31/95 | 1/31/12 | US | 5386291 |
| 4 | 5388115 | Absolute measuring apparatus using laser and s | 2/7/95 | 2/7/12 | US | 5388115 |
| 5 | 5390022 | Displacement information detection apparatus for | 2/14/95 | 2/14/12 | US | 5390022 |
| 6 | 5402223 | Electronic survey stadia | 3/28/95 | 3/28/12 | US | 5402223 |
| 7 | 5404220 | Measuring method and measuring apparatus for | 4/4/95 | 4/4/12 | US | 5404220 |
| 8 | 5408320 | Workplace having alignment marks for positionin | 4/18/95 | 4/18/12 | US | 5408320 |
| 9 | 5414514 | On-axis interferometric alignment of plates using | 5/9/95 | 5/9/12 | US | 5414514 |
| 10 | 5416321 | Integrated apparatus for mapping and characteriz | 5/16/95 | 5/16/12 | US | 5416321 |
| 11 | 5424829 | Apparatus wherein diffracted light does not return | 6/13/95 | 6/13/12 | US | 5424829 |
| 12 | 5424833 | Interferential linear and angular displacement app | 6/13/95 | 6/13/12 | US | 5424833 |
| 13 | 5428445 | Interferential position measuring device | 6/27/95 | 6/27/12 | US | 5428445 |
| 14 | 5430546 | Optical device for measuring relative position of o | 7/4/95 | 7/4/12 | US | 5430546 |
| 15 | 5434662 | Speckle resistant method and apparatus with ch | 7/18/95 | 7/18/12 | US | 5434662 |
| 16 | 5436724 | Apparatus for measuring relative movement using | 7/25/95 | 7/25/12 | US | 5436724 |
| 17 | 5446281 | Optical sensor with movable refraction element t | 8/29/95 | 8/29/12 | US | 5446281 |
| 18 | 5446529 | 3D imaging underwater laser radar | 8/29/95 | 8/29/12 | US | 5446529 |
| 19 | 5448355 | System for measuring tilt of image plane of optic | 9/5/95 | 9/5/12 | US | 5448355 |
| 20 | 5448356 | Detecting device using a semiconductor light sou | 9/5/95 | 9/5/12 | US | 5448356 |
| 21 | 5448357 | Position detecting system for detecting a positio | 9/5/95 | 9/5/12 | US | 5448357 |
| 22 | 5450199 | Photoelectric position indicator with a light-direct | 9/12/95 | 9/12/12 | US | 5450199 |
| 23 | 5465148 | Apparatus and method for detecting the relative p | 11/7/95 | 11/7/12 | US | 5465148 |
| 24 | 5469250 | Passive optical wind profilometer | 11/21/95 | 11/21/12 | US | 5469250 |
| 25 | 5471050 | Photoelectric conversion method and apparatus t | 11/28/95 | 11/28/12 | US | 5471050 |
| 26 | 5471302 | Interferometric probe for distance measurement u | 11/28/95 | 11/28/12 | US | 5471302 |
| 27 | 5475494 | Driving environment surveillance apparatus | 12/12/95 | 12/12/12 | US | 5475494 |
| 28 | 5483059 | Signal processing method using comparator level | 1/9/96 | 1/9/13 | US | 5483059 |
| 29 | 5484026 | Handheld electromotive tool with sensor | 1/16/96 | 1/16/13 | US | 5484026 |
| 30 | 5485263 | Optical path equalizer | 1/16/96 | 1/16/13 | US | 5485263 |
| 31 | 5486918 | Optical wavelength meter with an up-down count | 1/23/96 | 1/23/13 | US | 5486918 |

FIG. 97

PATENT-RELATED TOOLS AND METHODOLOGY FOR USE IN THE MERGER AND ACQUISITION PROCESS

CROSS-REFERENCE TO OTHER APPLICATIONS

The present application is a continuation-in-part application to the following applications:

"Patent-Related Tools and Methodology for Use in Research and Development Projects," invented by Germeraad et. al., application Ser. No. 09/545,564, Filed: Apr. 7, 2000, now pending (incorporated by reference in its entirety);

"Intellectual Property Asset Manager (IPAM) for Context Processing of Data Objects," invented by Rivette et al., application Ser. No. 09/260,079, Filed: Mar. 2, 1999, now pending (incorporated by reference in its entirety); and "Patent-Related Tools and Methodology for Use in the Merger and Acquisition Process," invented by Germeraad et. al., application Ser. No. 09/560,889, Filed: Apr. 28, 2000, now pending (incorporated by reference in its entirety).

The present application is related to the following applications and patents:

"System, Method, and Computer Program Product for Patent-Centric and Group-Oriented Data Processing," invented by Rivette et al., U.S. Pat. No. 5,991,751, issued Nov. 23, 1999 from application Ser. No. 08/867,392; Filed: Jun. 2, 1997 (incorporated by reference in its entirety);

"Using Hyperbolic Trees to Visualize Data Generated by Patent-Centric and Group-Oriented Data Processing," invented by Rivette et al., application Ser. No. 08/921,369; Filed: Aug. 29, 1997, now pending (incorporated by reference in its entirety);

"System, Method, and Computer Program Product for Managing and Analyzing Intellectual Property (IP) Related Transactions," invented by Rivette et al., application Ser. No. 09/138,368; Filed: Aug. 21, 1998, now pending (incorporated by reference in its entirety);

"Method and Apparatus for Synchronizing, Displaying and Manipulating Text and Image Documents," invented by Rivette et al., U.S. Pat. No. 5,623,681, issued Apr. 22, 1997, from application Ser. No. 08/155,572, filed Nov. 19, 1993, issued (incorporated by reference in its entirety);

"System and Method and Computer Program Product for Using Intelligent Notes to Organize, Link, and Manipulate Disparate Data Objects," invented by Rivette et al., U.S. Pat. No. 5,806,079, issued Apr. 17, 1996 from application Ser. No. 08/632,801; Filed: Apr. 17, 1996 (incorporated by reference in its entirety);

"Method and Apparatus for Synchronizing, Displaying and Manipulating Text and Image Documents", invented by Rivette et al., U.S. Pat. No. 5,809,318, issued Sep. 15, 1998 from application Ser. No. 08/832,971; filed Apr. 4, 1997 (incorporated by reference in its entirety);

"System, Method, and Computer Program Product for Accessing a Note Database Having Subnote Information for the Purpose of Manipulating Subnotes Linked to Portions of Documents," invented by Rivette et al., U.S. Pat. No. 5,950,214, issued Sep. 7, 1999 from application Ser. No. 09/058,275; Filed: Apr. 10, 1998 (incorporated by reference in its entirety);

"System and Method for Developing and Maintaining Documents," invented by Rivette et al., U.S. Pat. No. 5,754,840, issued May 19, 1998, from application Ser. No. 08/590,082, filed Jan. 23, 1996 (incorporated by reference in its entirety);

"System, Method, and Computer Program Product for Generating Equivalent Text Files," invented by Rivette et al., U.S. Pat. No. 5,799,325, issued Aug. 25, 1998, from application Ser. No. 08/662,377, filed Jun. 12, 1996 (incorporated by reference in its entirety);

"System, Method, and Computer Program Product for Managing and Analyzing Intellectual Property (IP) Related Transactions," invented by Rivette et al., application Ser. No. 09/138,368; Filed: Aug. 21, 1998, pending (incorporated by reference in its entirety); and "System, Method, and Computer Program Product for Creating Subnotes Linked to Portions of Data Objects After Entering an Annotation Mode," invented by Rivette et al., application Ser. No. 09/057,557; Filed: Apr. 9, 1998, pending (incorporated by reference in its entirety).

BACKGROUND OF THE INVENTION

1. Field of the Invention

The invention is generally directed to methodologies related to the merger and acquisition process, and more particularly directed to patent-related tools and methodologies involving those tools for assisting in all stages of the merger and acquisition process.

2. Related Art

The merger and acquisition process typically goes through a variety of stages before Company A and Company B come to an agreement regarding the merger of the two, or the acquisition of one of the companies. A flowchart, as shown in FIG. 1, is the classic way to look at the merger and acquisition process. FIG. 1 illustrates that the merger and acquisition process may have, but is not limited to, four (4) stages. The four stages include an identify potential targets stage 102, an evaluate/analyze stage 104, a due diligence stage 106 and a negotiation/consummation/integration stage 108 (hereafter "negotiation stage 108").

Prior to Company B even considering a merger and/or acquisition of another company, Company B determines that it needs growth and/or profits. Once this is determined, Company B may decide to consider a merger and/or acquisition of another company to satisfy its desired growth and/or profits. Management of Company B then sets relationship/selection criteria for any merger or acquisition of another company it will consider.

The first stage in the merger and acquisition process is the identify potential targets stage 102. Here, the management of Company B has set the relationship/selection criteria for any merger and/or acquisition of another company it will consider.

The second stage is the evaluate/analyze stage 104. Here, various companies are evaluated and analyzed for Company B to approach for possible mergers and/or acquisitions. The management of Company B will make one or more recommendations of other companies to approach for a merger and/or acquisition.

The next stage is the due diligence stage 106. Here, due diligence is conducted on each of the companies the management of Company B made a recommendation on in the evaluate/analyze stage 104.

The final stage is the negotiation stage 108. In this stage, Company B conducts negotiations and/or consummation and/or integration of one or more companies that passed due diligence in the due diligence stage 106. The outcome of this stage is the possible merger or acquisition of another company that Company A has determined will satisfy its desire for growth and/or profit.

It is possible to facilitate, expedite, and enhance the merger and acquisition process by building upon work that has been performed in the past. However, there are little if any automated tools for assisting in this process. There are even less automated tools that utilize patent-related tools for assisting in the merger and acquisition process.

SUMMARY OF THE INVENTION

The present invention is related to patent-related tools, and methodologies involving those tools, for assisting in the merger and acquisition process. In the present invention, the IPAM server may be used in conjunction with the tools and methodologies to aid in the merger and acquisition process. These tools or methods include, but are not limited to, a topographic map, a technology classification, a SIC classification, a radar diagram, a patent citation tree, a citation root tree, a citation count report, a citation frequency graph, a citation frequency report, a patent count/year, an application count/year, a patent aging graph, a U.S. primary class/subclass, an international patent class, an assignee patent count report by primary class/subclass, a patent count graph by number of patents, a top assignees primary class/subclass by percent of total, a months to issue patents, a features grouping, a document annotation, an inventor patent count/assignee, an inventor patent count graph, and an inventor data.

Further features and advantages of the invention, as well as the structure and operation of various embodiments of the invention, are described in detail below with reference to the accompanying drawings. The drawing in which an element first appears is typically indicated by the leftmost character(s) and/or digit(s) in the corresponding reference number.

BRIEF DESCRIPTION OF THE FIGURES

The present invention will be described with reference to the accompanying drawings, wherein:

FIG. 2 is an overview of the general management tools of the present invention that map to each stage in the merger and acquisition process according to an embodiment of the present invention;

FIG. 16 illustrates the patent citation tree facilitating the evaluate/analyze, due diligence and negotiation stages according to an embodiment of the present invention;

FIG. 19 illustrates the citation root tree facilitating the evaluate/analyze, due diligence and negotiation stages according to an embodiment of the present invention;

FIG. 40 illustrates the international patent class facilitating the evaluate/analyze and due diligence stages according to an embodiment of the present invention;

FIGS. 86-97 are exemplary screen shots of the user interface of the IPAM server to assist the user company in searches relating to U.S. Patent Classifications according to an embodiment of the present invention.

DETAILED DESCRIPTION OF THE PREFERRED EMBODIMENTS

Figure 1:
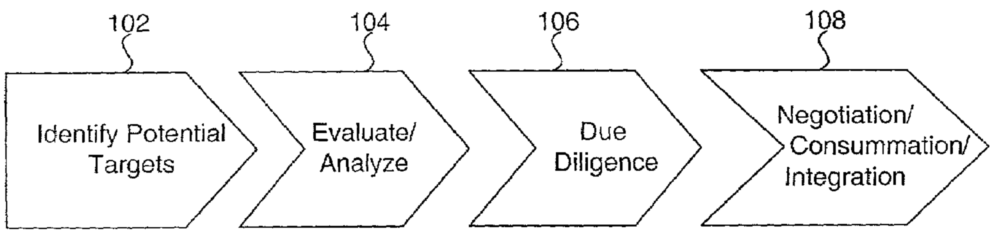
FIG. 1 illustrates a flowchart relating to the stages of the merger and acquisition process according to an embodiment of the present invention.
Figure 98:
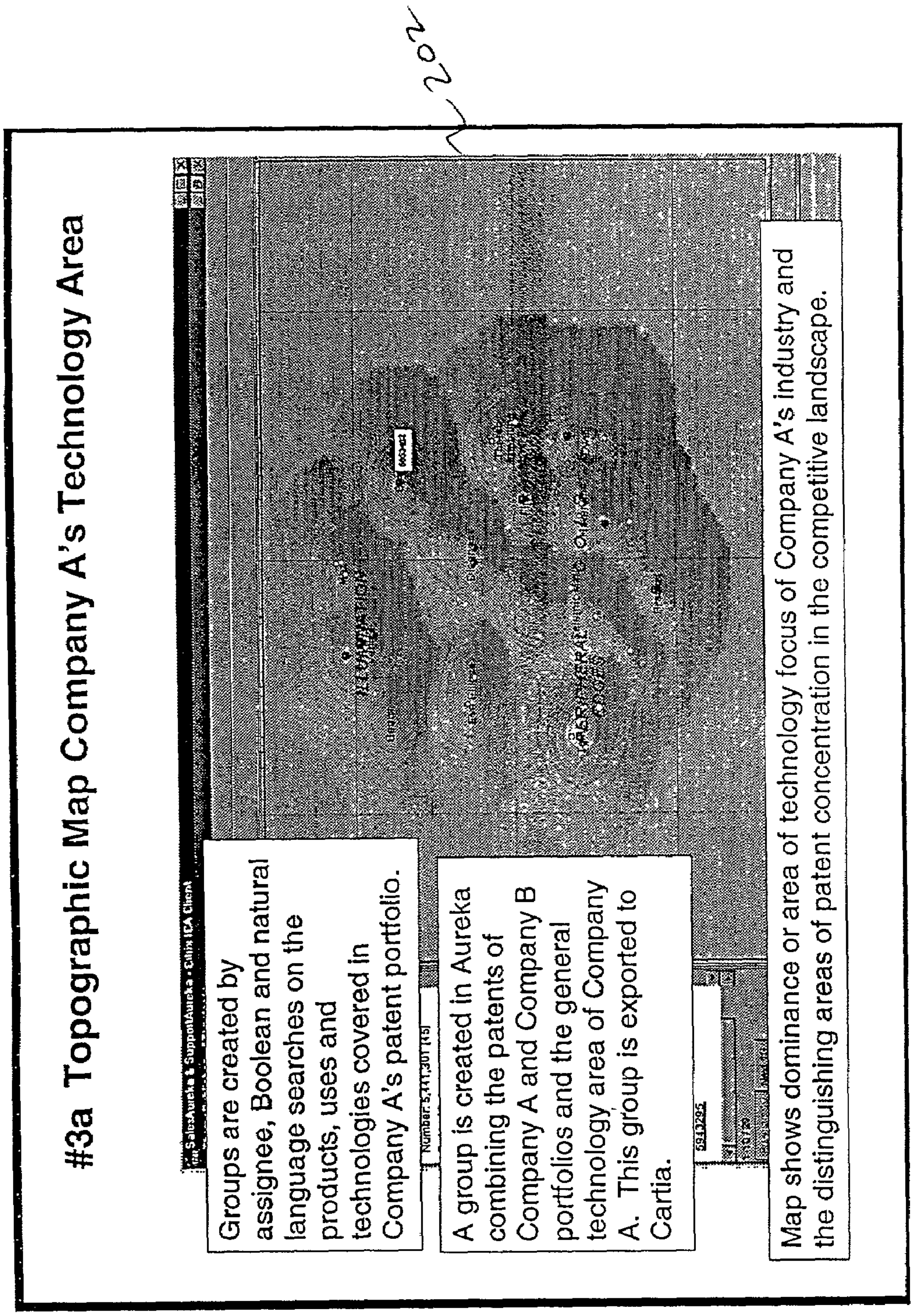
FIG. 98 illustrates the topographic map facilitating the identify targets, evaluate/analyze and negotiation stages according to an embodiment of the present invention.

The present invention is related to patent-related tools, and methodologies involving those tools, for assisting in all stages of the merger and acquisition process. FIGS. 1-98 illustrate features of embodiments of the present invention. The patents and pending U.S. applications cited above describe systems and methods for achieving the functions, functionality, reports, etc., represented in FIGS. 1-98. Understanding of other methodologies represented in FIGS. 1-98 (and variations and extensions thereof) will be apparent to persons skilled in the relevant art(s) based on the teachings contained herein, and the teachings contained in the patents and pending U.S. applications cited above.

The present invention provides patent-related tools and methodologies for the merger and acquisition process. This may be accomplished through an Intellectual Property Asset Management (IPAM) server, which is described in detail in the patent and applications referenced above in the section entitled "Cross-Reference to Other Patents and Applications." The functionality of the present invention that is described herein as being performed by the IPAM server, is not limited to being performed by the IPAM server. For example, tools such as Excel spreadsheets, the IBM patent server, the USPTO public server, and Manning and Napier's search tools can all be used to perform some or most of the steps of the described methodologies. It is important to note that the exact platform used to perform the methodologies herein is not critical.

The IPAM server may be used in conjunction with the tools to aid in the merger and acquisition process. For convenience, the IPAM server will briefly be discussed herein, although the invention is not limited to this brief description.

Briefly stated, the IPAM server deals with context data processing. The IPAM server may be used to define and select one or more contexts. Each context includes one or more attributes, and a plurality of data objects that satisfy the attributes. A list of data objects contained in the selected contexts may be displayed. At least some of the data objects in the selected contexts may be processed. Such processing may involve generating hierarchical and/or directed acyclic graph data structures to represent relationships among the data objects. These data structures can then be displayed in a variety of well-known techniques including, but not limited to, hyperbolic trees. Examples of such hierarchical or directed acyclic graph structures include claim trees, citation trees, and data object families, which may be displayed using hyperbolic trees.

In an embodiment, the contexts are groups. In another embodiment, the contexts are each associated with a data object type. In this latter embodiment, the contexts include data objects of their respective data object types.

The IPAM server also supports the generation of annotations. The IPAM server supports a plurality of annotation types, including document annotations, group annotations, data object type annotations, case annotations, and enterprise annotations. The IPAM server also supports form-based annotations.

In an embodiment, the IPAM server has a plug-in manager coupled thereto. Also included may be at least one plug-in coupled to the plug-in manager, and at least one external data processing component coupled to the plug-in. In an embodiment, the external data processing component displays data using at least graphs. In another embodiment, the external data processing component displays data using at least maps. The plug-in manager has a first application programming interface (API), and each external data processing component has a second API. The plug-in translates messages from the plug-in manager to the external data processing component to a format conforming to the second API, and translates messages from the external data processing component to the plug-in manager to a format conforming to the first API.

Embodiments of the IPAM server can process, display, and otherwise operate with patent equivalent text files (EQV) (or other types of files or data) to aid in the merger and acquisition process in different stages, although the invention is not limited to this embodiment. Patent equivalent text files are described in U.S. Pat. No. 5,623,681, which is herein incorporated by reference in its entirety. A patent equivalent text file includes equivalency information that establishes an equivalency relationship between the text in the patent equivalent text file and the image in the patent image file. For example, this equivalency information may include pagination information that enables the patent equivalent text file to be displayed having the same pagination (line breaks, column breaks, page breaks) as the patent image file. In an embodiment, a pagination module generates the patent equivalent text file by comparing the patent text in the patent text file with the patent image file to detect equivalency information. This equivalency information is then embedded in the patent equivalent text file, along with the patent text. While the pagination module is capable of performing the pagination operation automatically, in some cases some manual intervention is required. In accordance, an operator is sometimes involved with the pagination process performed by the pagination module.

In the present invention, the IPAM server may be used in conjunction with the tools and methodologies to aid in the merger and acquisition process. FIG. 2 is an example overview of the tools that map to each stage in the merger and acquisition process (FIG. 1). The mapping provided in FIG. 2 is presented for illustration purposes only. Other uses and applications of the invention will be apparent based on the teachings contained herein. These tools or methods include (when they are incorporated with IPAM server), but are not limited to, a topographic map 202, a technology classification 204, a SIC classification 206, a radar diagram 208, a patent citation tree 210, a citation root tree 212, a citation count report 214, a citation frequency graph 216, a citation frequency report 218, a patent count/year 220, an application count/year 222, a patent aging graph 224, a U.S. primary class/subclass 226, an international patent class 228, an assignee patent count report by primary class/subclass 230, a patent count graph by number of patents 232, a top assignees primary class/subclass by percent of total 234, a months to issue patents 236, a features grouping 238, a document annotation 240, an inventor patent count/assignee 242, an inventor patent count graph 244, and inventor data 246.

FIG. 2 also shows a legend 201. The legend 201 indicates what each tool is most useful for in the merger and acquisition process. The four uses include: strategic fit (indicated by a diamond), reward (indicated by a dollar sign), risk (indicted by an hour glass) and capability (indicated by a solid circle). FIG. 2 shows that the tools most useful to determine strategic fit include the topographic map 202, the technology classification 204, the SIC classification 206, the radar diagram 208, the patent citation tree 210 and the U.S. primary class/subclass 226. The tools most useful to determine reward include the citation count report 214, the citation frequency graph 216, the citation frequency report 218, the international patent class 228 and the top assignees primary class/subclass by percent of total 234. The tools most useful to determine risk include the citation root tree 212, the patent aging graph 224, the assignee patent count report by primary class/subclass 230, the patent count graph by number of patents 232, the months to issue patents 236 and the features grouping 238. Finally, the tools most useful to determine capability include the patent count/year 220, the application count/year 222, the document annotation 240, the inventor patent count/assignee 242, the inventor patent count graph 244 and the inventor data 246. The tools or methods of the present invention are not limited to its respective use mentioned above. Why each of these tool/methods are most useful for its respective use will be apparent as the tools/method are described below.

The following describes each tool or method and how it may be combined with the IPAM server to aid in the merger and acquisition process. As each of these tools or methods are described below, an exemplary graphical presentation may be used. It should be noted that the particular exemplary graphical presentation used is for convenience purposes only and the invention is not limited to that particular graphical presentation. For example, a bar chart can be also implemented as a pie chart, radar or spider charts, two or three dimensional graphs, etc., and vice versa.

At times the present invention relates to a portfolio. Although the present invention is described with reference to a patent portfolio, the present invention is not limited to patents. In fact, the present invention applies to any item that another party may take a license for, including trademarks, software programs, know-how (e.g., trade secrets) and so forth.

The same tool may be used in different ways to facilitate different stages in the merger and acquisition process. Other uses of tools will be apparent to persons skilled in the relevant art(s) based on the teachings contained herein.

I. IPAM SERVER AND THE TOPOGRAPHIC MAP

Figure 3:
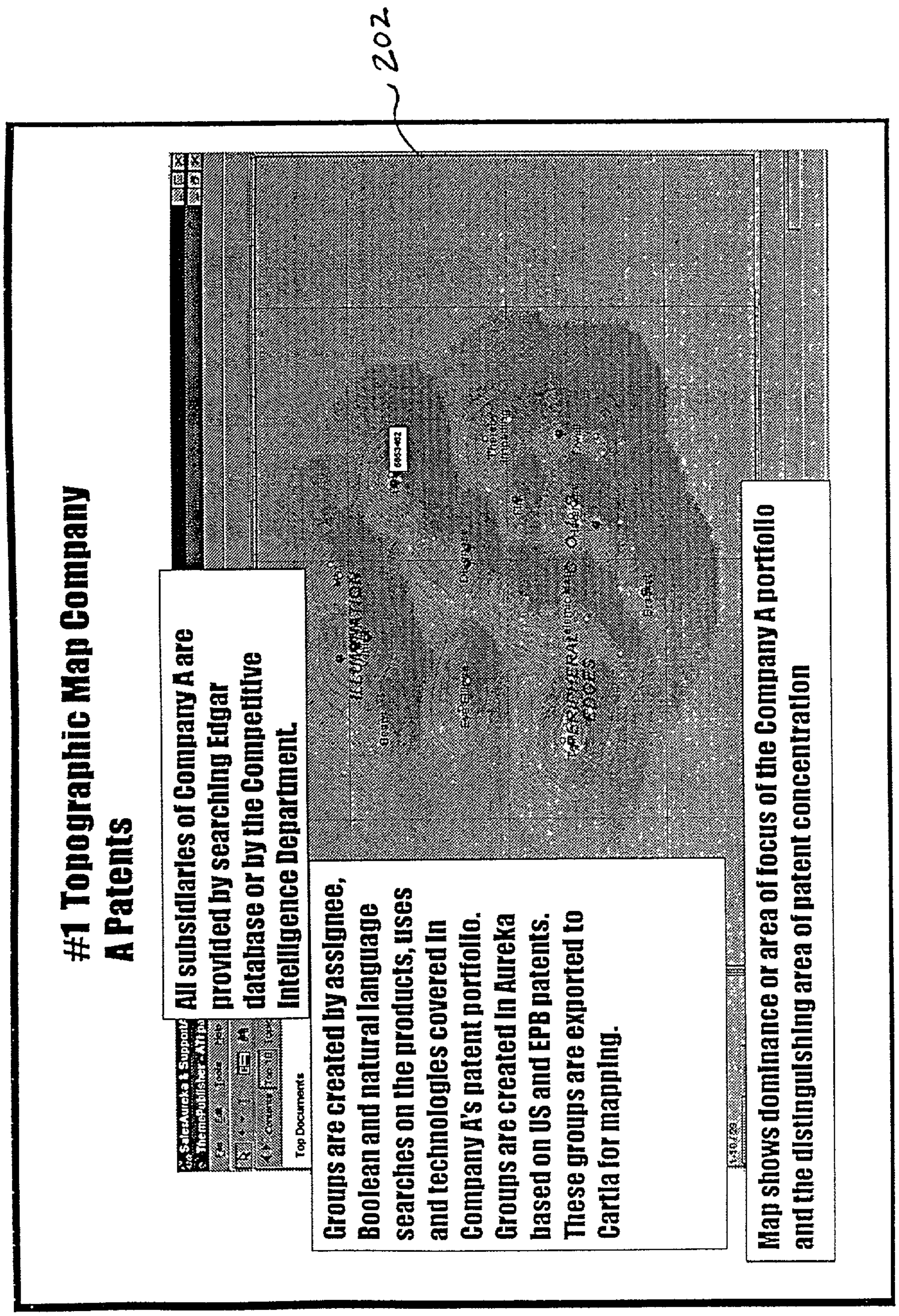
FIG. 3 illustrates the topographic map facilitating the identify targets and the evaluate/analyze stages according to an embodiment of the present invention.

Referring to FIG. 2, the IPAM server incorporates the topographic map 202 to facilitate the identify potential targets stage 102 (as Tool 1), the evaluate/analyze stage 104 (as Tools 1, 2, 3 and 3*a*), and the negotiation stage 108 (as Tools 2, 3 and 3*a*). How the IPAM server and topographic maps are incorporated together to produce contour maps is described in detail in the commonly owned patent application, Intellectual Property Asset Manager (IPAM) for Context Processing of Data Objects, invented by Rivette et al., application Ser. No. 09/260,079, filed: Mar. 2, 1999, now pending (incorporated by reference in its entirety). FIG. 3 illustrates the topographic map 202 facilitating the identify potential targets stage 102 and the evaluate/analyze stage 104 as Tool 1, entitled "Topographic Map Company A Patents."

A. Tool 1 and the Identify Targets Stage and the Evaluate/Analyze Stage

In FIG. 3, the topographic map 202 as Tool 1 is shown. The purpose of Tool 1 in the identify potential targets stage 102 and the evaluate/analyze stage 104 is to use the topographic map 202 to show dominance or area of focus of Company A's portfolio and the distinguishing area of patent concentration. In an embodiment of the present invention, all subsidiaries of Company A are provided by searching the Edgar database or by the competitive intelligence department.

In one embodiment of the present invention, Tool 1 uses Cartia's ThemeScape to create the topographic map 202 and thus create conceptual visualizations of dominance or area of focus. The x-y plane shows related concepts in relative proximity. In the z-axis, forming mountains and valleys, is the frequency of concepts represented in the patent group. How the IPAM server works in conjunction with the topographic map 202 to aid in the identify potential targets stage 102 and the evaluate/analyze stage 104 is described next with reference to FIG. 4. Typically, Tool 1 is initiated by the user selecting a topographic map function on the computer screen.

Figure 4:
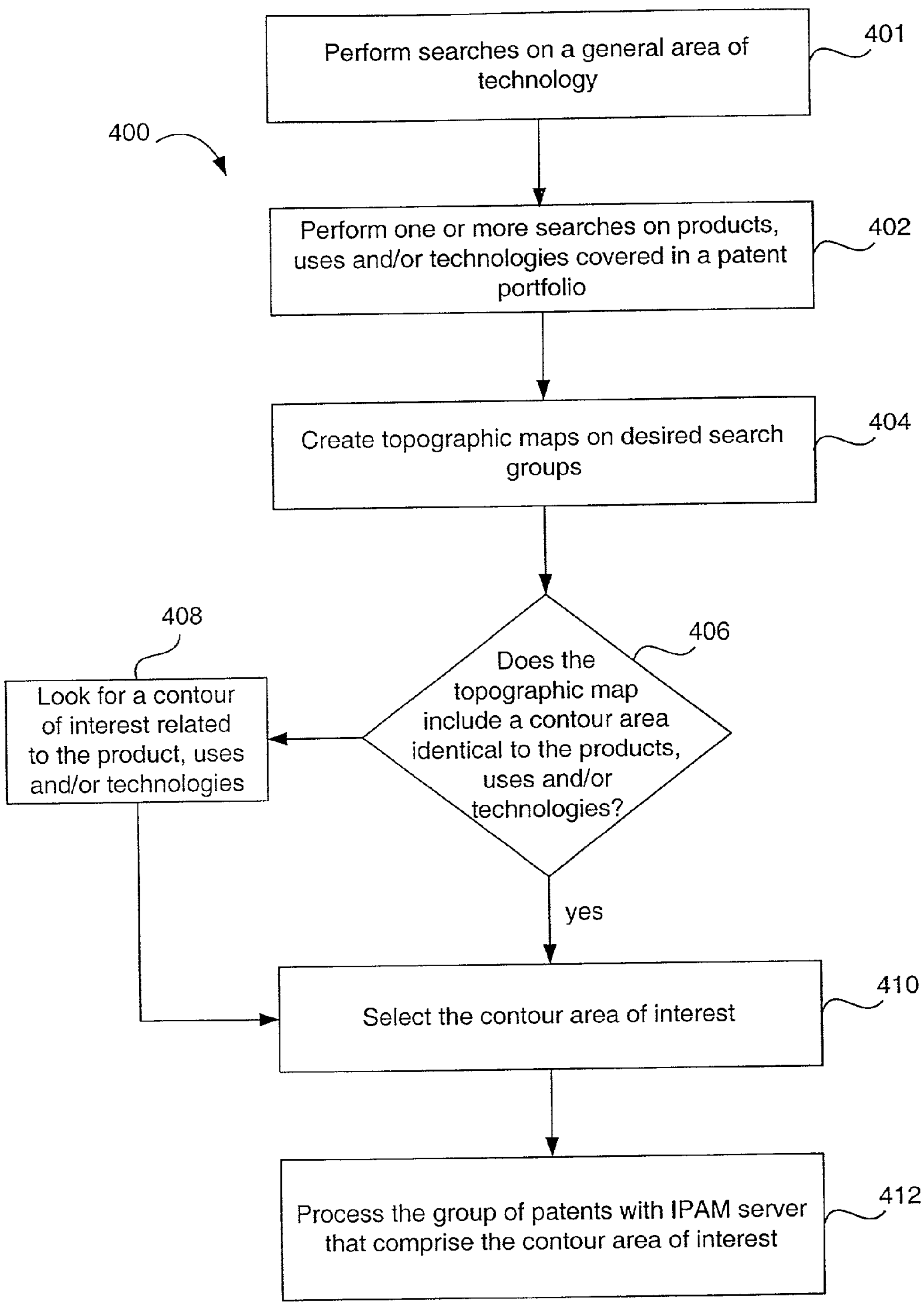
FIG. 4 is a flowchart depicting how the IPAM server works in conjunction with the topographic map to aid in the identify targets and the evaluate/analyze stages according to an embodiment of the present invention.

In FIG. 4, a flowchart 400 begins at step 401. In step 401, searches are performed on a general area of technology. Control then passes to step 402.

In step 402, in an embodiment of the present invention a user performs one or more searches on U.S. patents portfolio to identify products, uses and technologies covered in Company A's patent portfolio. Here, because the user is just pointing at a broad field, the abstract of each patent is typically the section that is searched, but is not limited to this. The present invention is not limited to doing the search on U.S. patents (this is also true for all of the searches discussed herein). Here, the search performed is typically, but is not limited to, a boolean and/or natural language search on the product, use and/or technology to produce a group of patents that identify products, uses and/or technologies covered in Company A's patent portfolio. The user interface of the IPAM server is described in detail in the patent and applications referenced above in the section entitled "Cross-Reference to Other Patents and Applications." For illustration, FIGS. 64-67 each show an exemplary screen shot of the IPAM server's user interface relating to the boolean and/or natural language search described herein. The present invention is not limited to these exemplary screen shots. Control then passes to step 404.

In step 404, the IPAM server is used to produce one or more of topographic map 202 (on desired search groups) having a map with contours and labels indicating areas related to the products, uses and/or technologies searched in step 402. Here, the group of patents produced in step 402 is further divided into subgroups, with each subgroup relating to a different product, use and/or technology. Typically, this is done by the user selecting a topographic map function on the computer screen. The topographic map 202 produced by Tool 1 (FIG. 3) shows the pattern of subjects of all of the patents produced in step 402 (e.g., shows products, uses and/or technologies covered by Company A's patent portfolio). Labels on the topographic map 202 indicate the products, uses and/or technologies, and the contours indicate how many U.S. patents exist for each subgroup area. The topographic map 202 shows dominance or areas people are focusing on. Control then passes to step 406.

In step 406, the user company studies the topographic map 202 produced by Tool 1 and determines whether the exact area of the product, use and/or technology is included in the topographic map 202. If the outcome to step 406 is positive, then control passes to step 410. Alternatively, control passes to step 408.

In step 408, an area related to the product, use and/or technology was not included in the topographic map 202. Here, the user can determine if another area that is shown in the topographic map 202 is worth further exploration. Control then passes to step 410.

In step 410, the user selects the contour (or label) of interest in the topographic map 202. This is typically done by the user "clicking" on the contour of interest. Control then passes to step 412.

In step 412, the IPAM server processes the subgroup of U.S. patents that are included in the contour of interest indicated by the user in step 410. Again, topographic map 202 is displayed with contours, but this time the topographic map 202 is more specific to exactly the user's contour (or area) of interest. Now, the topographic map 202 shows the different types of products, uses and/or technologies that are in the contour of interest. At this point, the user may use the IPAM server as described in detail in the applications and patents referenced above in the section entitled "Cross-Reference to Other Patents and Applications." Here, flowchart 400 ends.

B. Tool 2 and the Evaluate/Analyze Stage and the Negotiation Stage

Figure 5:
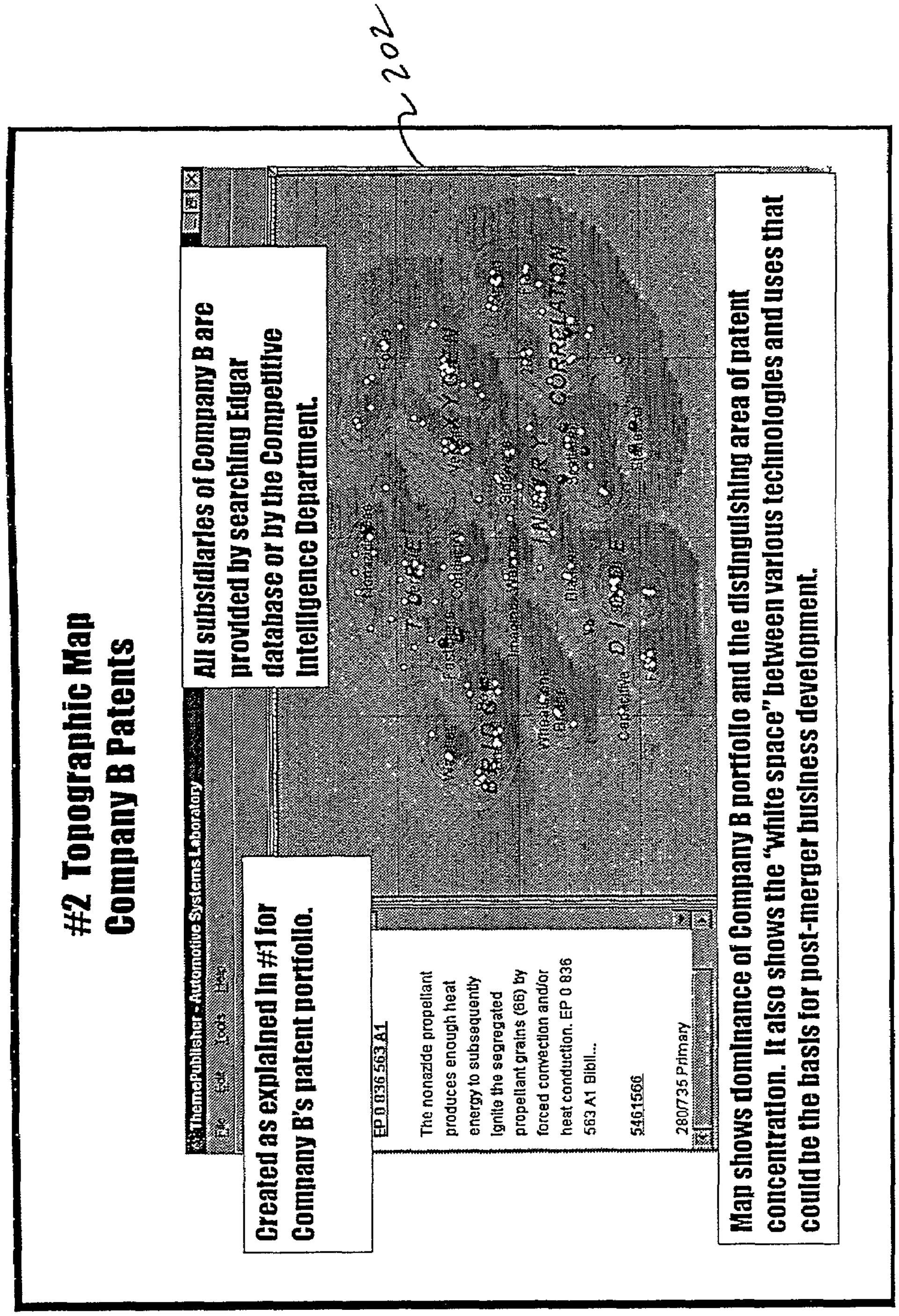
FIG. 5 illustrates the topographic map facilitating the evaluate/analyze and the negotiation stages according to an embodiment of the present invention.

In FIG. 5 the topographic map 202 as Tool 2 is shown. The purpose of Tool 2 in the evaluate/analyze stage 104 and the negotiation stage 108 is to use the topographic map 202 to show dominance of Company B's portfolio and the distinguishing area of patent concentration. It also shows the "white space" between various technologies and uses that could be the basis of post-merger business development. In an embodiment of the present invention, all subsidiaries of Company B are provided by searching the Edgar database or by the competitive intelligence department. How the IPAM server works in conjunction with the Tool 2 is similar to Tool 1, as described above with reference to FIG. 4.

C. Tool 3 and the Evaluate/Analyze Stage and the Negotiation Stage

Figure 6:
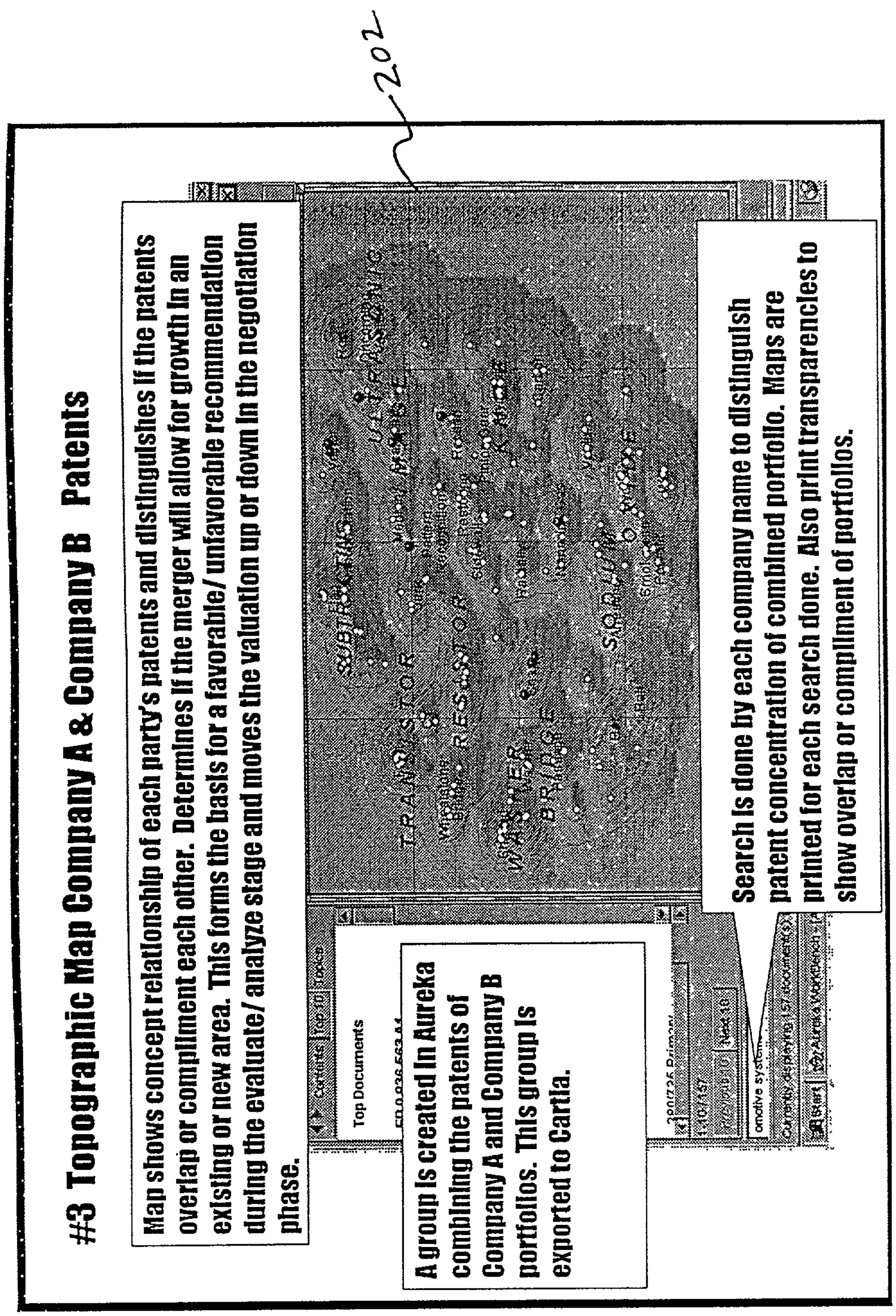
FIG. 6 illustrates the topographic map facilitating the evaluate/analyze and the negotiation stages according to an embodiment of the present invention.

In FIG. 6, the topographic map 202 as Tool 3 is shown. The purpose of Tool 2 in the evaluate/analyze stage 104 and the negotiation stage 108 is to use the topographic map 202 to show concept relationship of each party's (Company A's and Company B's) patents, and distinguishes if the patents overlap or compliment each other. Tool 3 determines if the merger will allow for growth in an existing or new area. This forms the basis for a favorable/unfavorable recommendation during the evaluate/analyze stage 104 and moves the valuation up or down in the negotiation stage 108. How the IPAM server works in conjunction with Tool 3 is similar to Tool 1, as described above with reference to FIG. 4. Here, the search is done by each company name to distinguish patent concentration of combined portfolio, maps are printed for each search done, and transparencies are printed to show overlap or compliment of portfolios. The search is performed to produce patents of both Company A and Company B.

D. Tool 3*a* and the Evaluate/Analyze Stage and the Negotiation Stage

In FIG. 98, the topographic map 202 as Tool 3*a* is shown. The purpose of Tool 3*a* in the evaluate/analyze stage 104 and the negotiation stage 108 is to use the topographic map 202 to show dominance or area of technology focus of Company A's industry and the distinguishing areas of patent concentration in the competitive landscape. How the IPAM server works in conjunction with Tool 3*a* is similar to Tool 1, as described above with reference to FIG. 4.

II. IPAM SERVER AND TECHNOLOGY CLASSIFICATION

Referring to FIG. 2, the IPAM server works in conjunction with the technology classification 204 to facilitate the identify potential targets stage 102 and the evaluate/analyze stage 104 as Tool 17. In general, the technology classification 204 identifies technologies in a company's patent portfolio.

Figure 7:
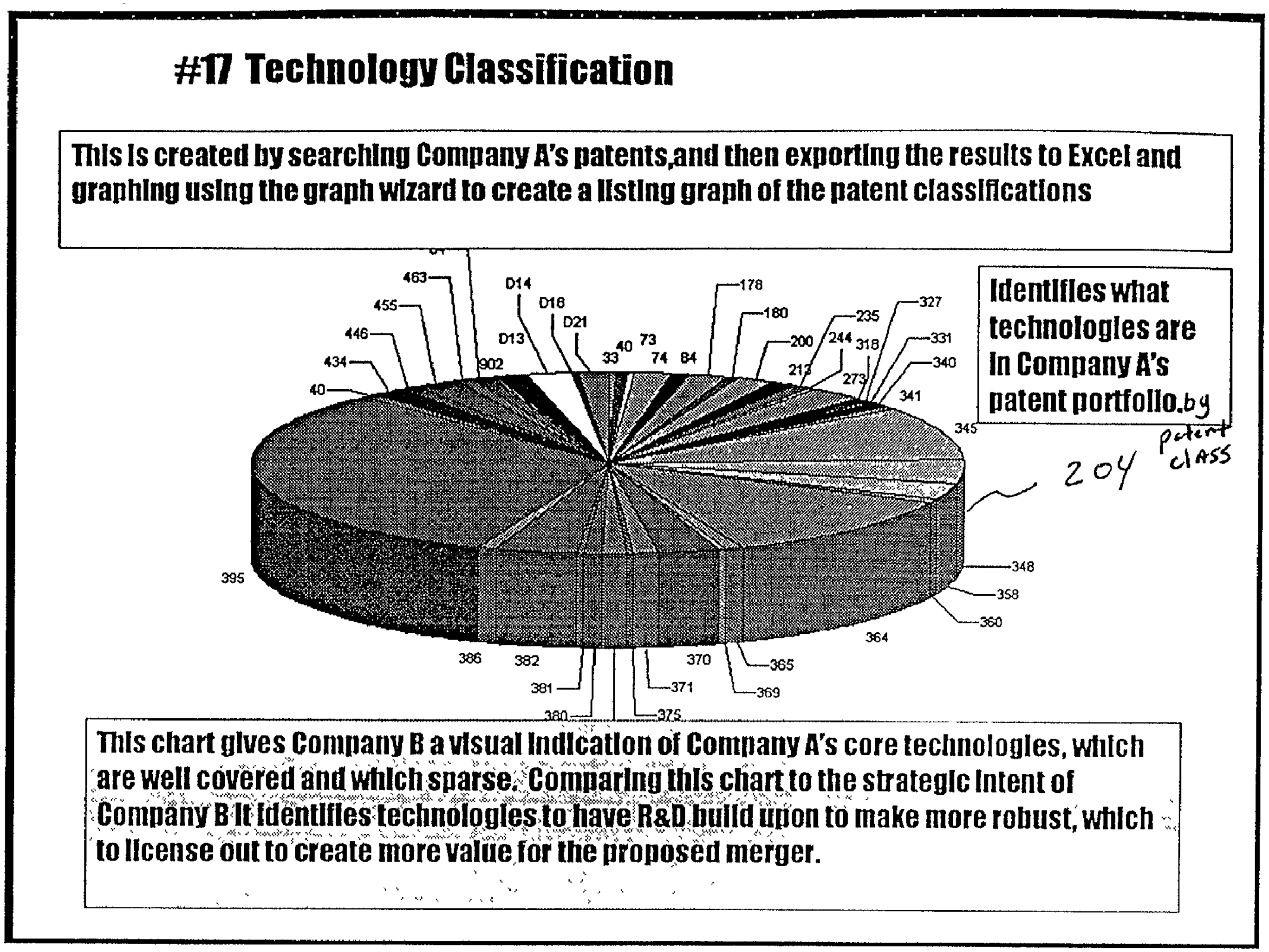
FIG. 7 illustrates the technology classification facilitating the identify targets and the evaluate/analyze stages according to an embodiment of the present invention.

FIG. 7 illustrates the technology classification 204 facilitating the identify potential targets stage 102 and the evaluate/analyze stage 104 as Tool 17, entitled "Technology Classification." The purpose of Tool 17 in the identify potential targets stage 102 and the evaluate/analyze stage 104 is to give Company B a visual indication of Company A's core technologies by patent class, indicating which are well covered and which are sparse. Comparing this chart to the strategic intent of Company B, it identifies technologies to have the research and development department build upon to make more robust, and which technologies to license out to create more value for the proposed merger. How the IPAM server works in conjunction with the technology classification 204 to aid in the identify potential targets stage 102 and the evaluate/analyze stage 104 is described next with reference to FIG. 8. Typically, Tool 17 is initiated by the user selecting an assignee and a technology classification function on the computer screen.

Figure 8:
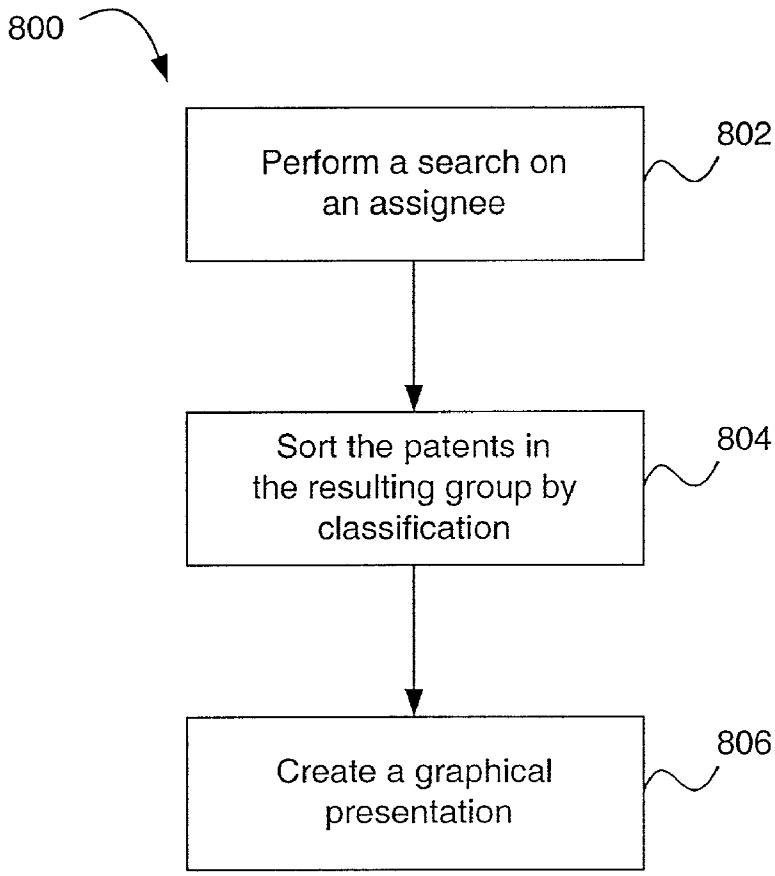
FIG. 8 is a flowchart depicting how IPAM server works in conjunction with the technology classification to aid in the identify targets and the evaluate/analyze stages according to an embodiment of the present invention.

In FIG. 8, a flowchart 800 begins at step 802. In step 802, in an embodiment of the present invention a user performs a search on the group of all Company A's patents. Here, because the user is just pointing at a broad field, the abstract of each patent is typically the section that is searched, but is not limited to this. Here, the search performed is typically a boolean and/or natural language search on the assignee to produce a group of patents. Control passes to step 804.

In step 804, the IPAM server takes the group of patents produced in step 802 and further divides it into subgroups, with each subgroup having the same technology classification. When the search in step 802 is on the group of U.S. patents, the classification used is the U.S. Patent Classification designated by the U.S. Patent and Trademark Office. In a similar manner, if the search in step 802 is on the group of International patents, then the classification used would be the IPC classification. The IPAM server may store the U.S. Patent Classification (or IPC classification) in a meta-data field that will also need to be searched to determine the technology classification, but is not limited to this. Exemplary screen shots of the user interface of the IPAM server to assist the user company in searches relating to U.S. Patent Classifications are shown in FIGS. 86-98. The present invention is not limited to these exemplary user interfaces. Control then passes to step 806.

In step 806, the IPAM server is used in conjunction with a technology classification 204 to create a graphical representation of similar technologies. The technology classification 204 produced by Tool 17 (FIG. 7) shows the diverse technologies (via U.S. Patent Classifications) that Company A's patents cover. The graphical representation in FIG. 7 is a pie chart, which was created using Excel, but is not limited to Excel. In fact, the present invention is not limited to using a pie chart, but could also use radar or spider charts, two or three dimensional graphs, etc.

Referring to FIG. 7, the U.S. Patent Classification 395 represents the most common type of technology that is covered by Company A's patents. Therefore, the technology included in U.S. Patent Classification 395 is well-covered by Company A's patents. In contrast, the technology included in U.S. Patent Classification 369 is sparsely-covered by Company A's patents.

III. IPAM SERVER AND THE SIC CLASSIFICATION

Referring to FIG. 2, the IPAM server works in conjunction with the SIC classification 206 to facilitate the evaluate/analyze stage 104 as Tool 18. In general, the SIC classification 206 indicates which market segments can use the products and services.

Figure 9:
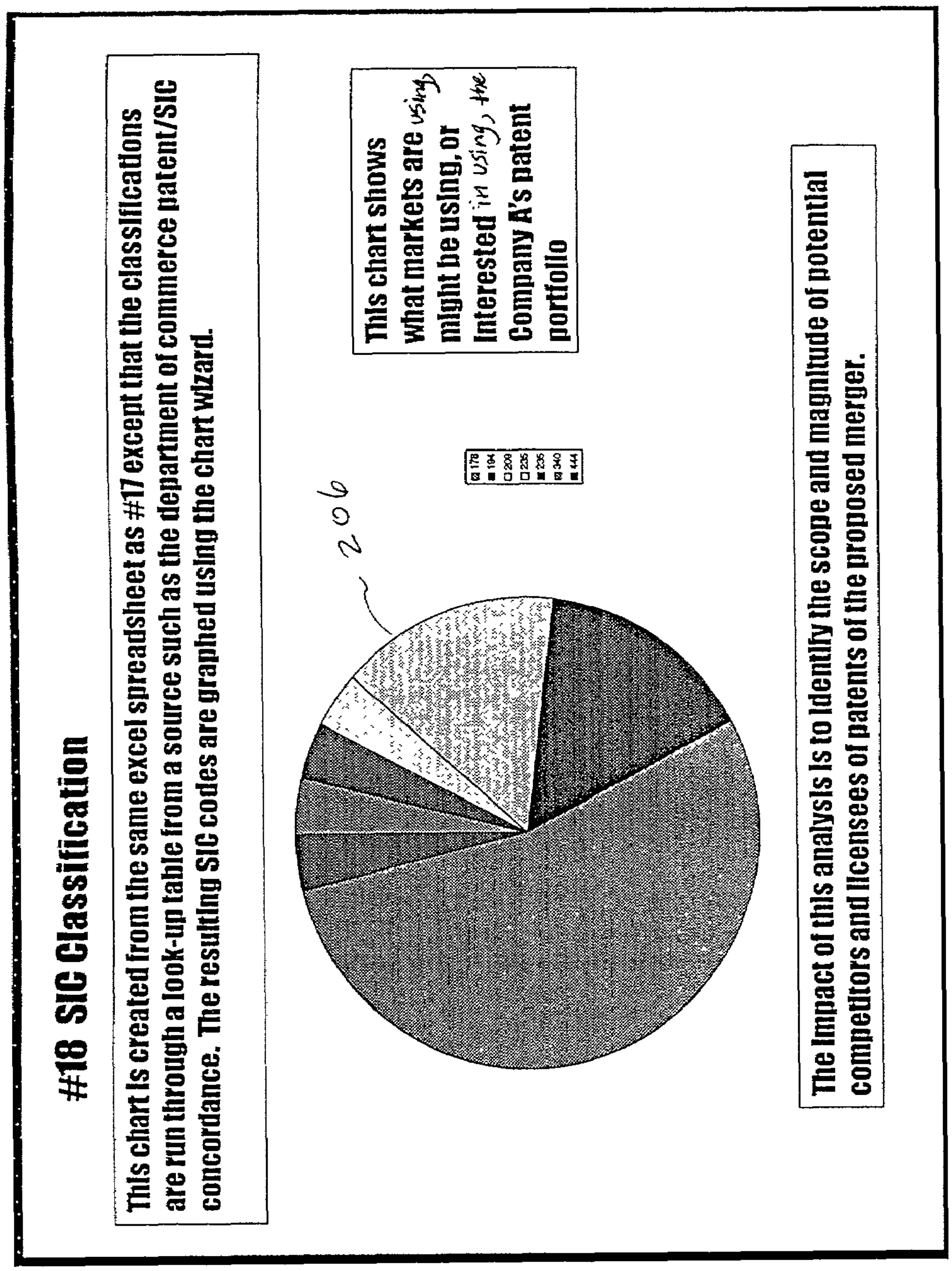
FIG. 9 illustrates the SIC classification facilitating the evaluate/analyze stage according to an embodiment of the present invention.

FIG. 9 illustrates the SIC classification 206 facilitating the evaluate/analyze stage 104 as Tool 18, entitled "SIC Classification." The purpose of Tool 18 in the evaluate/analyze stage 104 is to identify the scope and magnitude of potential competitors and licensees of patents of the proposed merger. Tool 18 shows what markets are using, might be using, or interested in using Company A's patent portfolio. How the IPAM server works in conjunction with the SIC classification 206 to aid in the evaluate/analyze stage 104 is described next with reference to FIG. 10. Typically, Tool 18 is initiated by the user selecting an assignee and technology classification function on the computer screen. The results are run through a lookup of commerce patent/SIC concordance. The resulting SIC codes are then graphed.

Figure 10:
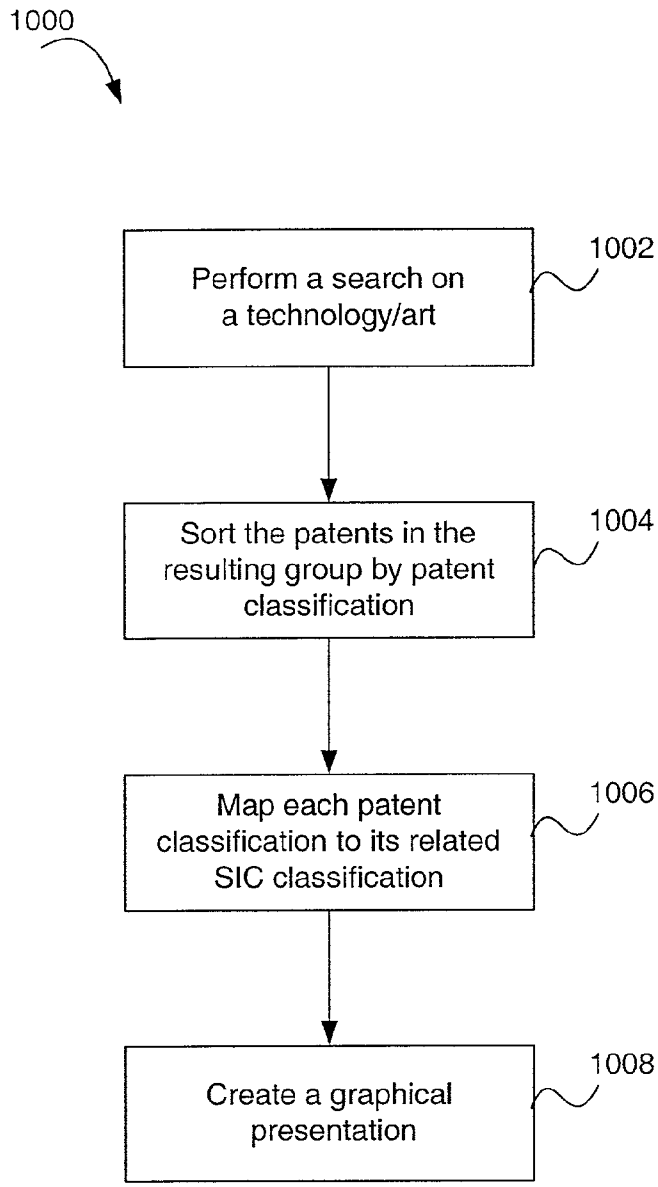
FIG. 10 is a flowchart depicting how IPAM server works in conjunction with the SIC classification to aid in the evaluate/analyze stage according to an embodiment of the present invention.

In FIG. 10, a flowchart 1000 begins at step 1002. In step 1002, in an embodiment of the present invention a user performs a search on the group of all patents and/or applications owned by Company A and/or of interest to Company A. Here, because the user is just pointing at a broad field, the abstract of each patent and/or application is typically the section that is searched, but is not limited to this. Here, the search performed is typically a boolean and/or natural language search on the product, use and/or technology to produce a group of patents. Control passes to step 1004.

In step 1004, the IPAM server takes the group of patents produced in step 1002 and further divides it into subgroups, with each subgroup having the same technology classification. When the search in step 1002 is on U.S. patents, the classification used is the U.S. Patent Classification designated by the U.S. patent and Trademark Office. Standard Industrial Classification (SIC) classification codes are provided by the U.S. Department of Commerce. In a similar manner, if the search in step 1002 is on the International patents and applications, then the classification used would be the IPC classification. The IPAM server may store the U.S. Patent Classification and IPC classification each as a meta-data field that will also need to be searched to determine the technology classification, but is not limited to this. Control then passes to step 1006.

In step 1006, each U.S. and IPC classification determined by step 1004 is mapped (e.g., via a look-up table) to its related SIC classification. Control then passes to step 1008.

In step 1008, the IPAM server is used in conjunction with a SIC classification 206 to create a graphical representation of similar industrial markets. Typically, this is done by the user selecting a related market function on the computer screen. The SIC classification 206 produced by Tool 18 (FIG. 9) shows the diverse markets (via SIC Classifications) that apply to Company A's patents. The graphical representation in FIG. 9 is a pie chart. The present invention is not limited to using a pie chart. The flowchart 1000 at this point ends.

IV. IPAM SERVER AND THE RADAR DIAGRAM

Referring to FIG. 2, the IPAM server works in conjunction with the radar diagram 208 to facilitate the identify potential targets stage 102 and the evaluate/analyze stage 104 as Tool 26. In general, the radar diagram 208 identifies technology synergy of merger.

Figure 11:
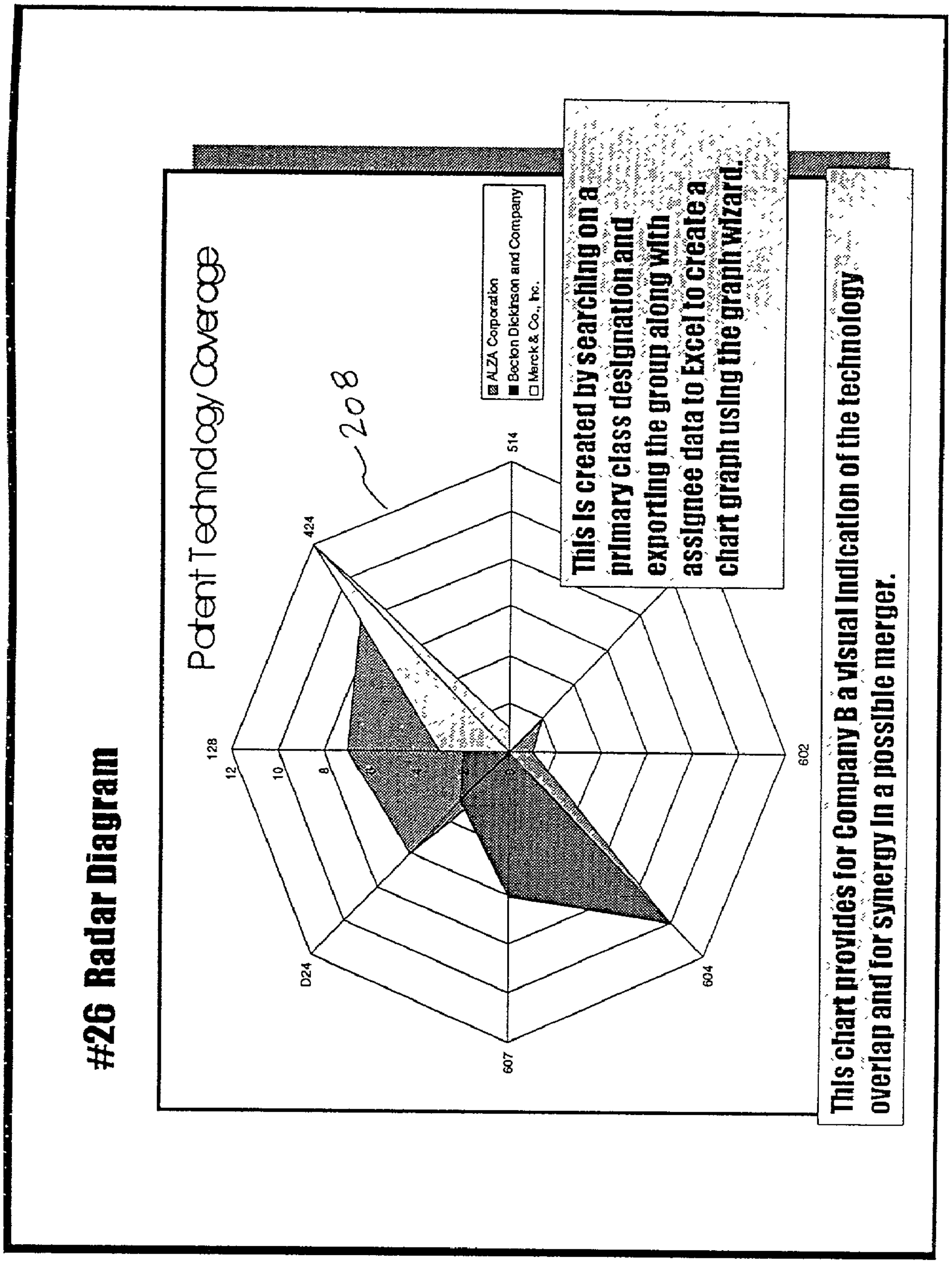
FIG. 11 illustrates the radar diagram facilitating the identify targets and the evaluate/analyze stages according to an embodiment of the present invention.

FIG. 11 illustrates the radar diagram 208 facilitating the identify potential targets stage 102 and the evaluate/analyze stage 104 as Tool 26, entitled "Radar Diagram." The purpose of Tool 26 is to provide Company B with a visual indication of the technology overlap and for synergy in a possible merge. The numbers on the y-axis show the number of patents in each patent class. The numbers around the periphery at the nodes of the diagram are the patent classes. How the IPAM server works in conjunction with the radar diagram 208 to aid in the identify potential targets stage 102 and the evaluate/analyze stage 104 is described next with reference to FIG. 12.

Figure 12:
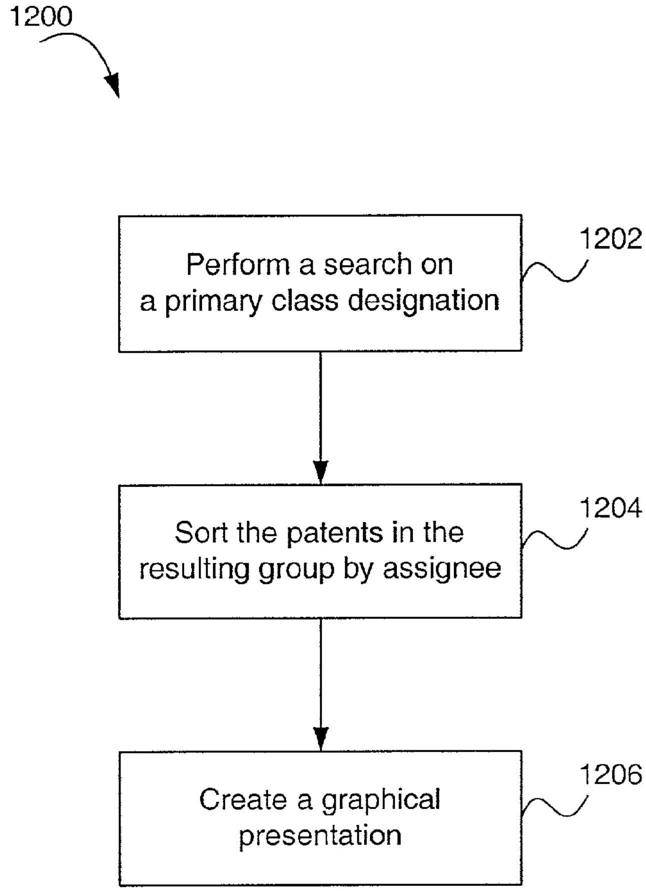
FIG. 12 is a flowchart depicting how the IPAM server works in conjunction with the radar diagram to aid in the identify targets and the evaluate/analyze stages according to an embodiment of the present invention.

In FIG. 12, a flowchart 1200 begins at step 1202. In step 1202, in an embodiment of the present invention a user performs a search on the group of all Company A's and Company B's patents. The search performed is typically a boolean and/or natural language search on the primary class designation to produce a group of patents. Control passes to step 1204.

In step 1204, the group of patents that resulted from step 1202 are sorted by assignee (to separate Company A's and Company B's patents). Control passes to step 1206.

In step 106, the IPAM server is used in conjunction with radar diagram 208 to create a graphical representation of technology synergy of merger. Flowchart 1200 ends at this point.

V. IPAM SERVER AND PATENT CITATION TREE

Referring to FIG. 2, the IPAM server works in conjunction with the patent citation tree 210 to facilitate the evaluate/analyze stage 104 (as Tools **8*a* and 8*c*), the due diligence stage 106 (as Tools 8*a* and 8*c*) and the negotiation stage 108 (as Tools 8*a*, 8*b* and 8*c*). Citation trees are described in detail in the patent and applications referenced above in the section entitled "Cross-Reference to Other Patents and Applications." In general, the patent citation tree 210** provides a view of which companies can block and/or circumvent other companies' patents (note that the icons can display dates relevant to the patents in the tree).

Figure 13:
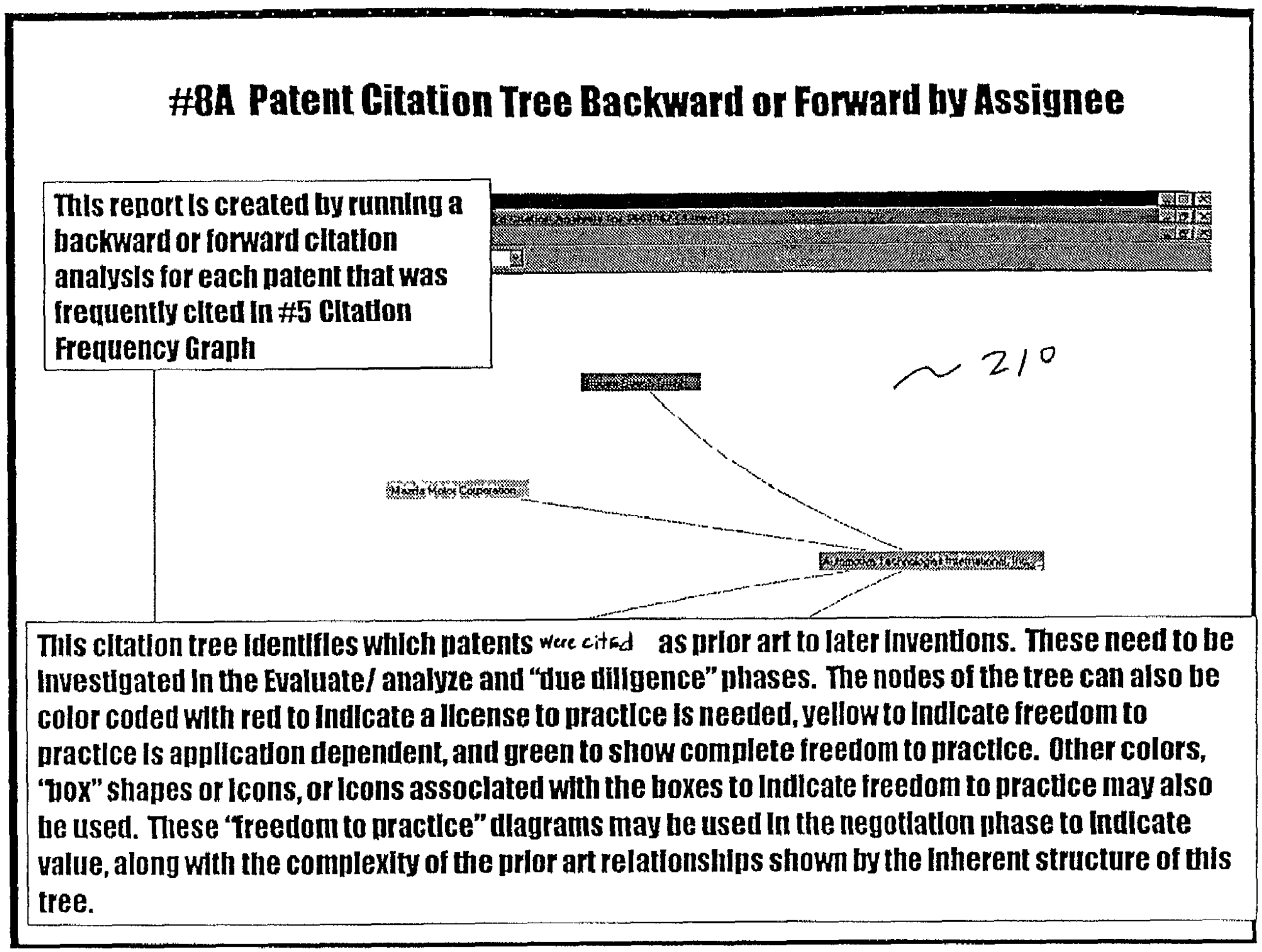
FIG. 13 illustrates the patent citation tree facilitating the evaluate/analyze, due diligence and negotiation stages according to an embodiment of the present invention.

A. Tool **8*a* and the Evaluate/Analyze Stage, the Due Diligence Stage, and the Negotiation Stage FIG. 13 illustrates the patent citation tree 210, used in the evaluate/analyze stage 104, the due diligence stage 106 and the negotiation stage 108, as Tool 8*a*, entitled "Patent Citation Tree Backward or Forward by Assignee." The purpose of Tool 8*a* is to identify which patents were cited as prior art to later inventions (i.e., the patent represented by the block on the right). These need to be investigated in the evaluate/analyze stage 104 and in the due diligence stage 106. The nodes of the tree can also be color coded with red to indicate a license to practice is needed, yellow to indicate freedom to practice is application dependent, and green to show complete freedom to practice. Other colors, "box" shapes or icons, or icons associated with the boxes, etc., to indicate freedom to practice may also be used. These freedom-to-practice diagrams may be used in the negotiation phase to indicate value, along with the complexity of the prior art relationship shown by the inherent structure of the tree. How the IPAM server works in conjunction with the patent citation tree 210 to aid in the evaluate/analyze stage 104, the due diligence stage 106 and the negotiation stage 108 is described with reference to FIG. 14. Typically, Tool 8***a* is initiated by the user selecting a patent citation tree function on the computer screen.

Figure 14:
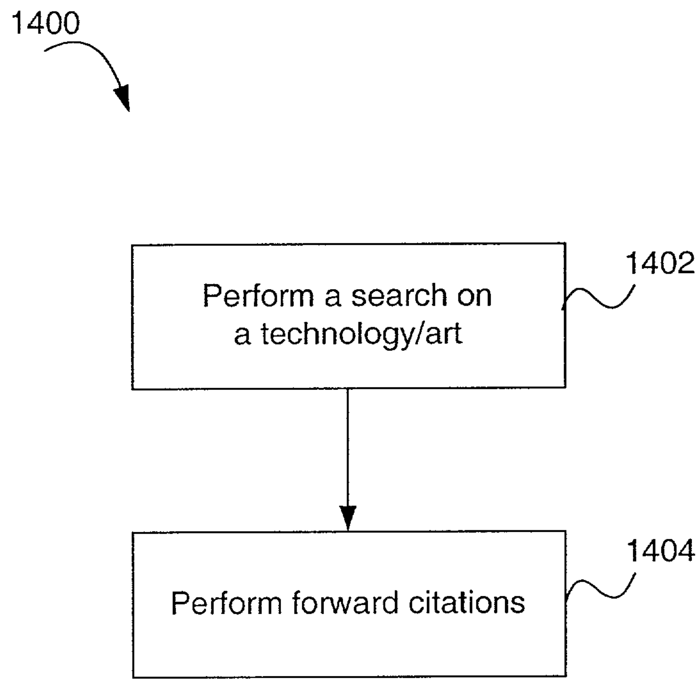
FIG. 14 is a flowchart depicting how the IPAM server works in conjunction with the patent citation tree to aid in the evaluate/analyze, due diligence and negotiation stages according to an embodiment of the present invention.

In FIG. 14, a flowchart 1400 begins at step 1402. In step 1402, in an embodiment of the present invention a user performs a search on the group of all U.S. patents. Here, because the user is just pointing at a broad field, the abstract of each U.S. patent is typically the section that is searched, but is not limited to this. The present invention is not limited to doing the search on U.S. patents, but may include European, Japanese (and other available) patents and/or applications. Here, the search performed is typically a boolean and/or natural language search on the product, use and/or technology to produce a group of patents. Control passes to step 1404.

In step 1404, the IPAM server takes the group of patents produced in step 1402 and further performs a forward citation on each of the patents, that has the same patent class (technology area) of the user company, to create a patent citation tree 210. Forward citations are described in detail in the patent and applications referenced above in the section entitled "Cross-Reference to Other Patents and Applications." The nodes in the patent citation tree 210 may be color coded (or indicated by another means) by assignee to allow the user to pick out color patterns easily. Exemplary screen shots of the user interface of the IPAM server to assist the user company in searches relating to forward citation are shown in FIGS. 81-85. The present invention is not limited to these exemplary user interfaces. The flowchart 1400 ends at this point.

B. Tool 8*b* and the Negotiation Stage

Figure 15:
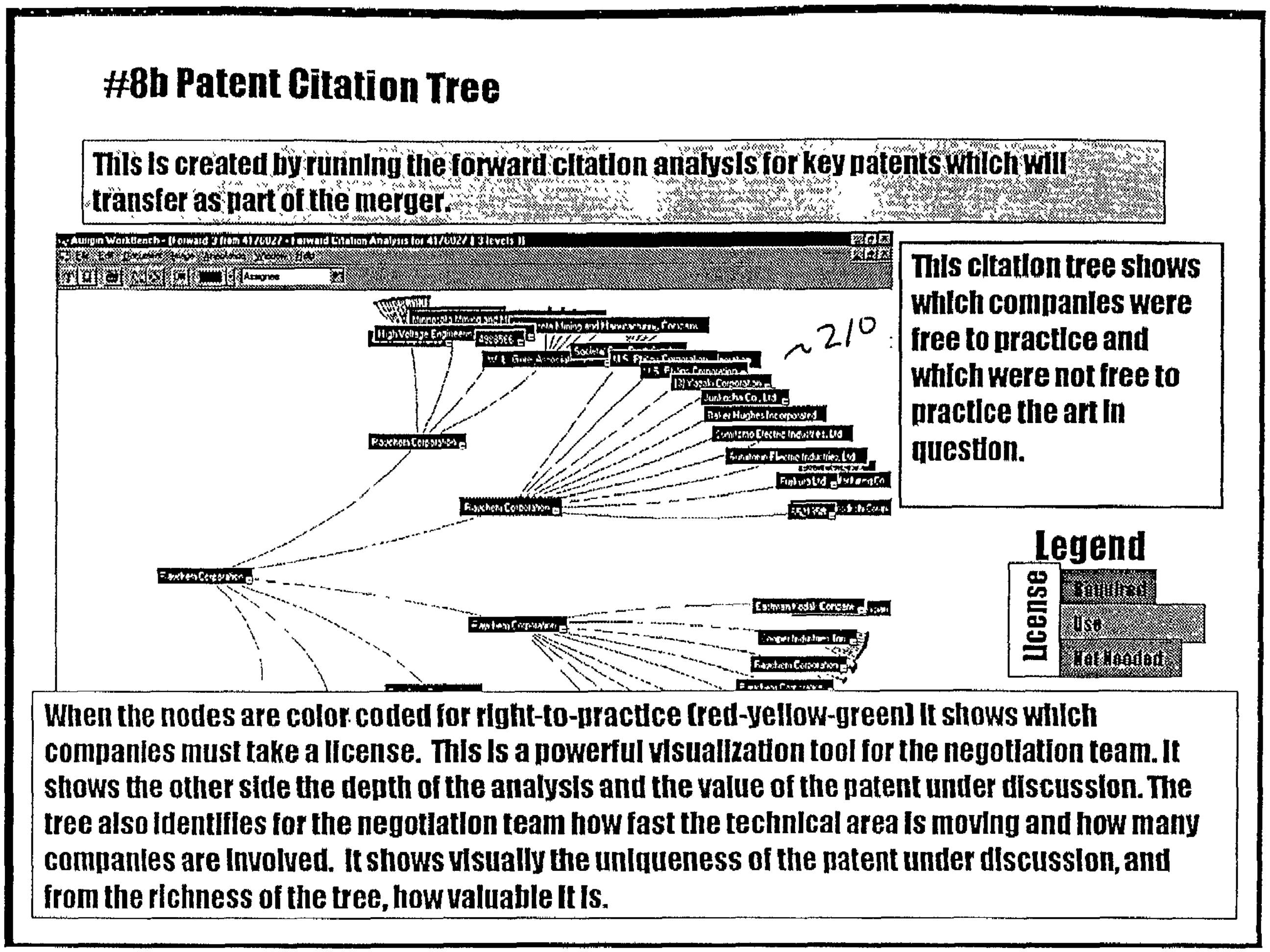
FIG. 15 illustrates the patent citation tree facilitating the negotiation stage according to an embodiment of the present invention.

FIG. 15 illustrates the patent citation tree 210, used in the negotiation stage 108, as Tool 8*b*, entitled "Patent Citation Tree." In general, the purpose of Tool 8*b* is to show which companies were free-to-practice and which were not free-to-practice the art in question. When the nodes of the patent citation tree 210 are color coded for freedom-to-practice (red-yellow-green), it shows which companies must take a license to the patent(s).

This is a powerful visualization tool for the negotiation team. It shows the other side the depth of the analysis and the value of the patent under discussion. The patent citation tree 210 also identifies for the negotiation team how fast the technical area is moving and how many companies are involved. In addition, it visually shows the uniqueness of the patent under discussion, and from the richness of the tree, how valuable it is. How the IPAM server works in conjunction with Tool 8*b* is similar to Tool 8*a*, as described above with reference to FIG. 14. Here, the patent citation tree 210 is created by running the forward citation analysis for key patents which will transfer as part of the merger.

C. Tool 8*c* and the Evaluate/Analyze Stage, the Due Diligence Stage, and the Negotiation Stage FIG. 16 illustrates the patent citation tree 210, used in the evaluate/analyze stage 104, the due diligence stage 106 and the negotiation stage 108, as Tool 8*c*, entitled "Patent Citation Tree." The purpose of Tool 8*c* is to allow the merger and acquisition team to see, at a glance, if other companies are focused in a specific effort to work in just one branch of the technology, or are working in many areas. Companies working in many areas will be good candidates for a post-merger assertion and license out analysis. This can generate a cash flow stream to help justify the merger deal. Where cited patents are from either merger company, the nodes of the tree may be color coded or marked with an icon or box shape, etc., so that the merger and acquisition team can see at a glance the strength of the combined "picket fence" the merger will create.

In addition, the patent citation tree 210 produced by Tool 8*c* shows how unique, mature, expansive, and inner-related the technology is that stems from the patent being evaluated. When dates are put in the nodes, it also shows the merger and acquisition team how fast moving the various branches of the tree are growing. How the IPAM server works in conjunction with Tool 8*c* is similar to Tool 8*a*, as described above with reference to FIG. 14. Here, the patent citation tree 210 is created by running the forward citation analysis for key patents which will transfer as part of the merger.

VI. IPAM SERVER AND CITATION ROOT TREE

Referring to FIG. 2, the IPAM server works in conjunction with the citation root tree 212 to facilitate the evaluate/analyze stage 104 (as Tool 10*b*), the due diligence stage 106 (as Tools 10*a* and 10*b*) and the negotiation stage 108 (as Tools 10*a* and 10*b*). Nested patent citation trees (or citation root trees) are described in detail in the patent and applications referenced above in the section entitled "Cross-Reference to Other Patents and Applications." In general, during the merger and acquisition process, the user company can look at the citation root tree 212 to predict related technology/markets under exploration by other companies. Patents lag the technology due to the inherent delays in patent prosecution. Thus, if the user finds a very recent patent, it may not have any forward citations since any patents that might cite it are months or years away from issuing. Thus, it would not be possible to see how the technology is developing relative to this patent since it has no forward citations.

This tool utilizes a technique that involves going back one or more generations from a given patent, and then performing forward citations on the prior generations. This identifies a patent family that is a result of a unique combination of backwards and forwards citation processing. The resulting tree indicates who is involved, and which fields are probably around the base patent. It's an approach to look into the future of a given technology (how the technology may develop in the future). Date contours (or contours according to some other criteria) is also applicable with this tool (and with all hyperbolic trees generated by the invention).

A. Tool 10*a* and the Due Diligence Stage and the Negotiation Stage

Figure 17:
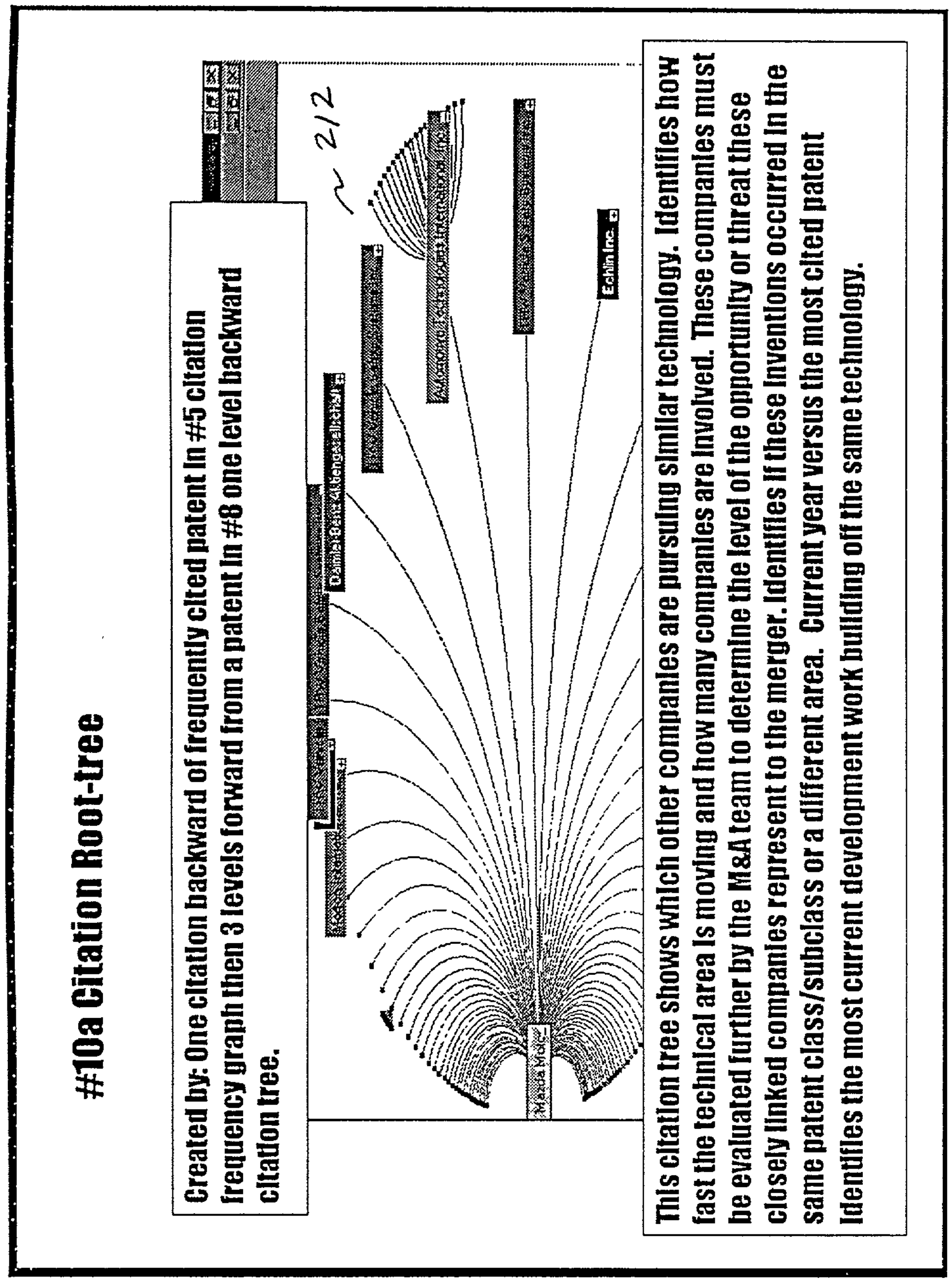
FIG. 17 illustrates the citation root tree facilitating the due diligence and negotiation stages according to an embodiment of the present invention.

FIG. 17 illustrates the citation root tree 212, used in the due diligence stage 106 and the negotiation stage 108, as Tool 10*a*, entitled "Citation Root-Tree." The purpose of Tool 10*a* is to show which other companies are pursuing similar technology. The citation root tree 212 identifies how fast the technical area is moving and how many companies are involved. These companies must be evaluated further by the merger and acquisition team to determine the level of the opportunity or threat these closely linked companies represent to the merger. In addition, the citation root tree 212 identifies if these inventions occurred in the same patent class/subclass or in a different area. Current year versus the most cited patent identifies the most current development work building off of the same technology. How the IPAM server works in conjunction with the citation root tree 212 to aid in the due diligence stage 106 and the negotiation stage 108 is described next with reference to FIG. 18. Typically, Tool 10*a* is initiated by the user selecting a citation root tree function on the computer screen.

Figure 18:
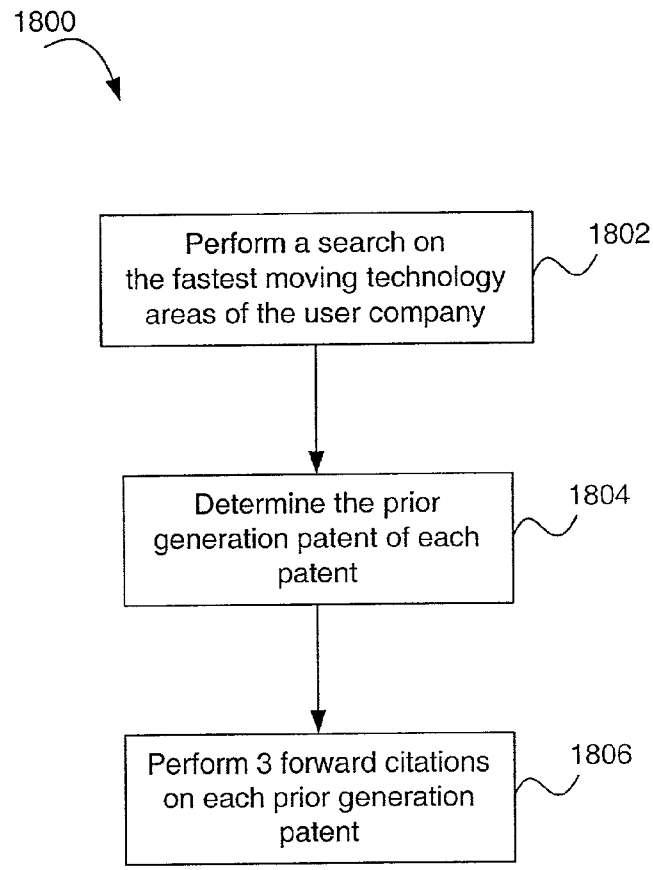
FIG. 18 is a flowchart depicting how the IPAM server works in conjunction with the citation root tree to aid in the due diligence and negotiation stages according to an embodiment of the present invention.

In FIG. 18, a flowchart 1800 begins at step 1802. In step 1802, in an embodiment of the present invention a user performs a search on the group of the user company's patents that address the user company's fastest moving technology areas. These patents may include U.S., European, and Japanese (and other available) patents and/or applications. The search performed is typically a boolean and/or natural language search on the product, use and/or technology to produce a group of patents. Control passes to step 1804.

In step 1804, the IPAM server determines the prior generation patent of each patent produced in step 1802 (e.g., goes back one citation for each patent). Exemplary screen shots of the user interface of the IPAM server to assist the user company in searches relating to reverse citation are shown in FIGS. 76-80. The present invention is not limited to these exemplary user interfaces. Control passes to step 1806.

In step 1806, the IPAM server takes the group of patents produced in step 1804 and further performs three forward citations on each of the patents to create a citation root tree 212. The nodes in the citation root tree 212 may be color coded by assignee to allow the user to pick out color patterns easily. Exemplary screen shots of the user interface of the IPAM server to assist the user company in searches relating to forward citation are shown in FIGS. 81-85. The present invention is not limited to these exemplary user interfaces. The flowchart 1800 ends at this point.

B. Tool 10*b* and the Evaluate/Analyze Stage, the Due Diligence Stage and the Negotiation Stage FIG. 19 illustrates the citation root tree 212, used in the evaluate/analyze stage 104, the due diligence stage 106 and the negotiation stage 108, as Tool 10*b*, entitled "Patent Citation Root-Tree." The implication of Tool 10*b* is that the company acquiring the patent may have an opportunity to sublicense further, and thereby mitigate or influence the value paid for the merger. The citation root tree 212 shows which companies' competitive intelligence department should do a preliminary investigation for possible infringing products and services. The citation root tree 212 also shows other companies that might be interested in sublicensing the art, thus generating extra cash flow and value from the merger. How the IPAM server works in conjunction with Tool 10*b* is similar to Tool 10*a*, as described above with reference to FIG. 18. Here, for the user company's fastest moving technology areas, patents in these areas are analyzed for spill-over technology drift.

VII. IPAM SERVER AND CITATION COUNT REPORT

Figure 20:
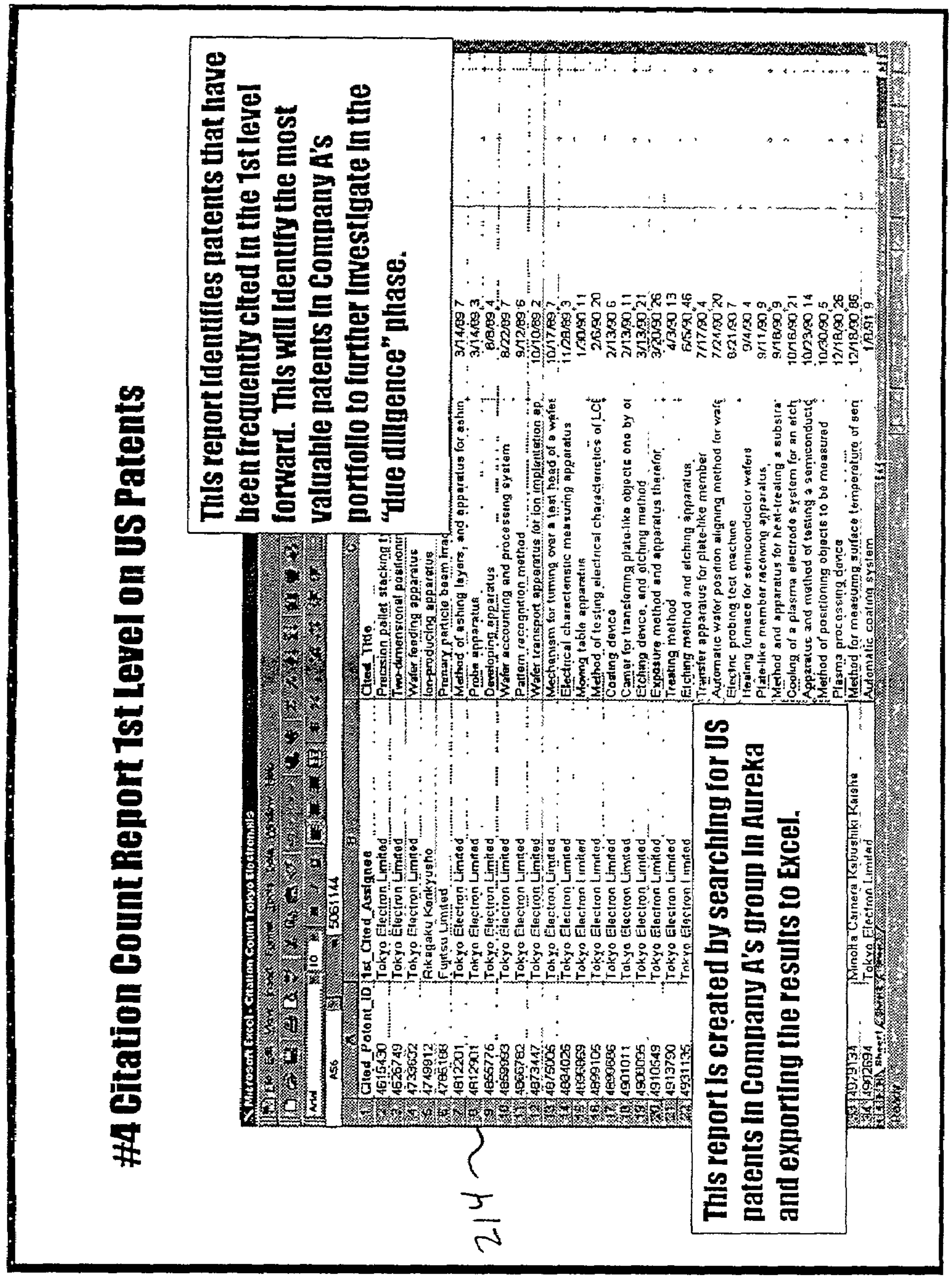
FIG. 20 illustrates the citation count report facilitating the evaluate/analyze and due diligence stages according to an embodiment of the present invention.

Referring to FIG. 2, the IPAM server works in conjunction with the citation count report 214 to facilitate the evaluate/analyze stage 104 and the due diligence stage 106 (as Tool 4). In general, the citation count report 214 identifies frequently cited patents having the most value in the portfolio. FIG. 20 illustrates the citation count report 214, used in the evaluate/analyze stage 104 and the due diligence stage 106, as Tool 4, entitled "Citation Count Report $1^{st}$ Level on U.S. Patents." The purpose of Tool 4 is to create a report that identifies patents that have been frequently cited in the $1^{st}$ level forward. This will identify the most valuable patents in Company A's portfolio to further investigate in the due diligence stage 106. How the IPAM server works in conjunction with the citation count report 214 to aid in the evaluate/analyze stage 104 and the due diligence stage 106 is described with reference to FIG. 21. Tool 4 is typically initiated by the user selecting a citation count report function on the computer screen.

Figure 21:
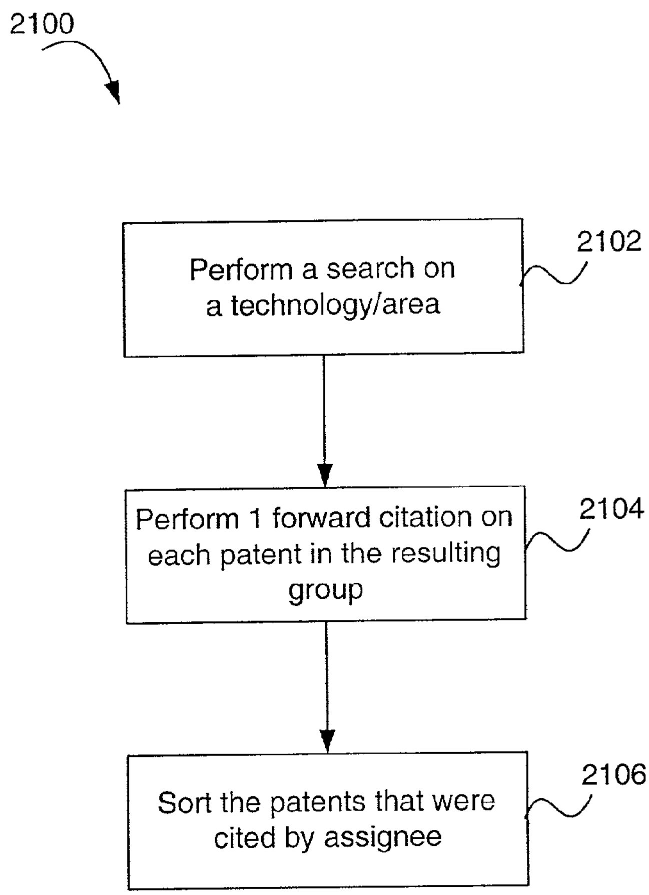
FIG. 21 is a flowchart depicting how the IPAM server works in conjunction with the citation count report to aid in the evaluate/analyze and due diligence stages according to an embodiment of the present invention.

In FIG. 21, a flowchart 2100 begins at step 2102. In step 2102, in an embodiment of the present invention a user performs a search on the group of all patents and/or applications. Here, because the user is just pointing at a broad field, the abstract of each patent and/or application is typically the section that is searched, but is not limited to this. The search performed is typically a boolean and/or natural language search on the product, use and/or technology to produce a group of patents. Control passes to step 2104.

In step 2104, one forward citation is performed on each patent produced in step 2102. Control passes to step 2106.

In step 2106, the patents are sorted by assignee to produce the citation count report 214 requested by the user. It is also useful to sort by citation count. Flowchart 2100 ends at this point.

VIII. IPAM SERVER AND CITATION FREQUENCY GRAPH

Referring to FIG. 2, the IPAM server works in conjunction with the citation frequency graph 216 to facilitate the evaluate/analyze stage 104 (as Tools 5 and 9) and the due diligence stage 106 (as Tools 5 and 9). In general, the citation frequency graph 216 identifies possible patents and companies cited in the development of a patent infringement by other companies.

A. Tool 5 and the Evaluate/Analyze Stage and the Due Diligence Stage

Figure 22:
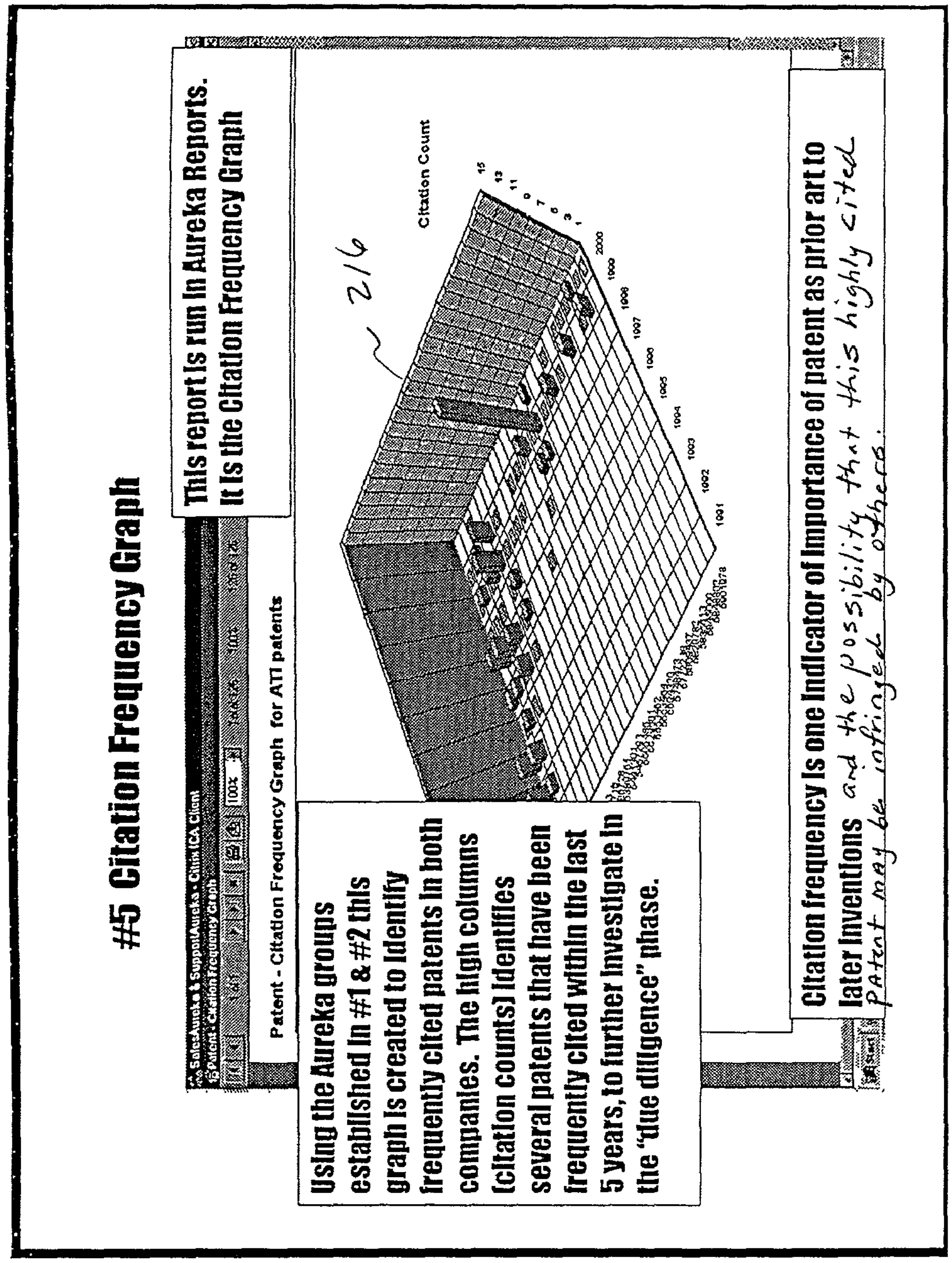
FIG. 22 illustrates the citation frequency graph facilitating the evaluate/analyze and due diligence stages according to an embodiment of the present invention.

FIG. 22 illustrates the citation frequency graph 216, used in the evaluate/analyze stage 104 and the due diligence stage 106, as Tool 5, entitled "Citation Frequency Graph." The purpose of Tool 5 is to identify frequently cited patents in both companies. The high columns (citation counts) identify several patents that have been frequently cited within the last five years, to further investigate in the due diligence stage 106. Citation frequency is one indicator of importance of a patent as prior art to later inventions and the possibility that this highly cited patent may be infringed by others. How the IPAM server works in conjunction with the citation frequency graph 216 to aid in the evaluate/analyze stage 104 and the due diligence stage 106 is described with reference to FIG. 23. Typically, Tool 5 is initiated by the user selecting a citation frequency graph function on the computer screen.

Figure 23:
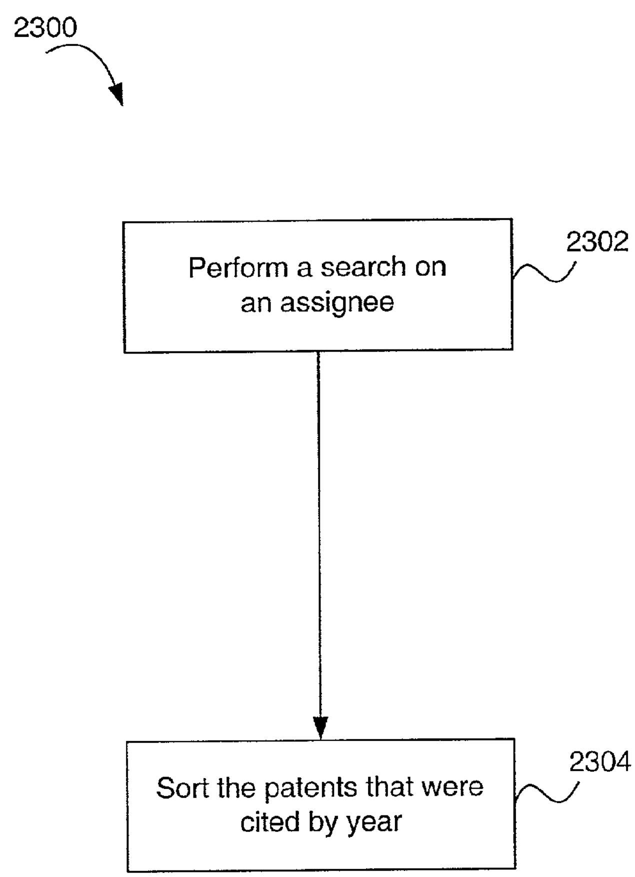
FIG. 23 is a flowchart depicting how the IPAM server works in conjunction with the citation frequency graph to aid in the evaluate/analyze and due diligence stages according to an embodiment of the present invention.

In FIG. 23, a flowchart 2300 begins at step 2302. In step 2302 in an embodiment of the present invention a user performs a search on the group of all patents and/or applications. Here, because the user is just pointing at a broad field, the abstract of each patent and/or application is typically the section that is searched, but is not limited to this. The search performed is typically a boolean and/or natural language search on an assignee to produce a group of patents. Control passes to step 2304.

In step 2304, the patents are sorted by year cited to produce the citation frequency graph 216 requested by the user. Flowchart 2300 ends at this point.

B. Tool 9 and the Evaluate/Analyze Stage and the Due Diligence Stage

Figure 24:
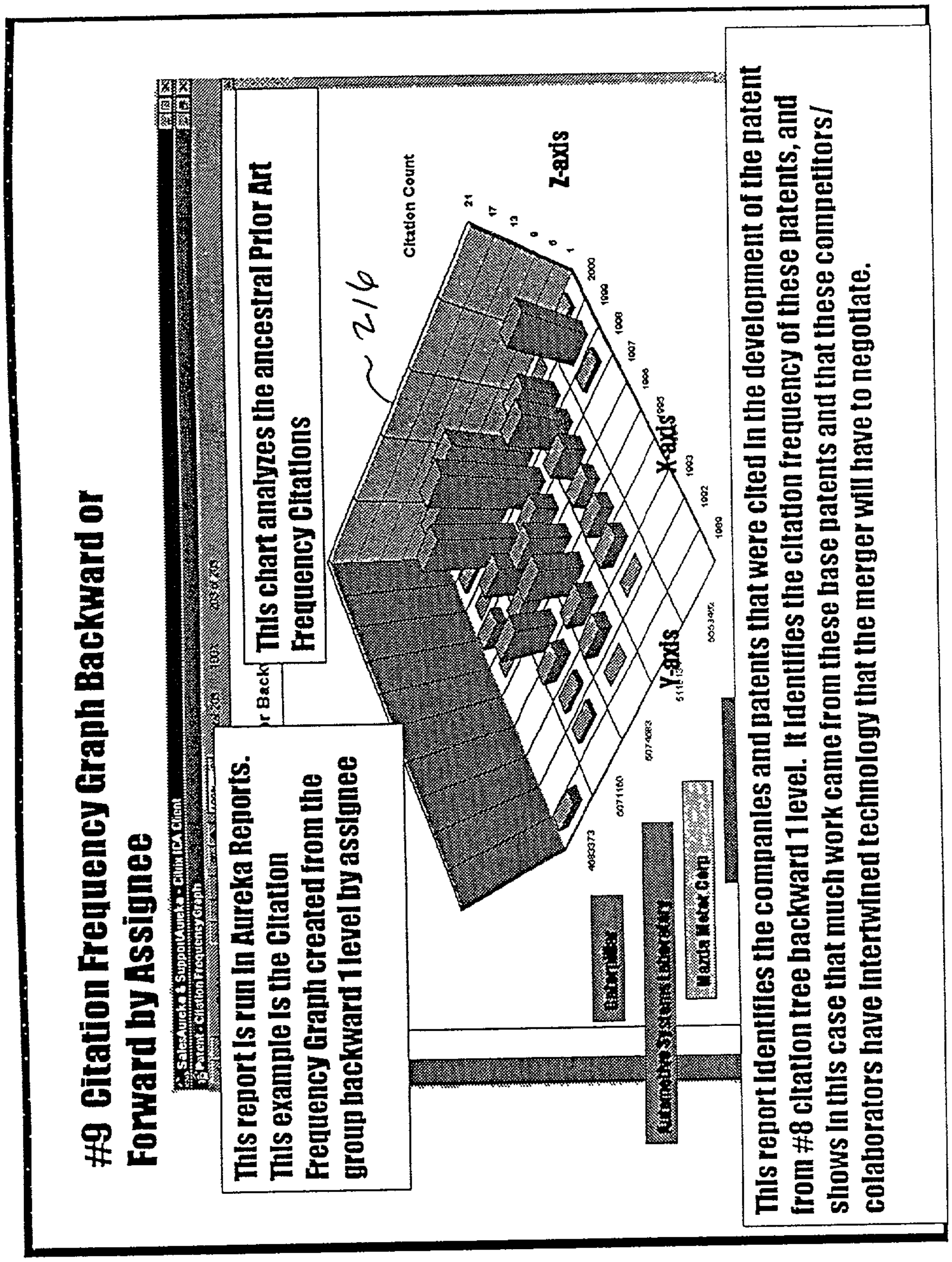
FIG. 24 illustrates the citation frequency graph (backward or forward by assignee) facilitating the evaluate/analyze and due diligence stages according to an embodiment of the present invention.

FIG. 24 illustrates the citation frequency graph 216, used in the evaluate/analyze stage 104 and the due diligence stage 106, as Tool 9, entitled "Citation Frequency Graph Backward or Forward by Assignee." The purpose of Tool 9 is to identify the companies and patents that were cited in the development of Tool 8 citation tree backward 1 level. It identifies the citation frequency of these patents, and shows the work that came from these base patents. It also shows that these competitors/collaborators have intertwined technology that the merger will have to negotiate. The citation frequency graph 216 analyzes the ancestral prior art frequency citations. How the IPAM server works in conjunction with Tool 9 is similar to Tool 5, as described above with reference to FIG. 23.

IX. IPAM SERVER AND CITATION FREQUENCY REPORT

Referring to FIG. 2, the IPAM server works in conjunction with the citation frequency report 218 to facilitate the evaluate/analyze stage 104 (as Tools 6 and 7) and the due diligence stage 106 (as Tools 6 and 7). In general, the citation frequency report 218 identifies which patents from which companies have the most value.

Figure 25:
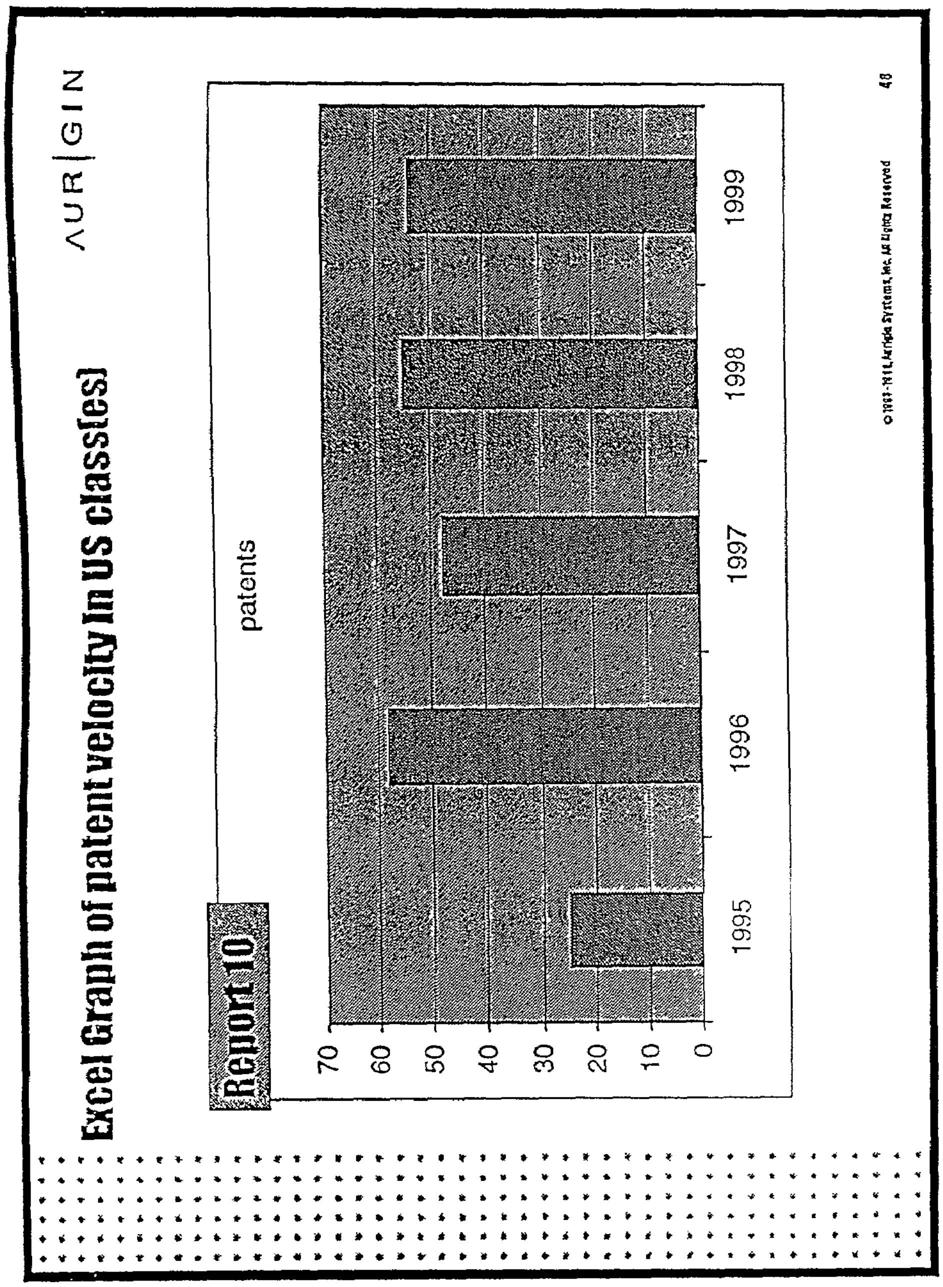
FIG. 25 is an exemplary screen shot of a report produced by the IPAM server to assist the user company in searches relating to patent velocity in U.S. Patent Classifications according to an embodiment of the present invention.

In addition, FIG. 25 is an exemplary screen shot of a report produced by the IPAM server to assist the user company in searches relating to patent velocity in U.S. Patent Classifications according to an embodiment of the present invention.

A. Tool 6 and the Evaluate/Analyze Stage and the Due Diligence Stage

Figure 26:
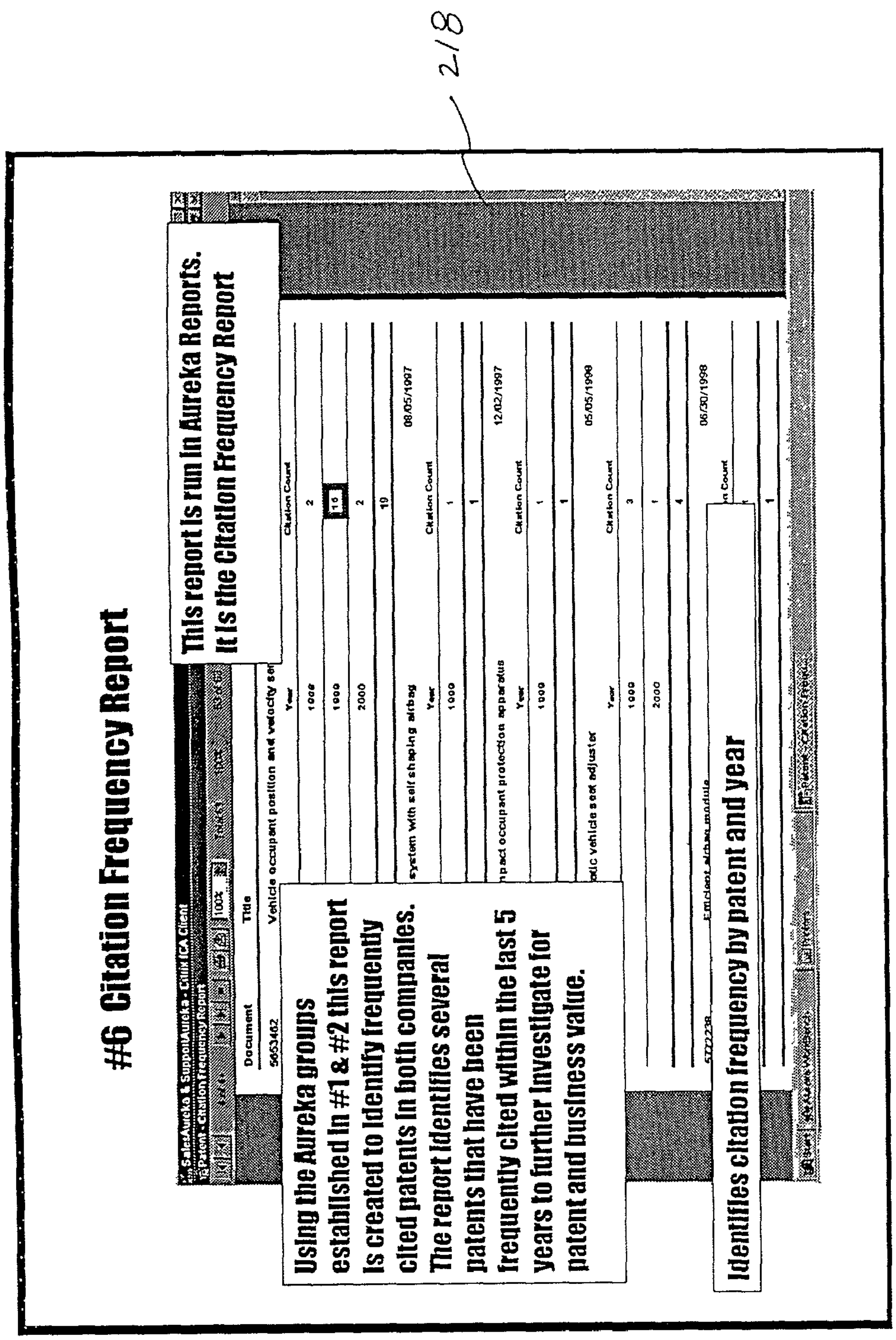
FIG. 26 illustrates the citation frequency report facilitating the evaluate/analyze and due diligence stages according to an embodiment of the present invention.

FIG. 26 illustrates the citation frequency report 218, used in the evaluate/analyze stage 104 and the due diligence stage 106, as Tool 6, entitled "Citation Frequency Report." The purpose of Tool 6 is to identify frequently cited patents in both companies. The report identifies several patents that have been frequently cited within the last five years to further investigate for patent and business value. The citation frequency report 218 identifies citation frequency by patent and year. How the IPAM server works in conjunction with the citation frequency report 218 to aid in the evaluate/analyze stage 104 and the due diligence stage 106 is described with reference to FIG. 27. Typically, Tool 6 is initiated by the user selecting a citation frequency report function on the computer screen.

Figure 27:
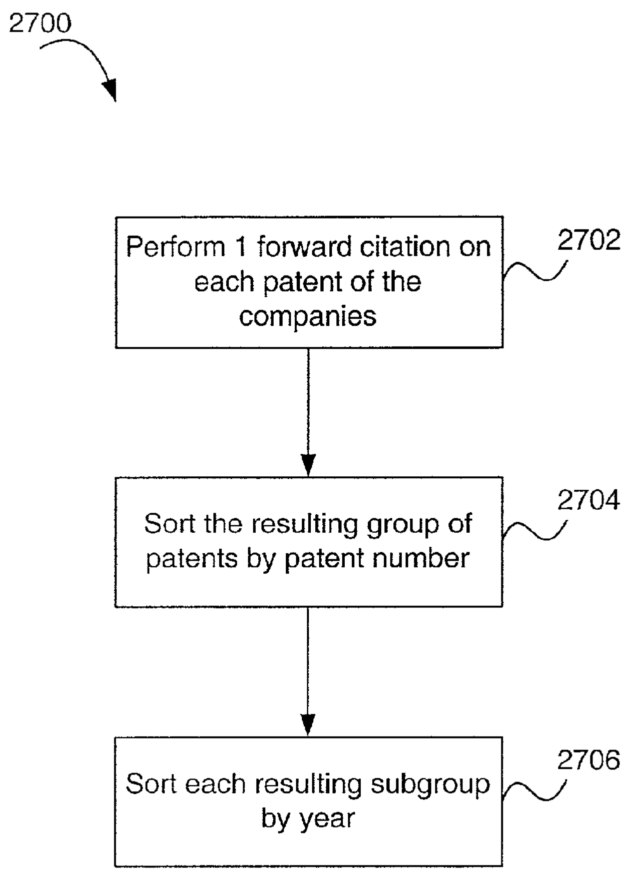
FIG. 27 is a flowchart depicting how the IPAM server works in conjunction with the citation frequency report to aid in the evaluate/analyze and due diligence stages according to an embodiment of the present invention.

In FIG. 27, a flowchart 2700 begins at step 2702. In step 2702 in an embodiment of the present invention a user performs a search on the group of all patents and/or applications. Here, because the user is just pointing at a broad field, the abstract of each patent and/or application is typically the section that is searched, but is not limited to this. The search performed is typically a boolean and/or natural language search on the product, use and/or technology to produce a group of patents. Also in step 2700, one forward citation is done on each patent of the company. Control passes to step 2704.

In step 2704, the patents from step 2702 are sorted by patent number. Control passes to step 2706.

In step 2706, the patents in each resulting subgroup are sorted by year to produce the citation frequency report 218 requested by the user. Flowchart 2700 ends at this point.

B. Tool 7 and the Evaluate/Analyze Stage and the Due Diligence Stage

Figure 28:
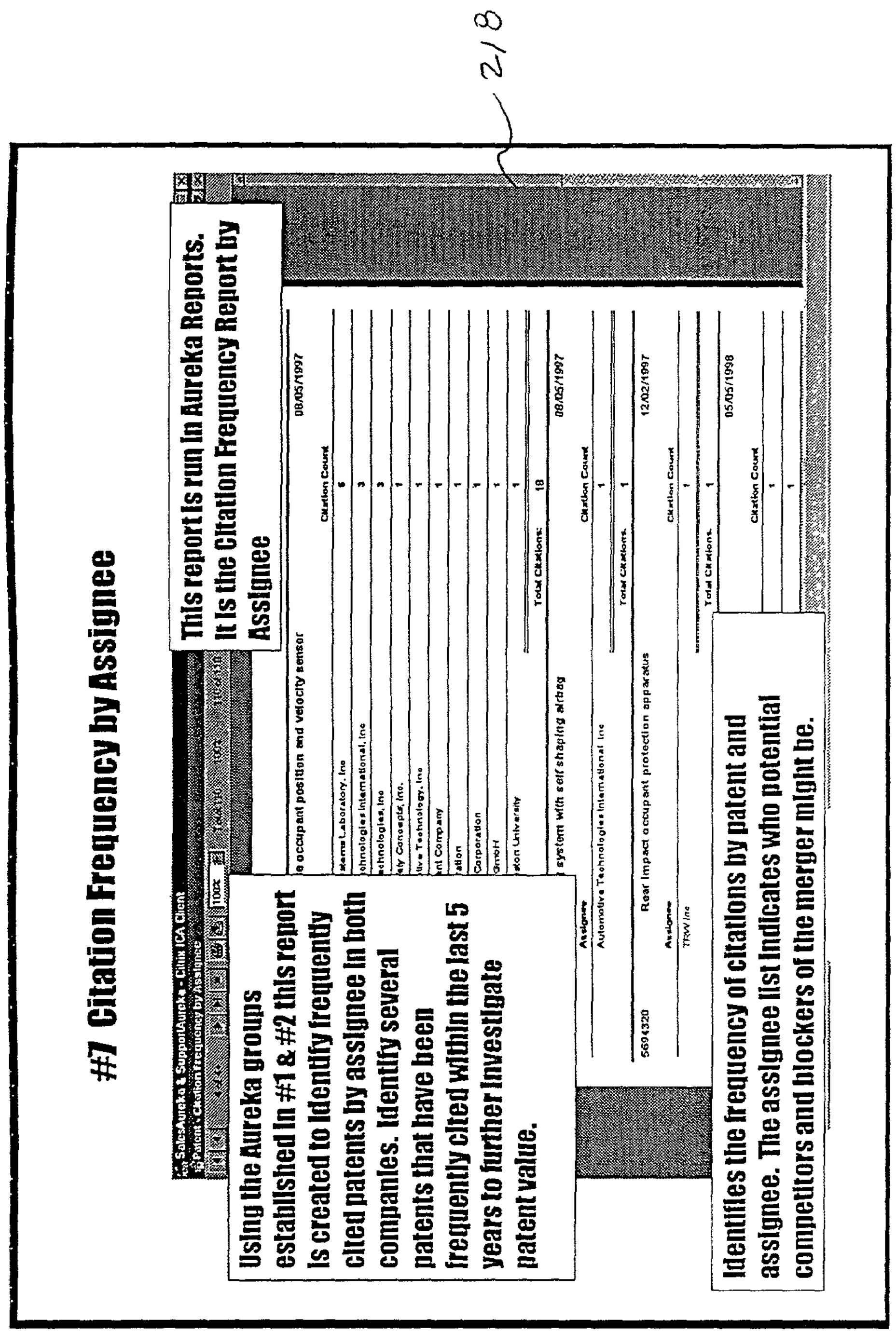
FIG. 28 illustrates the citation frequency report (by assignee) facilitating the evaluate/analyze and due diligence stages according to an embodiment of the present invention.

FIG. 28 illustrates the citation frequency report 218, used in the evaluate/analyze stage 104 and the due diligence stage 106, as Tool 7, entitled "Citation Frequency by Assignee." The purpose of Tool 7 is to identify the frequency of citations by patent and assignee. The assignee list indicates who potential competitors and blockers of the merger might be. Tool 7 also identifies frequently cited patents by assignee in both companies. Tool 7 identifies several patents that have been frequency cited within the last 5 years to further investigate patent value. How the IPAM server works in conjunction with Tool 7 is similar to Tool 6, as described above with reference to FIG. 27.

X. IPAM SERVER AND PATENT COUNT/YEAR

Referring to FIG. 2, the IPAM server works in conjunction with the patent count/year 220 to facilitate the evaluate/analyze stage 104 (as Tools 12*a*, 12*b* and 13), the due diligence stage 106 (as Tools 12*a*, 12*b* and 13), and the negotiation stage 108 (as Tools 12*a* and 13). In general, the patent count/year 220 identifies the intensity of development in portfolios.

Figure 29:
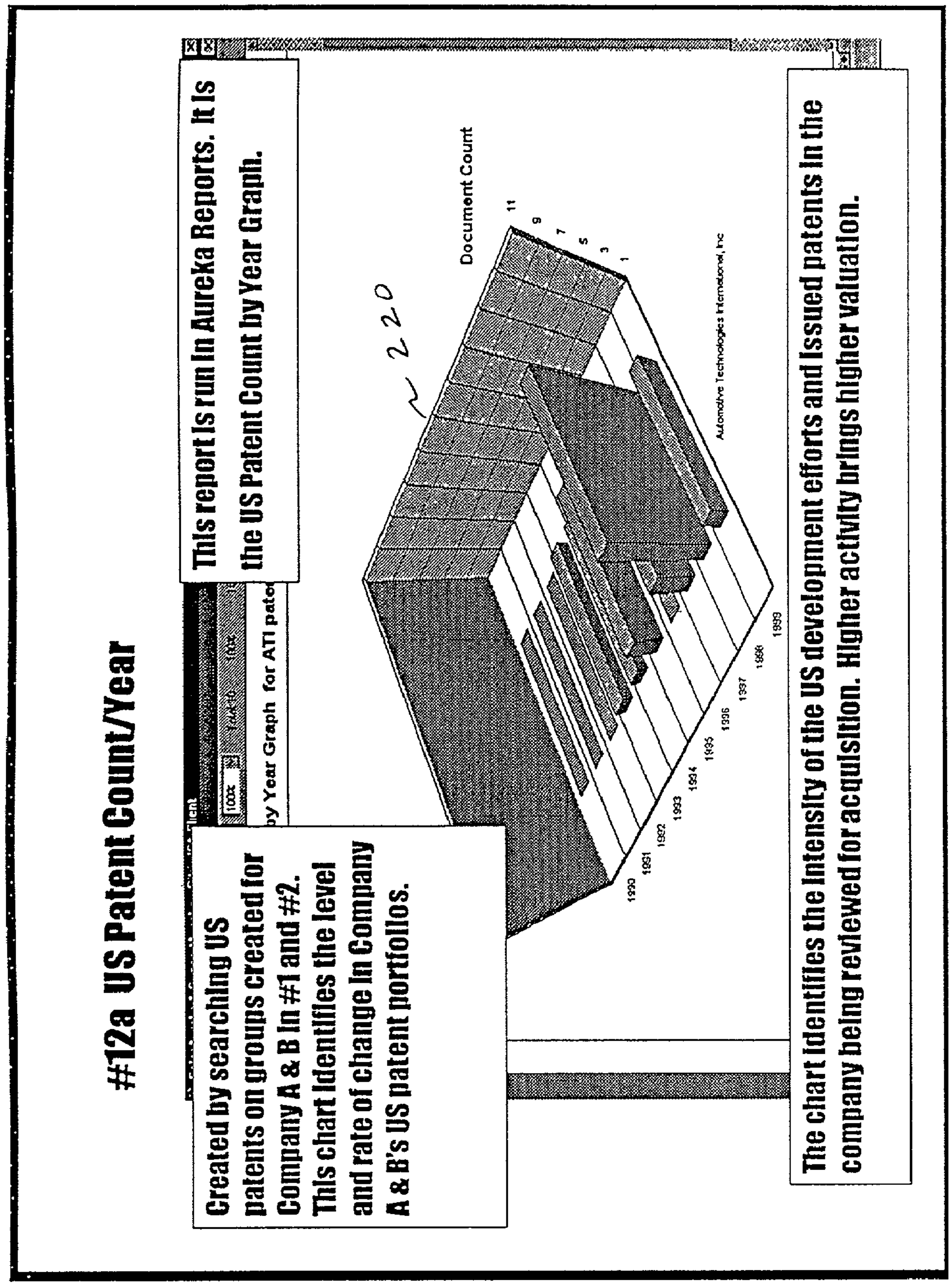
FIG. 29 illustrates the patent count/year facilitating the evaluate/analyze, due diligence and negotiation stages according to an embodiment of the present invention.

A. Tool 12*a* and the Evaluate/Analyze Stage, the Due Diligence Stage and the Negotiation Stage FIG. 29 illustrates the patent count/year 220, used in the evaluate/analyze stage 104, the due diligence stage 106 and the negotiation stage 108, as Tool 12*a*, entitled "U.S. Patent Count/Year." The purpose of Tool 12*a* is to identify the level and rate of change in Company A's and Company B's U.S. patent portfolios. Tool 12*a* also identifies the intensity of the U.S. development efforts and issued patents in the company being reviewed for acquisition. Higher activity brings higher valuation. How the IPAM server works in conjunction with the patent count/year 220 to aid in the evaluate/analyze stage 104, the due diligence stage 106 and the negotiation stage 108 is described with reference to FIG. 30. Typically, Tool 12*a* is initiated by the user selecting a patent count/year graph function on the computer screen.

Figure 30:
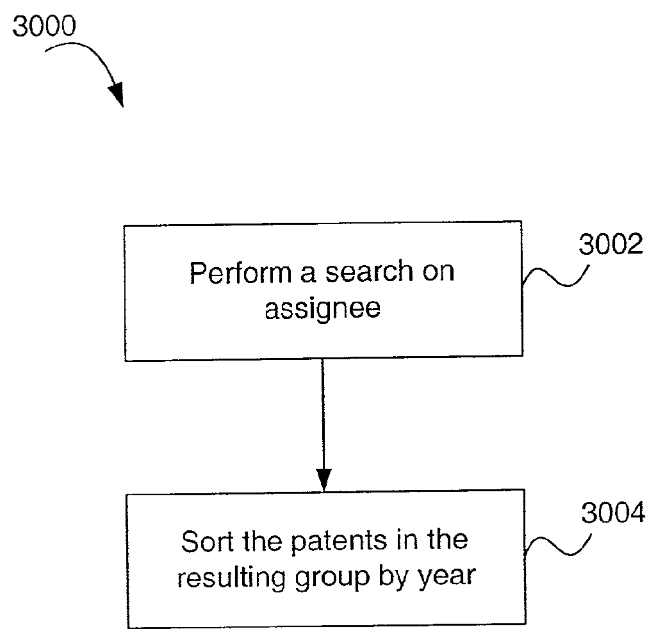
FIG. 30 is a flowchart depicting how the IPAM server works in conjunction with the patent count/year to aid in the evaluate/analyze, due diligence and negotiation stages according to an embodiment of the present invention.

In FIG. 30, a flowchart 3000 begins at step 3002. In step 3002 in an embodiment of the present invention a user performs a search on the group of all U.S. patents. Here, because the user is just pointing at a broad field, the abstract of each patent and/or application (e.g., of Company A and Company B) is typically the section that is searched, but is not limited to this. The search performed is typically a boolean and/or natural language search on the assignee to produce a group of patents. Control passes to step 3004.

In step 3004, the patents from step 3002 are sorted by year to produce the patent count/year 220 requested by the user. Flowchart 3000 ends at this point.

B. Tool 12*b* and the Evaluate/Analyze Stage and the Due Diligence Stage

Figure 31:
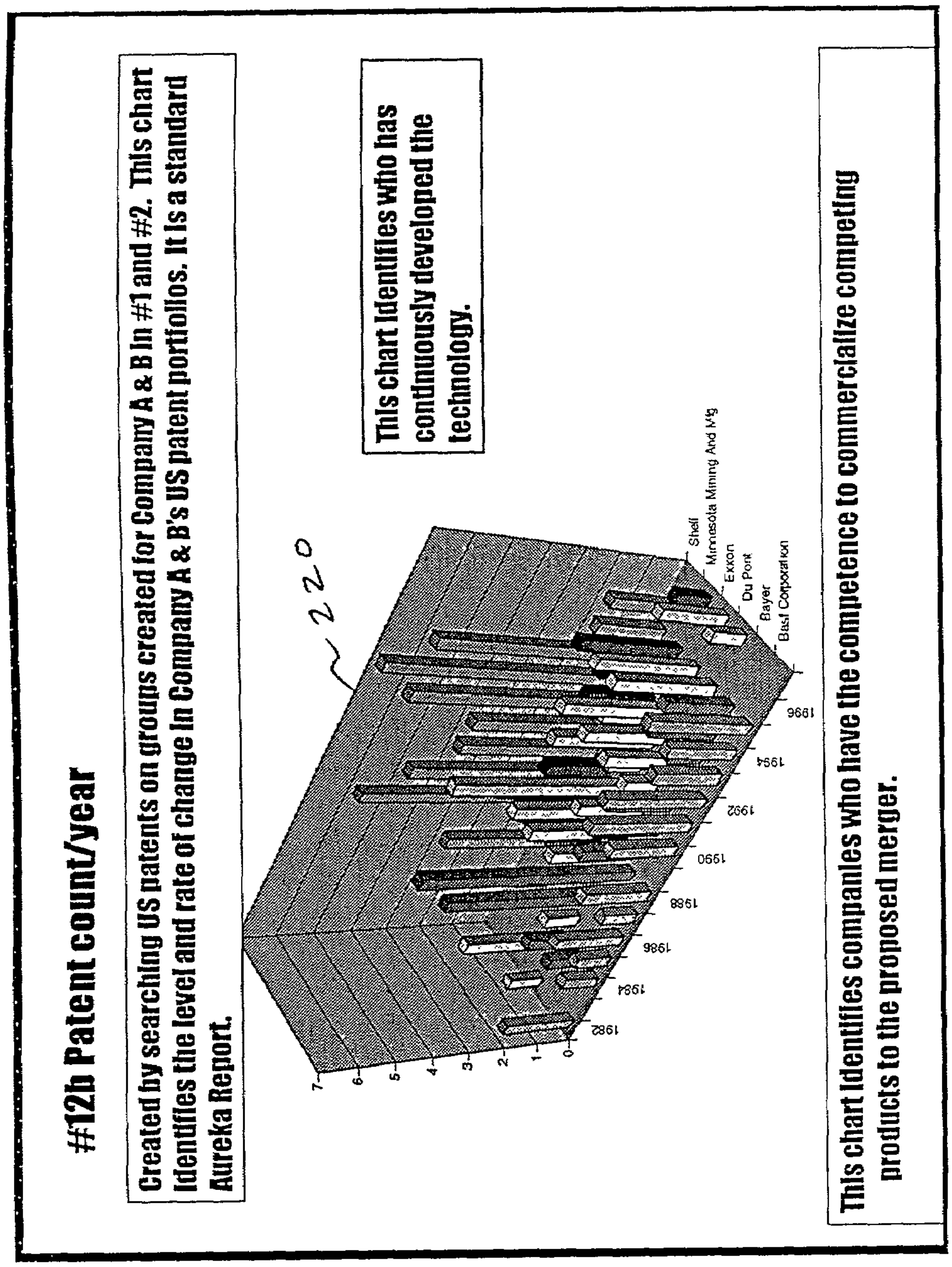
FIG. 31 illustrates the patent count/year facilitating the evaluate/analyze and the due diligence stages according to an embodiment of the present invention.
Figure 32:
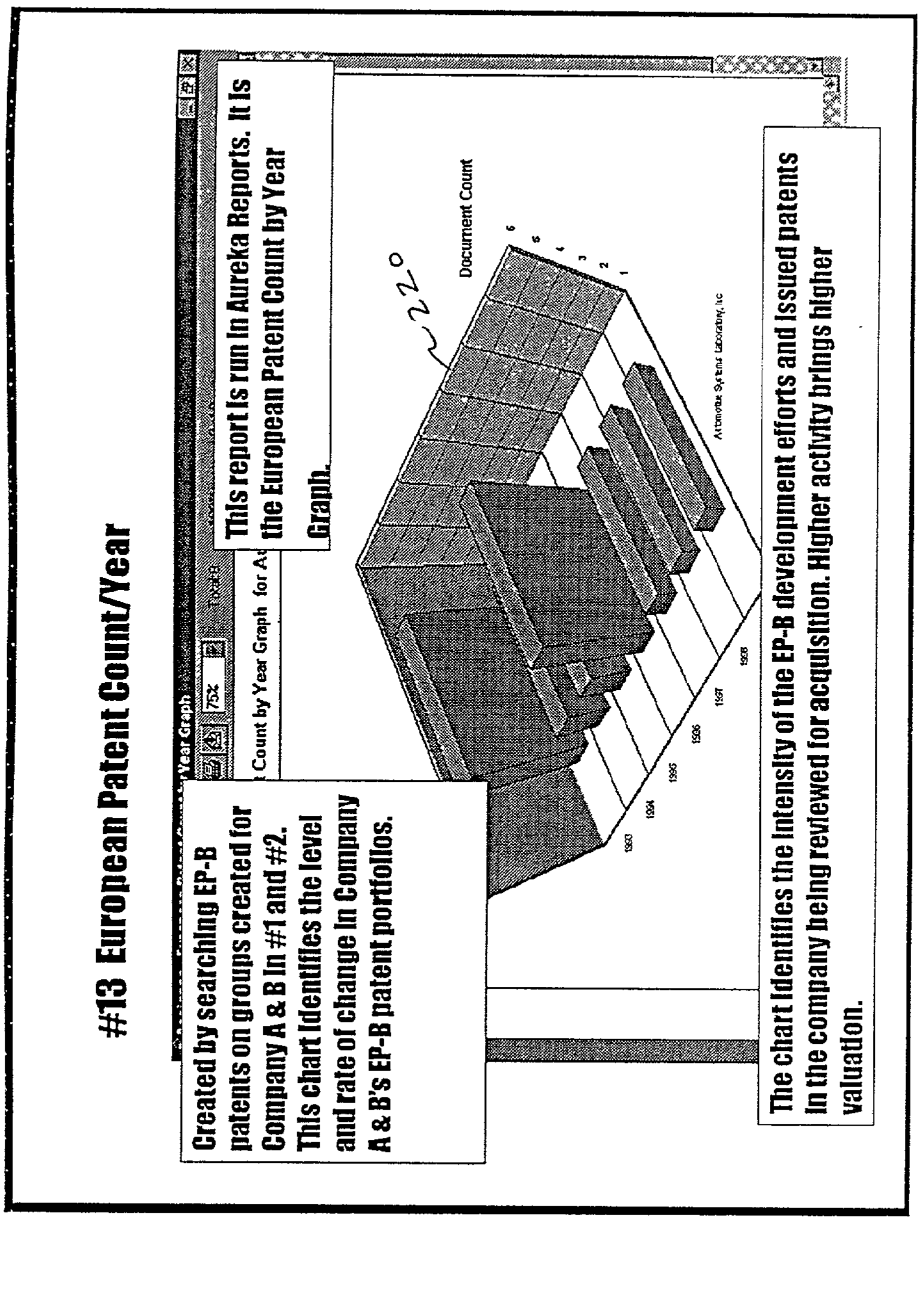
FIG. 32 illustrates the patent count/year facilitating the evaluate/analyze, due diligence and negotiation stages according to an embodiment of the present invention.

FIG. 31 illustrates the patent count/year 220, used in the evaluate/analyze stage 104 and the due diligence stage 106, as Tool 12*b*, entitled "Patent Count/Year." The purpose of Tool 12*b* is to identify companies who have the competence to commercialize competing products to the proposed merger. The patent count/year 220 identifies who has continuously developed the technology. It also identifies the level and rate of change in companies. How the IPAM server works in conjunction with Tool 12*b* is similar to Tool 12*a*, as described above with reference to FIG. 30.

C. Tool 13 and the Evaluate/Analyze Stage, the Due Diligence Stage and the Negotiation Stage FIG. 31 illustrates the patent count/year 220, used in the evaluate/analyze stage 104, the due diligence stage 106 and the negotiation stage 108, as Tool 13, entitled "European Patent Count/Year." The purpose of Tool 13 is to identify the intensity of the European development efforts and issued patents in the company being reviewed for acquisition. In general, higher activity brings higher valuation. Tool 13 identifies the level and rate of change in companies' European patent portfolios. How the IPAM server works in conjunction with Tool 13 is similar to Tool 12*a*, as described above with reference to FIG. 30. Here, the search is conducted on European patents, but is not limited to this.

XI. IPAM SERVER AND APPLICATION COUNT/YEAR

Referring to FIG. 2, the IPAM server works in conjunction with the application count/year 222 to facilitate the due diligence stage 106 and negotiation stage 108 (as Tool 14). In general, the application count/year 222 identifies level and rate of change in patent portfolios.

Figure 33:
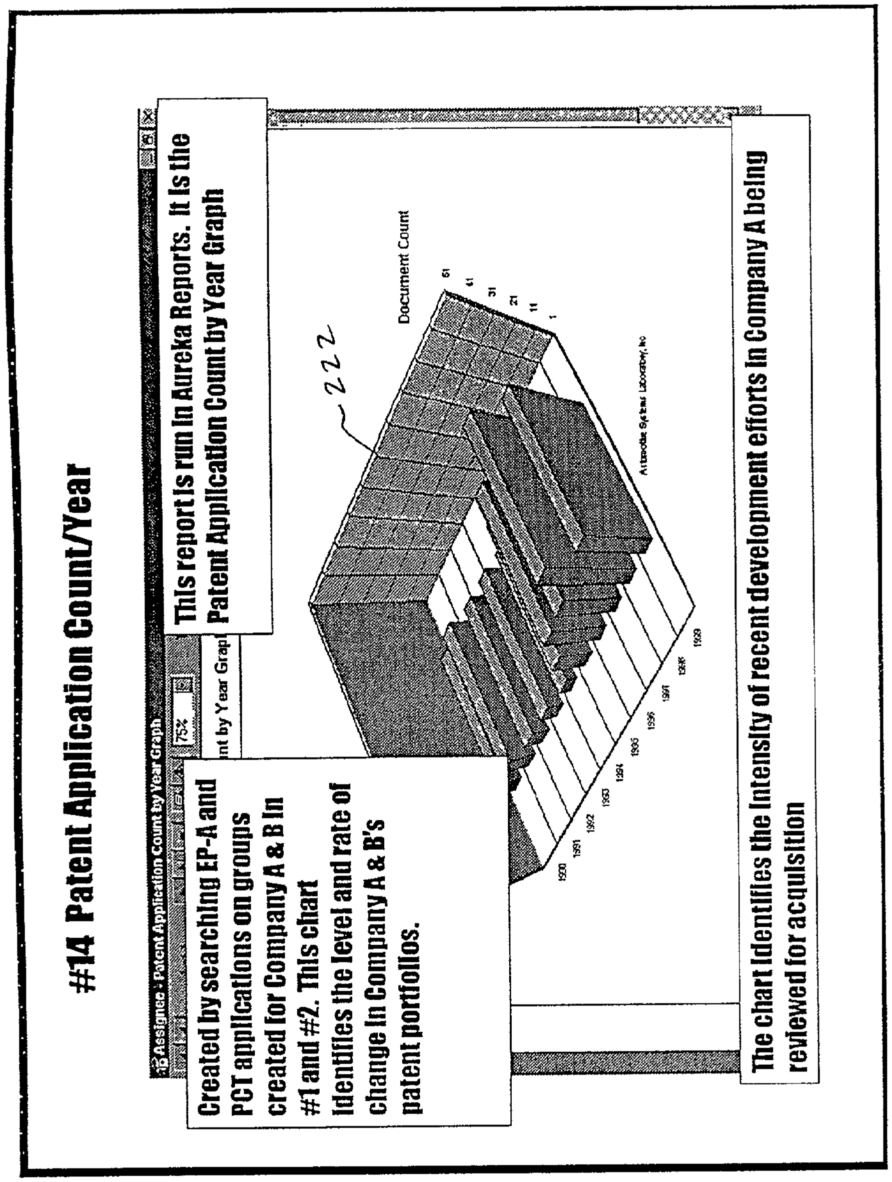
FIG. 33 illustrates the patent application count/year facilitating the due diligence and negotiation stages according to an embodiment of the present invention.

FIG. 33 illustrates the application count/year 222, used in the due diligence stage 106 and the negotiation stage 108, as Tool 14, entitled "Patent Application Count/Year." The purpose of Tool 14 is to identify the intensity of recent development efforts in a company being reviewed for acquisition. The application count/year 222 produced by Tool 14 compares the level and rate of change in one or more companies' patent portfolio. How the IPAM server works in conjunction with the application count/year 222 to aid in the due diligence stage 106 and the negotiation stage 108 is described with reference to FIG. 34. Typically, Tool 14 is initiated by the user selecting an application count/year graph function on the computer screen.

Figure 34:
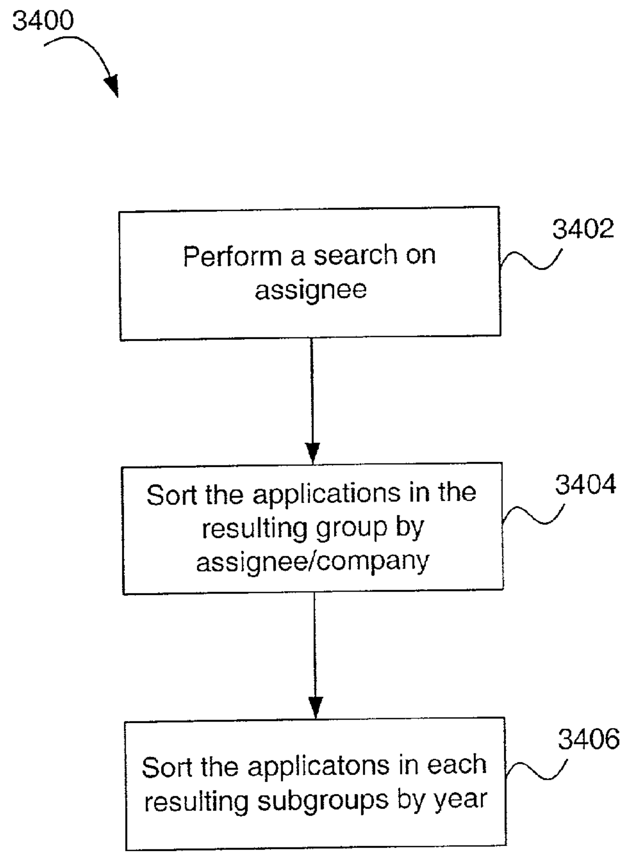
FIG. 34 is a flowchart depicting how the IPAM server works in conjunction with the patent application count/year to aid in the due diligence and negotiation stages according to an embodiment of the present invention.

In FIG. 34, a flowchart 3400 begins at step 3402. In step 3402, in an embodiment of the present invention a user performs a search on the group of published patent applications, but is not limited to this. Here, because the user is just pointing at a broad field, the abstract of each patent is typically the section that is searched, but again is not limited to this. The search performed is typically a boolean and/or natural language search on the assignee to produce a group of published applications. Control passes to step 3404.

In step 3404, the group of published applications that results from step 3402 is further divided into subgroups by assignee/company (the group may contain multiple assignees). Control then passes to step 3406.

In step 3406, the IPAM server is used in conjunction with recent patent applications chart 222 to create a chart that indicates the top assignees/companies in a related area to the product, use and/or technology searched in step 3402. Here, the group of patents produced in step 3402 may be further divided into subgroups, with each subgroup having published applications filed in the same year and related to the idea to produce the application count/year 222 requested by the user. At this point flowchart 3400 ends.

XII. IPAM SERVER AND PATENT AGING GRAPH

Referring to FIG. 2, the IPAM server works in conjunction with the patent aging graph 224 to facilitate the due diligence stage 106 (as Tools 15 and 16) and the negotiation stage 108 (as Tools 15 and 16). In general, the patent aging graph 224 identifies the number of years until patent expiration.

A. Tool 15 and the Due Diligence Stage and the Negotiation Stage

Figure 35:
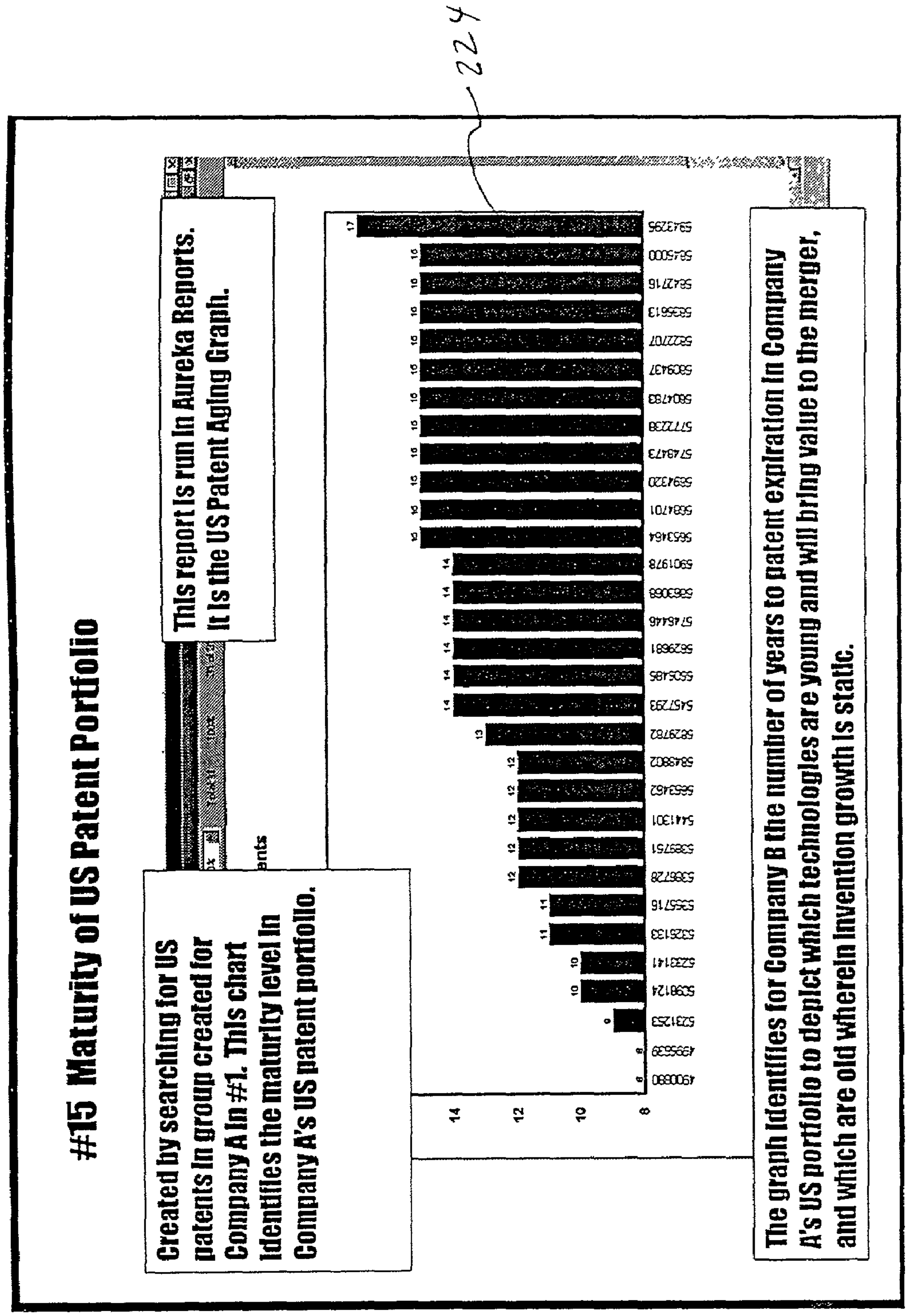
FIG. 35 illustrates the patent aging graph facilitating the due diligence and negotiation stages according to an embodiment of the present invention.

FIG. 35 illustrates the patent aging graph 224, used in the due diligence stage 106 and the negotiation stage 108, as Tool 15, entitled "Maturity of U.S. Patent Portfolio." The purpose of Tool 15 is to identify for one company (e.g., Company B) the number of years to patent expiration in another company's (e.g., Company A's) U.S. patent portfolio to depict which technologies are young and which technologies are old. Technologies that are young tend to bring value to a merger. Technologies that are old, or static, tend not be bring as much value to a merger. How the IPAM server works in conjunction with the patent aging graph 224 to aid in the due diligence stage 106 and the negotiation stage 108 is described next with reference to FIG. 36. Typically, Tool 15 is initiated by the user selecting a patent aging function on the computer screen.

Figure 36:
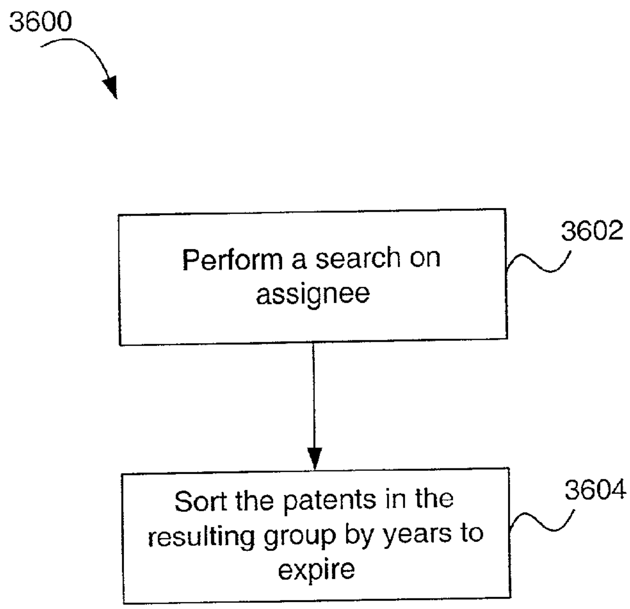
FIG. 36 is a flowchart depicting how the IPAM server works in conjunction with the patent aging graph to aid in the due diligence and negotiation stages according to an embodiment of the present invention.

In FIG. 36, a flowchart 3600 begins at step 3602. In step 3602, in an embodiment of the present invention a user performs a search on the group of all U.S. patents owned by the company. The present invention is not limited to doing the search on U.S. patents, but may include European, Japanese (and other available) patents and/or applications. The search performed is typically a boolean and/or natural language search on assignee. Control passes to step 3604.

In step 3604, the IPAM server sorts the patents in the resulting group from step 3602 by years to expire to produce the patent aging graph 224 requested by the user. At this point flowchart 3600 ends.

B. Tool 16 and the Due Diligence Stage and the Negotiation Stage

Figure 37:
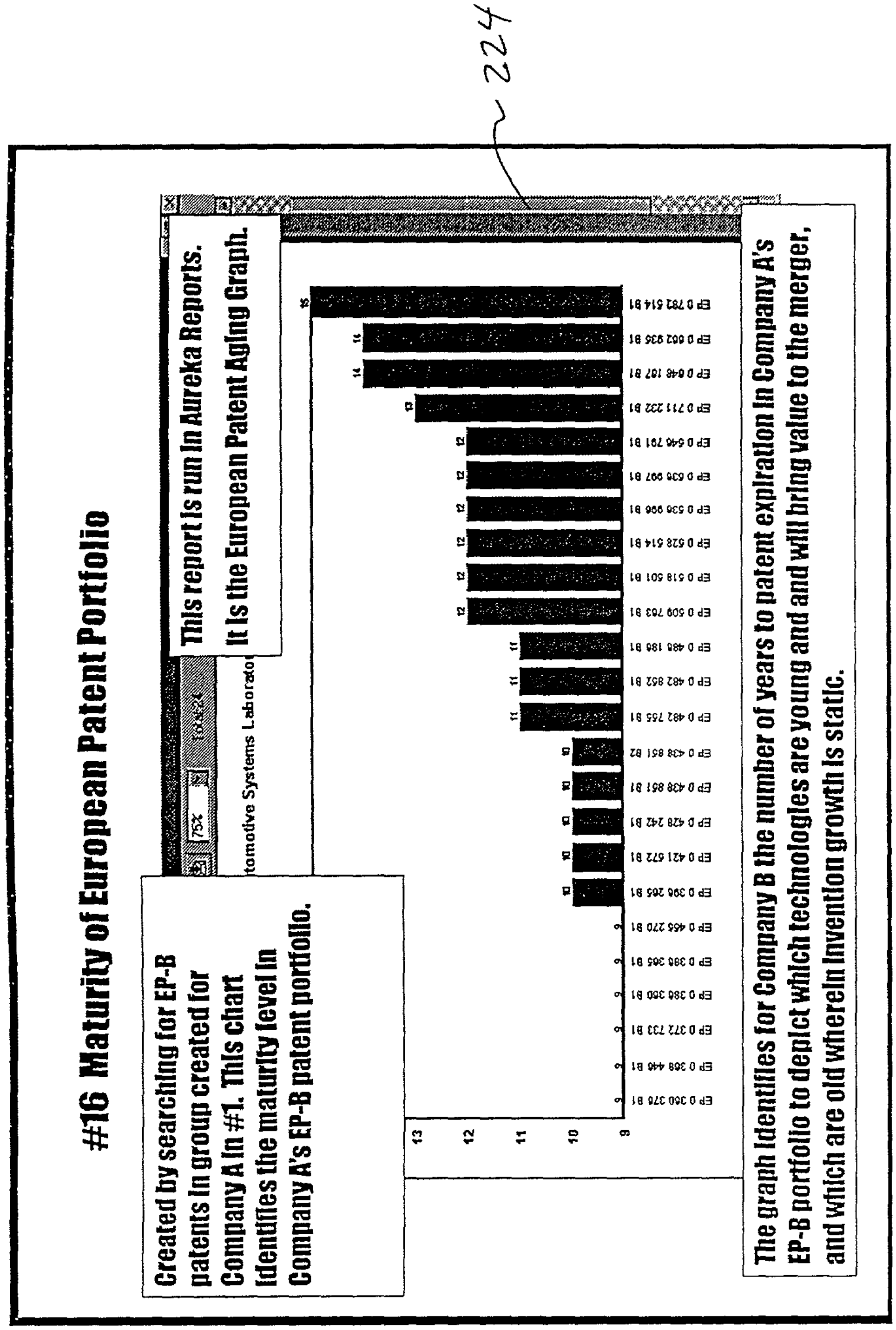
FIG. 37 illustrates the patent aging graph facilitating the due diligence and negotiation stages according to an embodiment of the present invention.

FIG. 37 illustrates the patent aging graph 224, used in the due diligence stage 106 and the negotiation stage 108, as Tool 16, entitled "Maturity of European Patent Portfolio." The purpose of Tool 16 is to identify for one company (e.g., Company B) the number of years to patent expiration in another company's (e.g., Company A's) European patent portfolio to depict which technologies are young and which technologies are old. Technologies that are young tend to bring value to a merger. Technologies that are old, or static, tend not be bring as much value to a merger. How the IPAM server works in conjunction with Tool 16 is similar to Tool 15, as described above with reference to FIG. 36. Here, in an embodiment of the present invention a user performs a search on the group of all European patents and/or applications owned by the company.

XIII. IPAM SERVER AND U.S. PRIMARY CLASS/SUBCLASS

Referring to FIG. 2, the IPAM server works in conjunction with the U.S. primary class/subclass 226 to facilitate the evaluate/analyze stage 104 and the diligence stage 106 (as Tool 19). In general, the U.S. primary class/subclass 226 determines highest patent count by primary class/subclass.

Figure 38:
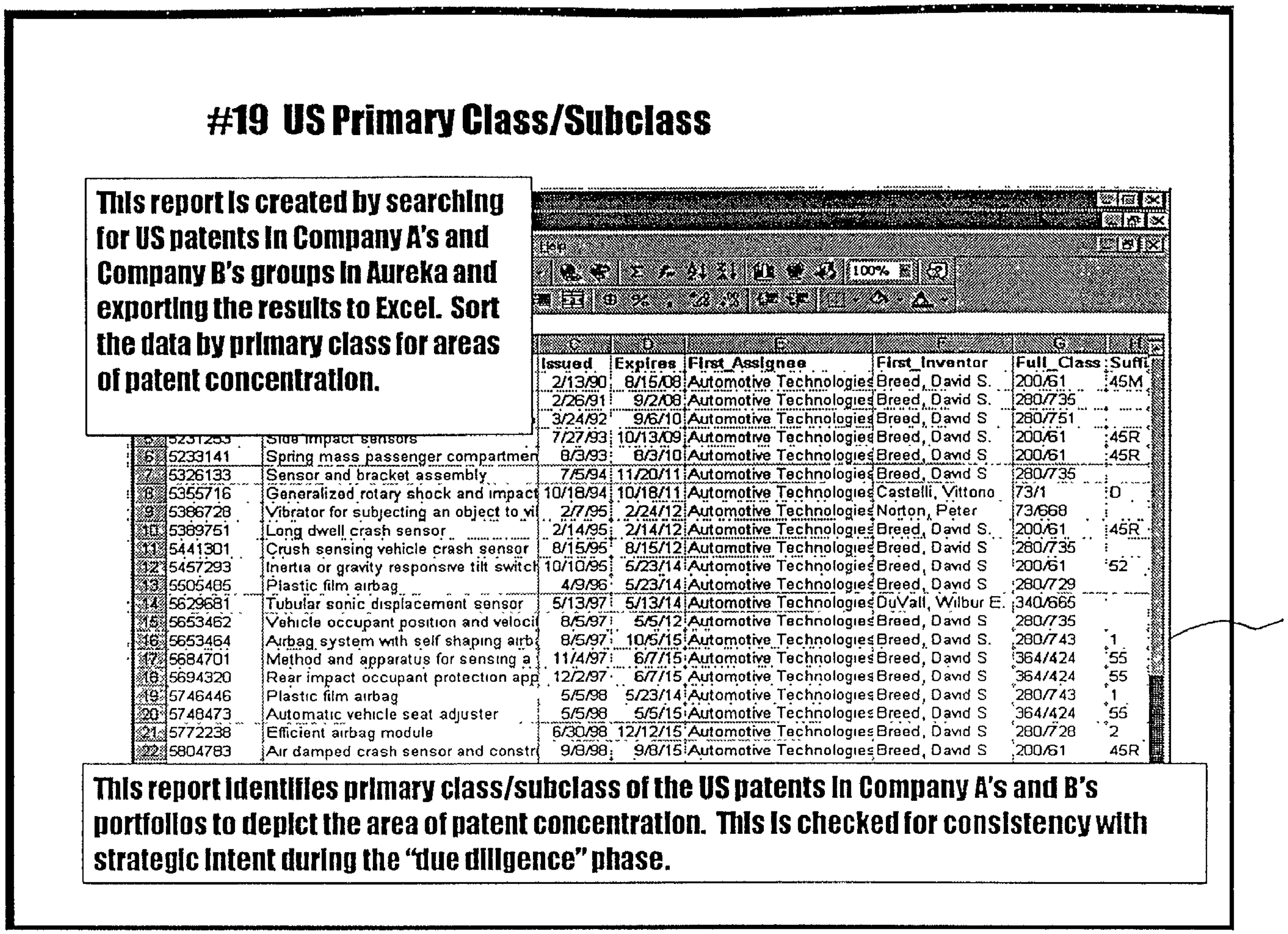
FIG. 38 illustrates the U.S. primary class/subclass facilitating the evaluate/analyze and due diligence stages according to an embodiment of the present invention.

FIG. 38 illustrates the U.S. primary class/subclass 226, used in the evaluate/analyze stage 104 and the diligence stage 106, as Tool 19, entitled "U.S. Primary Class/Subclass." The purpose of Tool 19 is to identify the primary class/subclass of the U.S. patent in one or more companies to depict their area of patent concentration. The area of patent concentration is checked for consistency with the strategic intent during the due diligence stage 106. How the IPAM server works in conjunction with the U.S. primary class/subclass 226 to aid in the evaluate/analyze stage 104 and the due diligence stage 106 is described next with reference to FIG. 39. Typically, Tool 19 is initiated by the user selecting a U.S. primary class/subclass function on the computer screen.

Figure 39:
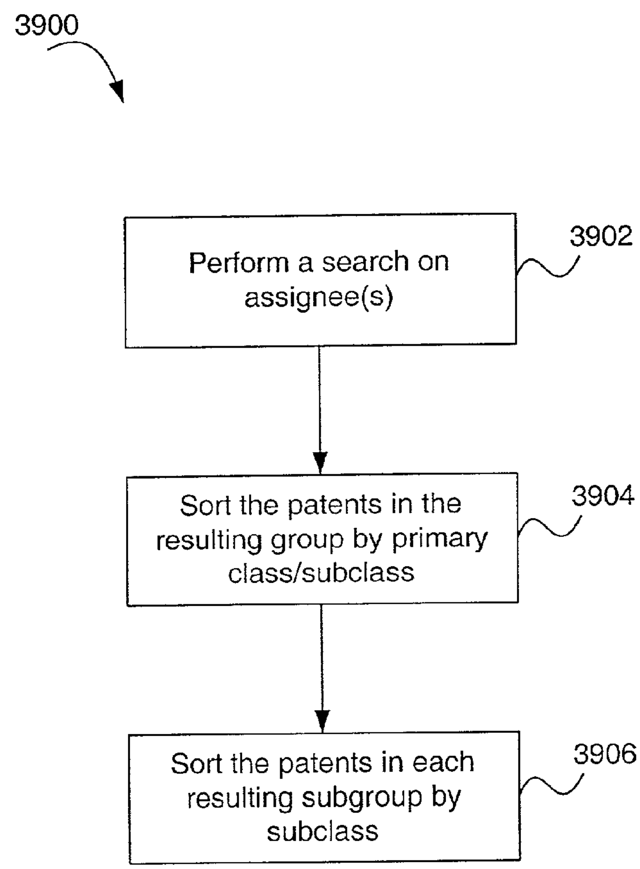
FIG. 39 is a flowchart depicting how the IPAM server works in conjunction with the U.S. primary class/subclass to aid in the evaluate/analyze and due diligence stages according to an embodiment of the present invention.

In FIG. 39, a flowchart 3900 begins at step 3902. In step 3902, in an embodiment of the present invention a user performs a search on the group of all U.S. patents owned by the company. The present invention is not limited to doing the search on U.S. patents, but may include European, Japanese (and other available) patents and/or applications. The search performed is typically a boolean and/or natural language search on an assignee. Control passes to step 3904.

In step 3904, the IPAM server sorts the patents in the resulting group from step 3902 by primary class/subclass to produce the U.S. primary class/subclass 226 requested by the user. At this point flowchart 3900 ends.

XIV. IPAM SERVER AND INTERNATIONAL PATENT CLASS

Referring to FIG. 2, the IPAM server works in conjunction with the international patent class 228 to facilitate the evaluate/analyze stage 104 and the diligence stage 106 (as Tool **19*a*). In general, the international patent class 228** determines highest patent count by international class.

FIG. 40 illustrates the International patent class 228, used in the evaluate/analyze stage 104 and the diligence stage 106, as Tool **19*a*, entitled "International Patent Class." The purpose of Tool 19***a* is to identify the international class of the European patents in one or more companies' portfolios to depict the area of patent concentration. The area of patent concentration is checked for consistency with the strategic intent during the due diligence stage 106. How the IPAM server works in conjunction with the international patent class 228 to aid in the evaluate/analyze stage 104 and the due diligence stage 106 is described next with reference to FIG. 41. Typically, Tool 19*a* is initiated by the user selecting a international patent class function on the computer screen.

Figure 41:
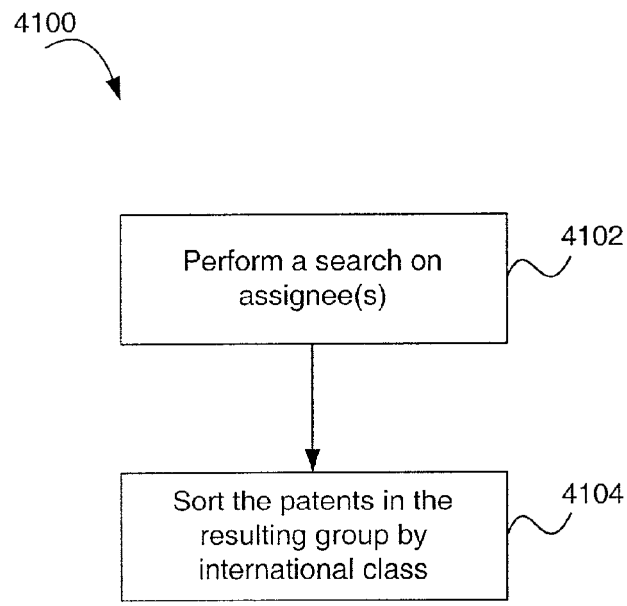
FIG. 41 is a flowchart depicting how the IPAM server works in conjunction with the international patent class to aid in the evaluate/analyze and due diligence stages according to an embodiment of the present invention.

In FIG. 41, a flowchart 4100 begins at step 4102. In step 4102, in an embodiment of the present invention a user performs a search on the group of all European patents owned by the company. The present invention is not limited to doing the search on European patents, but may include any patent and/or application that is classified by an international class. The search performed is typically a boolean and/or natural language search on an assignee. Control passes to step 4104.

In step 4104, the IPAM server sorts the patents in the resulting group from step 4102 by international class to produce the international patent class 228 requested by the user. At this point flowchart 4100 ends.

XV. IPAM SERVER AND ASSIGNEE PATENT COUNT REPORT BY PRIMARY CLASS/SUBCLASS

Referring to FIG. 2, the IPAM server works in conjunction with the assignee patent count report by primary class/subclass 230 to facilitate the evaluate/analyze stage 104 (as Tools 20 and 23) and the negotiation stage 108 (as Tool 20). In general, the assignee patent count report by primary class/subclass 230 provides an overall view of competitive landscape for both companies by class/subclass.

A. Tool 20 and the Evaluate/Analyze Stage and the Negotiation Stage

Figure 42:
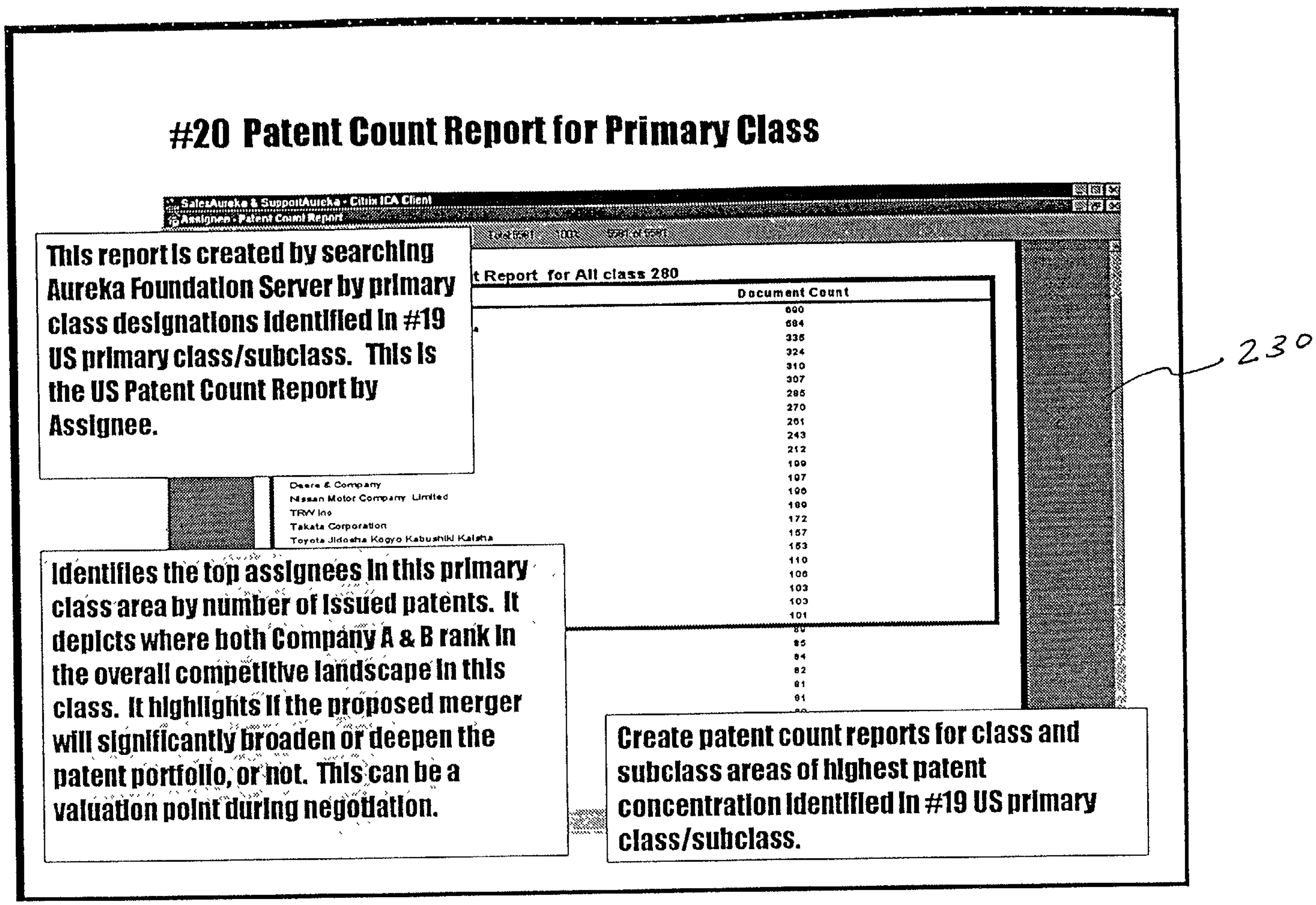
FIG. 42 illustrates the assignee patent count report by primary class/subclass facilitating the evaluate/analyze and negotiation stages according to an embodiment of the present invention.

FIG. 42 illustrates the assignee patent count report by primary class/subclass 230, used in the evaluate/analyze stage 104 and the negotiation stage 108, as Tool 20, entitled "Patent Count Report for Primary Class." The purpose of Tool 20 is to identify the top assignees in a primary class area by number of issued patents. This information represents where two or more companies rank in their overall competitive landscape in the particular patent class. In addition, Tool 20 highlights if a proposed merger will significantly broaden or deepen the patent portfolio, or not. This information may aid in a valuation point during negotiation of a merger or acquisition. How the IPAM server works in conjunction with the assignee patent count report by primary class/subclass 230 to aid in the evaluate/analyze stage 104 and the negotiation stage 108 is described next with reference to FIG. 43. Typically, Tool 20 is initiated by the user selecting an assignee patent count report by primary class/subclass function on the computer screen.

Figure 43:
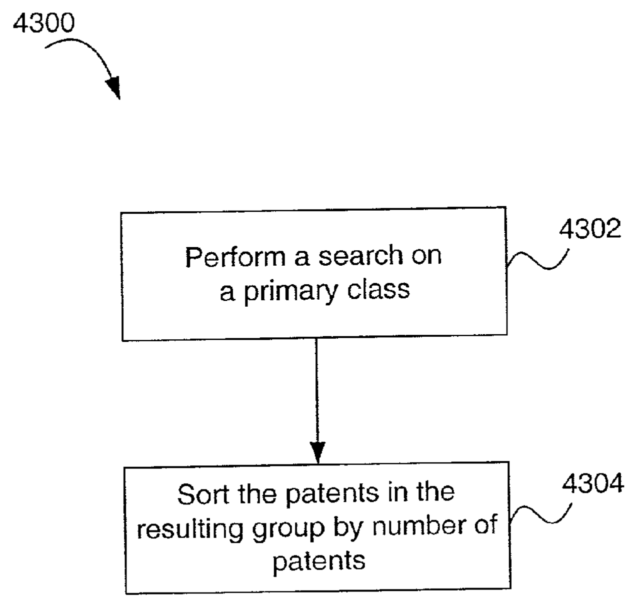
FIG. 43 is a flowchart depicting how the IPAM server works in conjunction with the assignee patent count report by primary class/subclass to aid in the evaluate/analyze and negotiation stages according to an embodiment of the present invention.

In FIG. 43, a flowchart 4300 begins at step 4302. In step 4302, in an embodiment of the present invention a user performs a search on the group of all U.S. patents owned by the one or more companies (i.e., assignees). The present invention is not limited to doing the search on U.S. patents, but may include European, Japanese (and other available) patents and/or applications. The search performed is typically a boolean and/or natural language search on a primary class. Control passes to step 4304.

In step 4304, the IPAM server sorts the patents in the resulting group from step 4302 by number of patents. In an embodiment of the present invention, the IPAM server may also sort each resulting subgroup by number of patents. At this point flowchart 4300 ends.

B. Tool 23 and the Evaluate/Analyze Stage and the Negotiation Stage

Figure 44:
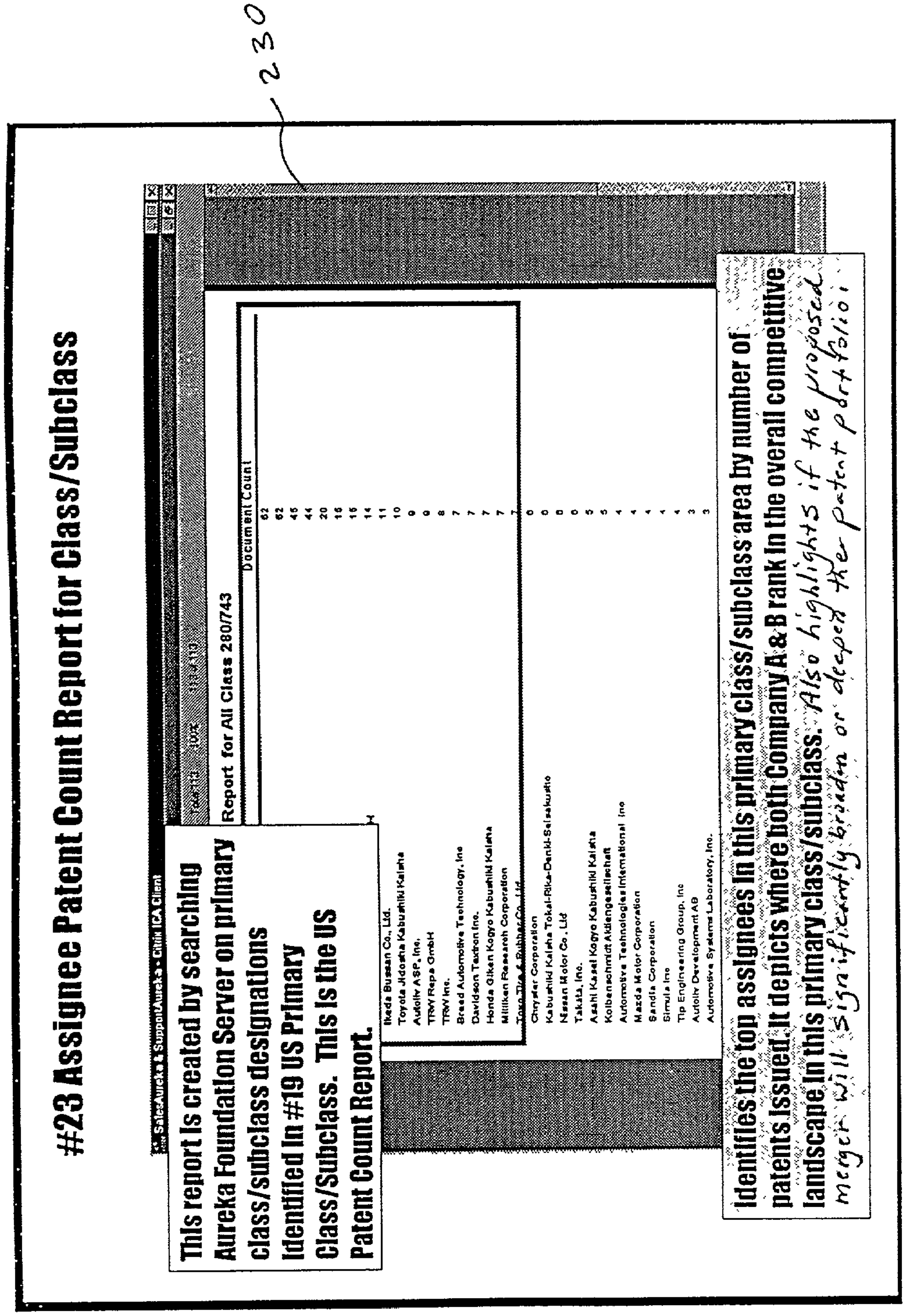
FIG. 44 illustrates the assignee patent count report by primary class/subclass facilitating the evaluate/analyze and negotiation stages according to an embodiment of the present invention.

FIG. 44 illustrates the assignee patent count report by primary class/subclass 230, used in the evaluate/analyze stage 104 and the negotiation stage 108 as Tool 23, entitled "Assignee Patent Count Report for Class/Subclass." The purpose of Tool 23 is to identify the top assignees in a particular class/subclass area by number of patents issued. In addition, Tool 23 highlights if the proposed merger will significantly broaden or deepen the patent portfolio. This can be a valuation point during the negotiation stage 108. This information represents where two or more companies rank in their overall competitive landscape in the particular patent class/subclass area. How the IPAM server works in conjunction with Tool 23 is similar to Tool 20, as described above with reference to FIG. 43.

XVI. IPAM SERVER AND PATENT COUNT GRAPH BY NUMBER OF PATENTS

Referring to FIG. 2, the IPAM server works in conjunction with the patent count graph by number of patents 232 to facilitate the evaluate/analyze stage 104 (as Tools 21 and 24). In general, the patent count graph by number of patents 232 provides an overall view of competitive landscape for both companies by number of issued patents.

A. Tool 24 and the Evaluate/Analyze Stage

Figure 46:
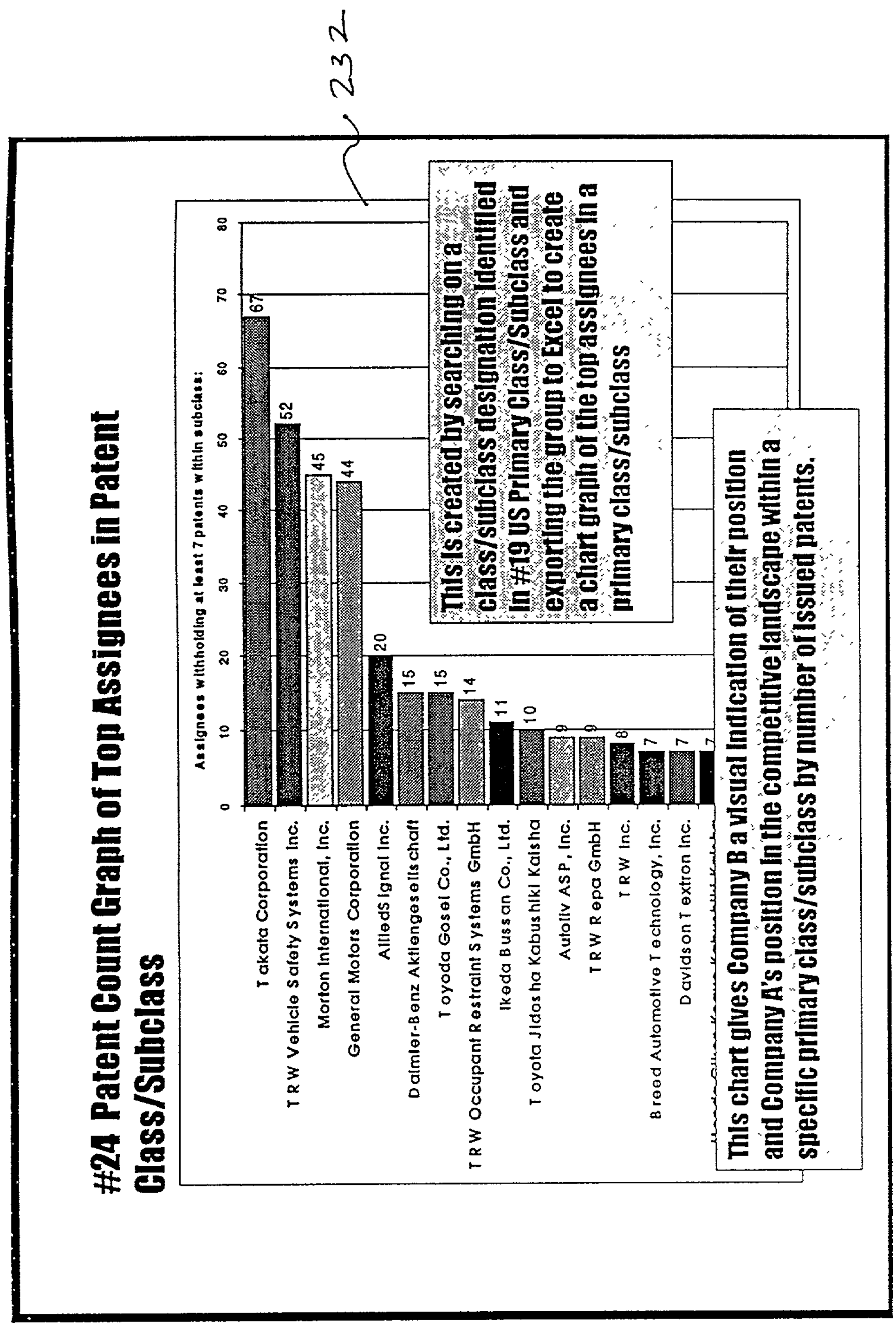
FIG. 46 illustrates the patent count graph by number of patents facilitating the evaluate/analyze stage according to an embodiment of the present invention.

FIG. 46 illustrates the patent count graph by number of patents 232 used in the evaluate/analyze stage 104 as Tool 24, entitled "Patent Count Graph of Top Assignees in Patent Class/Subclass." The purpose of Tool 24 is to give one company a visual indication of its position and another company's position in the competitive landscape, in a specific primary class/subclass by number of issued patents. Here, the top 15-20 assignees from the patent count report for class/subclass to graph. How the IPAM server works in conjunction with the patent count graph by number of patents 232 to aid in the evaluate/analyze stage 104 is described next with reference to FIG. 47. Typically, Tool 24 is initiated by the user selecting a patent count graph by number of patents function on the computer screen.

Figure 47:
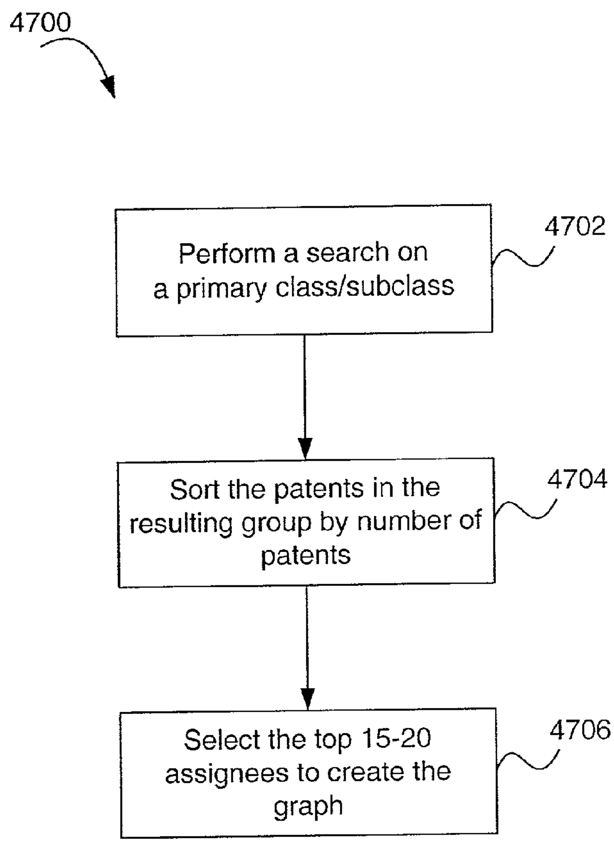
FIG. 47 is a flowchart depicting how the IPAM server works in conjunction with the patent count graph by number of patents to aid in the evaluate/analyze stage according to an embodiment of the present invention.

In FIG. 47, a flowchart 4700 begins at step 4702. In step 4702, in an embodiment of the present invention a user performs a search on the group of all U.S. patents owned by the one or more companies (i.e., assignees). The present invention is not limited to doing the search on U.S. patents, but may include European, Japanese (and other available) patents and/or applications. The search performed is typically a boolean and/or natural language search on a primary class Control passes to step 4704.

In step 4704, the IPAM server sorts the patents in the resulting grouping (or in each resulting subgroup) from step 4704 by number of patents. Control passes to step 4706.

In step 4706, the IPAM server selects the top 15-20 assignees to produce the patent count graph by number of patents 232 requested by the user. At this point flowchart 4700 ends.

B. Tool 21 and the Evaluate/Analyze Stage

Figure 45:
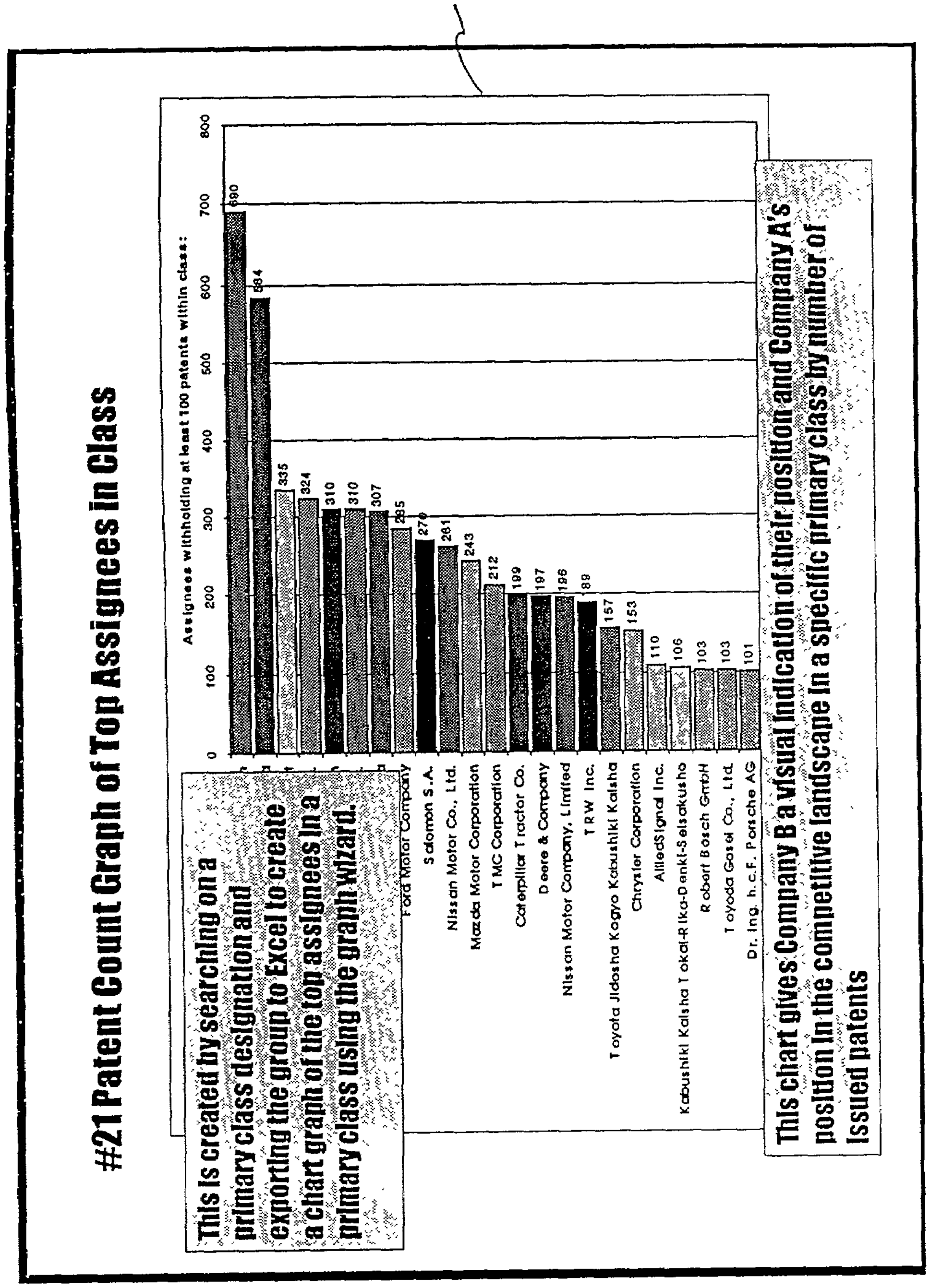
FIG. 45 illustrates the assignee patent count report by primary class/subclass facilitating the evaluate/analyze stage according to an embodiment of the present invention.

FIG. 45 illustrates the patent count graph by number of patents 232 used in the evaluate/analyze stage 104 as Tool 2, entitled "Patent Count Graph of Top Assignees in Class." The purpose of Tool 21 is to give one company a visual indication of its position and another company's position in the competitive landscape, in a specific primary class by number of issued patents. How the IPAM server works in conjunction with Tool 21 is similar to Tool 24, as described above with reference to FIG. 47.

XVII. IPAM SERVER AND TOP ASSIGNEES PRIMARY CLASS/SUBCLASS BY PERCENT OF TOTAL

Referring to FIG. 2, the IPAM server works in conjunction with the top assignees primary class/subclass by percent of total 234 to facilitate the evaluate/analyze stage 104 (as Tools 22 and 25). In general, the top assignees primary class/subclass by percent of total 234 provides an overall view of competitive landscape for both companies by percent of total in class/subclass.

A. Tool 22 and the Evaluate/Analyze Stage

Figure 48:
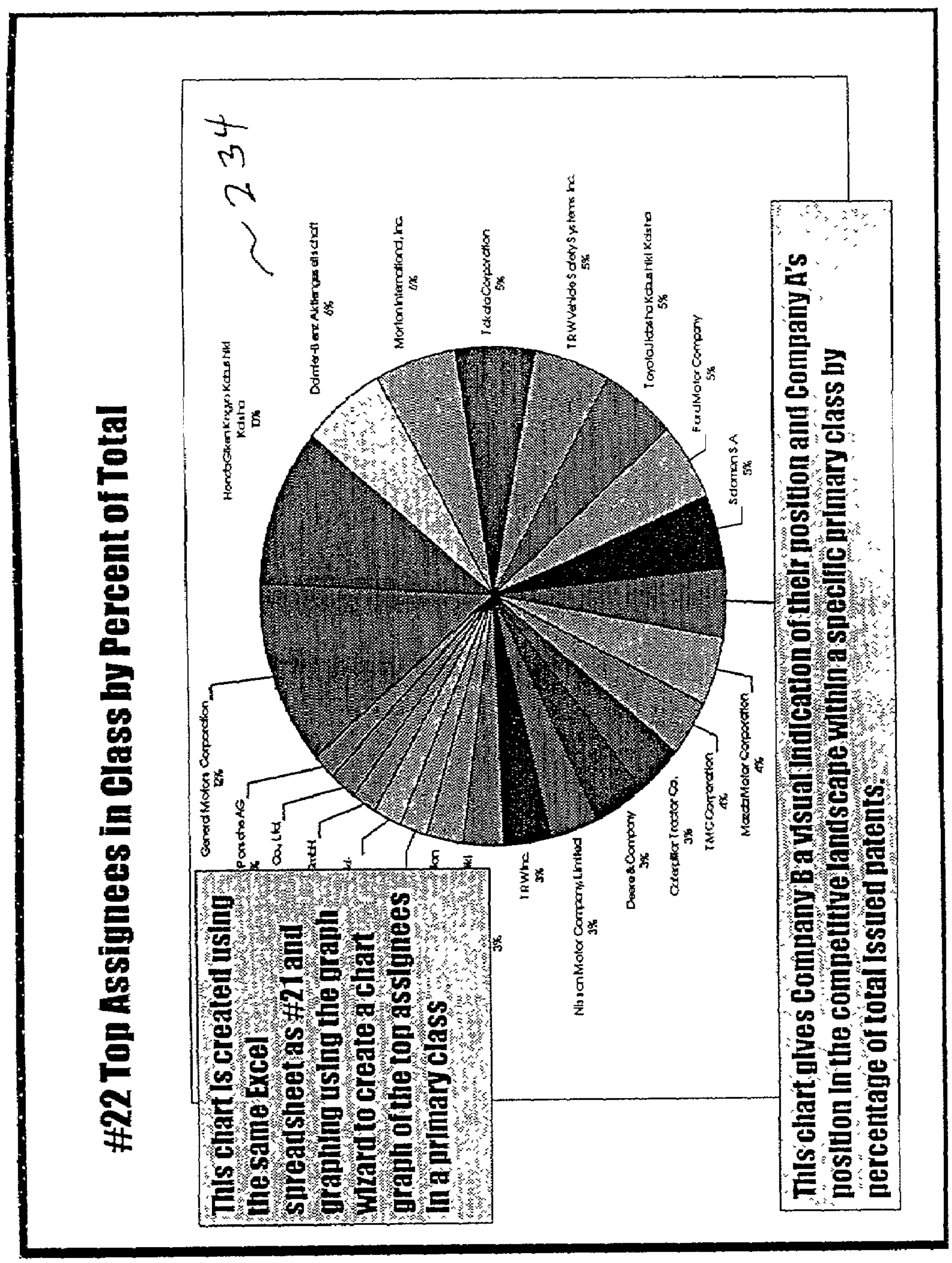
FIG. 48 illustrates the top assignees primary class/subclass by percent of total facilitating the evaluate/analyze stage according to an embodiment of the present invention.

FIG. 48 illustrates the top assignees primary class/subclass by percent of total 234 used in the evaluate/analyze stage 104 as Tool 22, entitled "Top Assignees in Class by Percent of Total." The purpose of Tool 22 is to give one company a visual indication of its position and another company's position in the competitive landscape, within a specific primary class/subclass by percentage of total issued patents. How the IPAM server works in conjunction with the top assignees primary class/subclass by percent of total 234 to aid in the evaluate/analyze stage 104 is described next with reference to FIG. 49.

Figure 49:
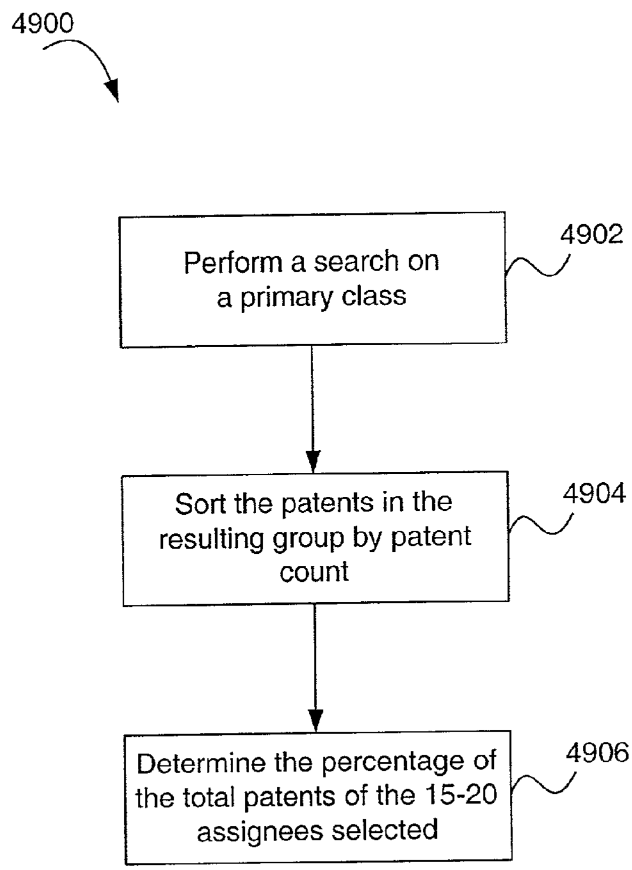
FIG. 49 is a flowchart depicting how the IPAM server works in conjunction with the top assignees primary class/subclass by percent of total to aid in the evaluate/analyze stage according to an embodiment of the present invention.

In FIG. 49, a flowchart 4900 begins at step 4902. In step 4902, in an embodiment of the present invention a user performs a search on the group of all U.S. patents owned by the one or more companies (i.e., assignees). The present invention is not limited to doing the search on U.S. patents, but may include European, Japanese (and other available) patents and/or applications. The search performed is typically a boolean and/or natural language search on a primary class Control passes to step 4904.

In step 4904, the IPAM server sorts the patents in the resulting group from step 4902 by patent count. Control then passes to step 4906.

In step 4906, the IPAM server determines the percentage of total patents for the top 15-20 assignees produced in step 4904 to produce the top assignees primary class/subclass by percent of total 234 requested by the user. At this point flowchart 4900 ends.

B. Tool 25 and the Evaluate/Analyze Stage

Figure 50:
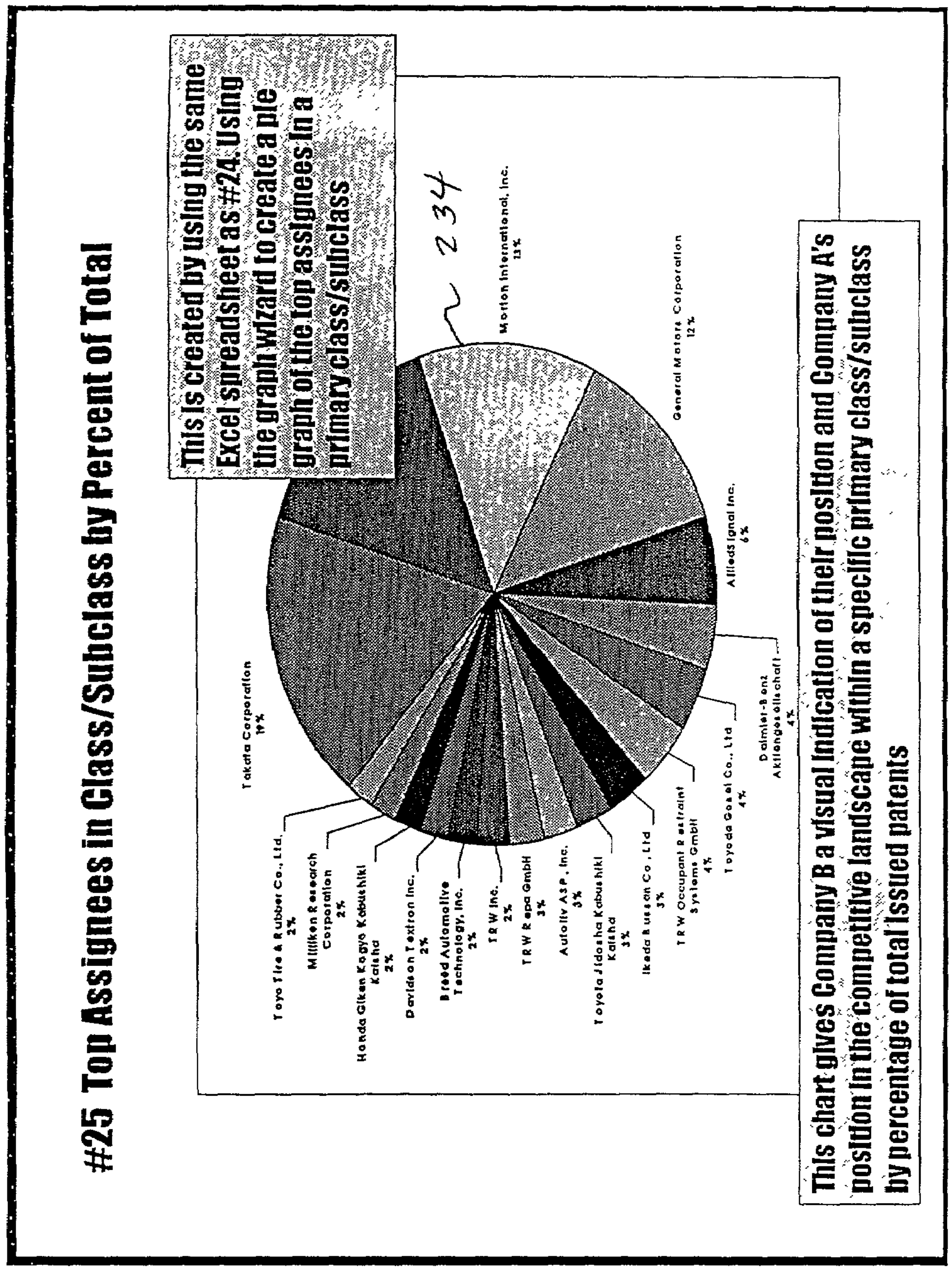
FIG. 50 illustrates the top assignees primary class/subclass by percent of total facilitating the evaluate/analyze stage according to an embodiment of the present invention.

FIG. 50 illustrates the top assignees primary class/subclass by percent of total 234 used in the evaluate/analyze stage 104 as Tool 25, entitled "Top Assignees in Class/Subclass by Percent of Total." The purpose of Tool 25 is to give one company a visual indication of its position and another company's position in the competitive landscape, within a specific primary class/subclass by percentage of total issued patents. How the IPAM server works in conjunction with Tool 25 is similar to Tool 22, as described above with reference to FIG. 49.

XVIII. IPAM SERVER AND MONTHS TO ISSUE

Referring to FIG. 2, the IPAM server works in conjunction with the months to issue 236 to facilitate the due diligence stage 106 and the negotiation stage 108 (as Tool 11). In general, the months to issue 236 indicates whether all of the art is at the negotiation table.

Figure 51:
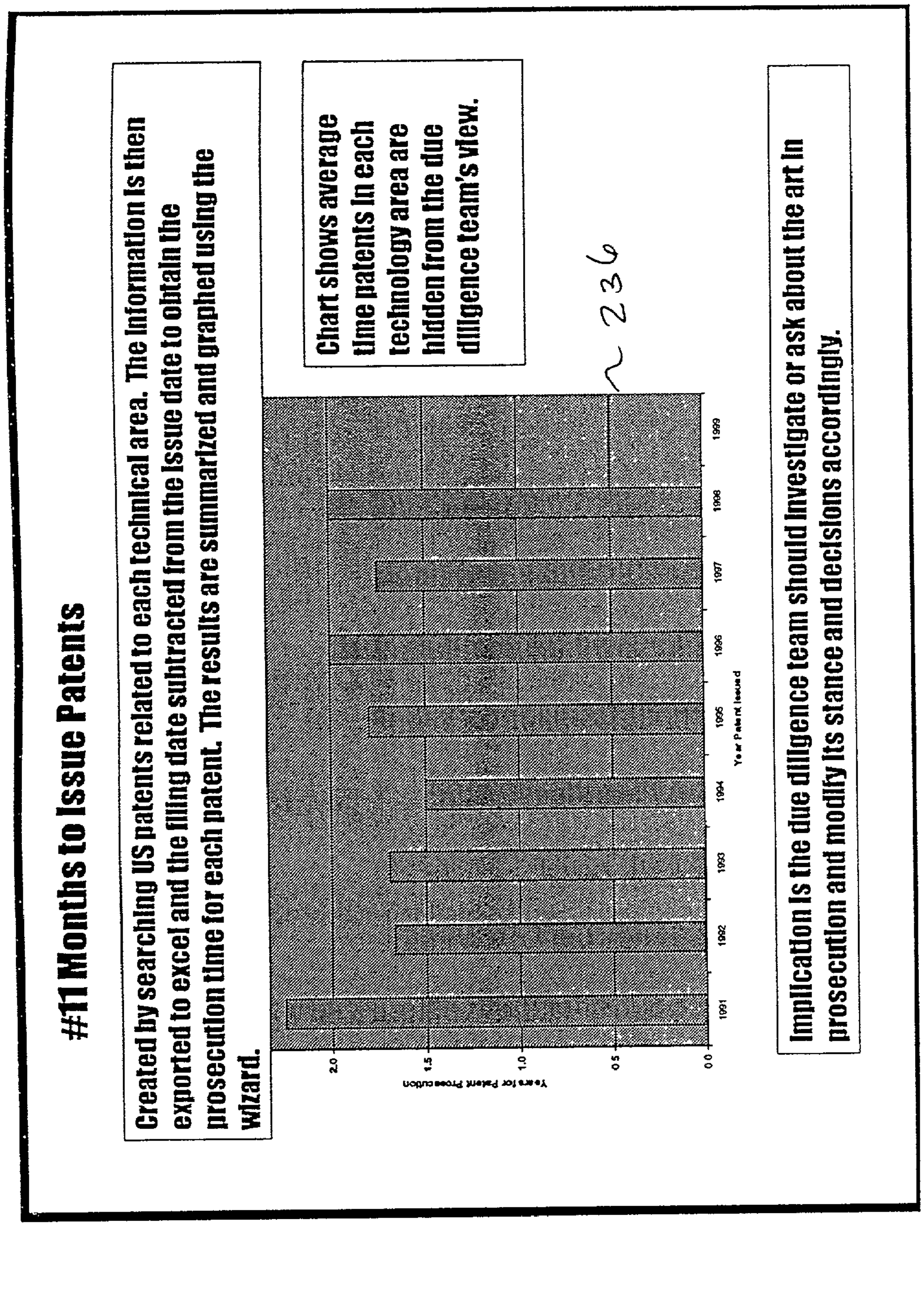
FIG. 51 illustrates the months to issue patents facilitating the due diligence and negotiation stages according to an embodiment of the present invention.

FIG. 51 illustrates months to issue 236 used in the due diligence stage 106 and in the negotiation stage 108 as Tool 11, entitled "Months to Issue Patents." The implication of Tool 11 in FIG. 51 is to allow the due diligence (or negotiation) team to investigate or ask about the art in prosecution and modify its stance and decisions accordingly. Tool 11 illustrates the average time patents in each technology area are hidden from the due diligence (or negotiation) team's view. How the IPAM server works in conjunction with the months to issue 236 to aid in the due diligence stage 106 and the negotiation stage 108 is described next with reference to FIG. 52. Typically, Tool 11 is initiated by the user selecting a months to issue function on the computer screen.

Figure 52:
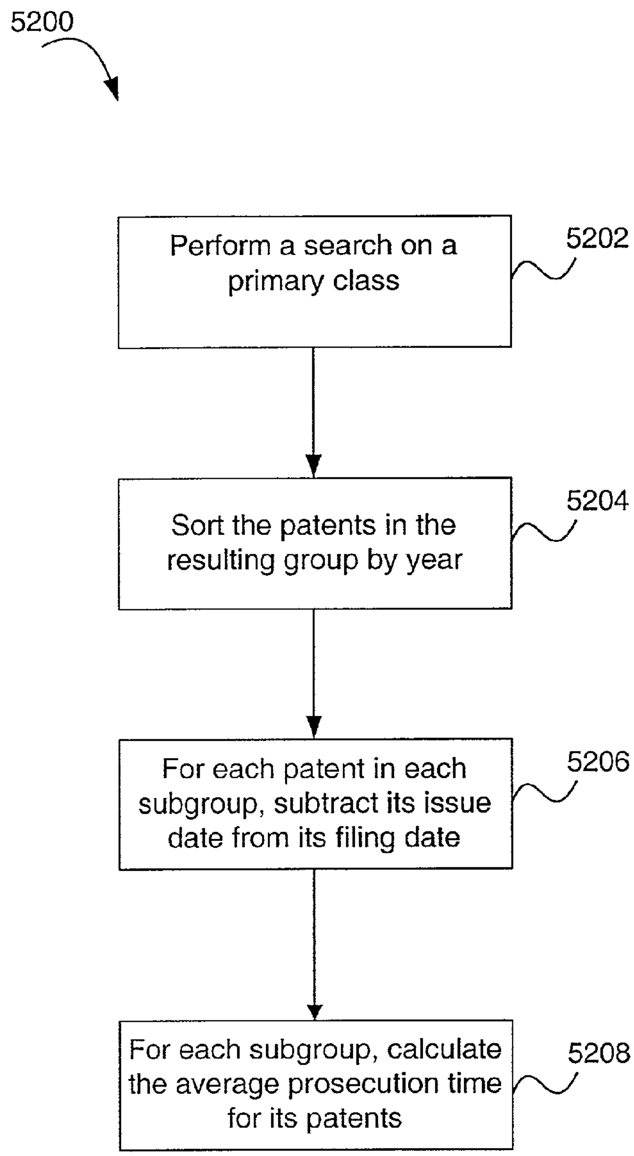
FIG. 52 is a flowchart depicting how the IPAM server works in conjunction with the months to issue patents to aid in the due diligence and negotiation stages according to an embodiment of the present invention.

In FIG. 52, a flowchart 5200 begins at step 5202. In step 5202, in an embodiment of the present invention a user performs a search on the group of all U.S. patents. The present invention is not limited to doing the search on U.S. patents, but may include European, Japanese (and other available) patents and/or applications. The search performed is typically a boolean and/or natural language search on a primary class. Control passes to step 5204.

In step 5204, the IPAM server sorts the patents in the resulting group from step 5202 by year to create subgroups of patents. Control passes to step 5206.

In step 5206, the IPAM server, for each patent in each of the subgroups created in step 5204, subtracts the patent's issue date from its filing date. Control then passes to step 5208.

In step 5208, the IPAM server calculates, for each subgroup of patents, the average prosecution time for its patents and displays the results to the user to produce the months to issue 236 requested by the user. Flowchart 5200 ends at this point.

XIX. IPAM SERVER AND FEATURES GROUPING

Referring to FIG. 2, the IPAM server works in conjunction with the features grouping 238 to facilitate the due diligence stage 106 and the negotiation stage 108 (as Tool 31) and to facilitate the evaluate/analyze stage 104 and the negotiation stage 108 (as Tool 31A). In general, the features grouping 238 indicates whether certain products and/or services are covered by patents.

Figure 53:
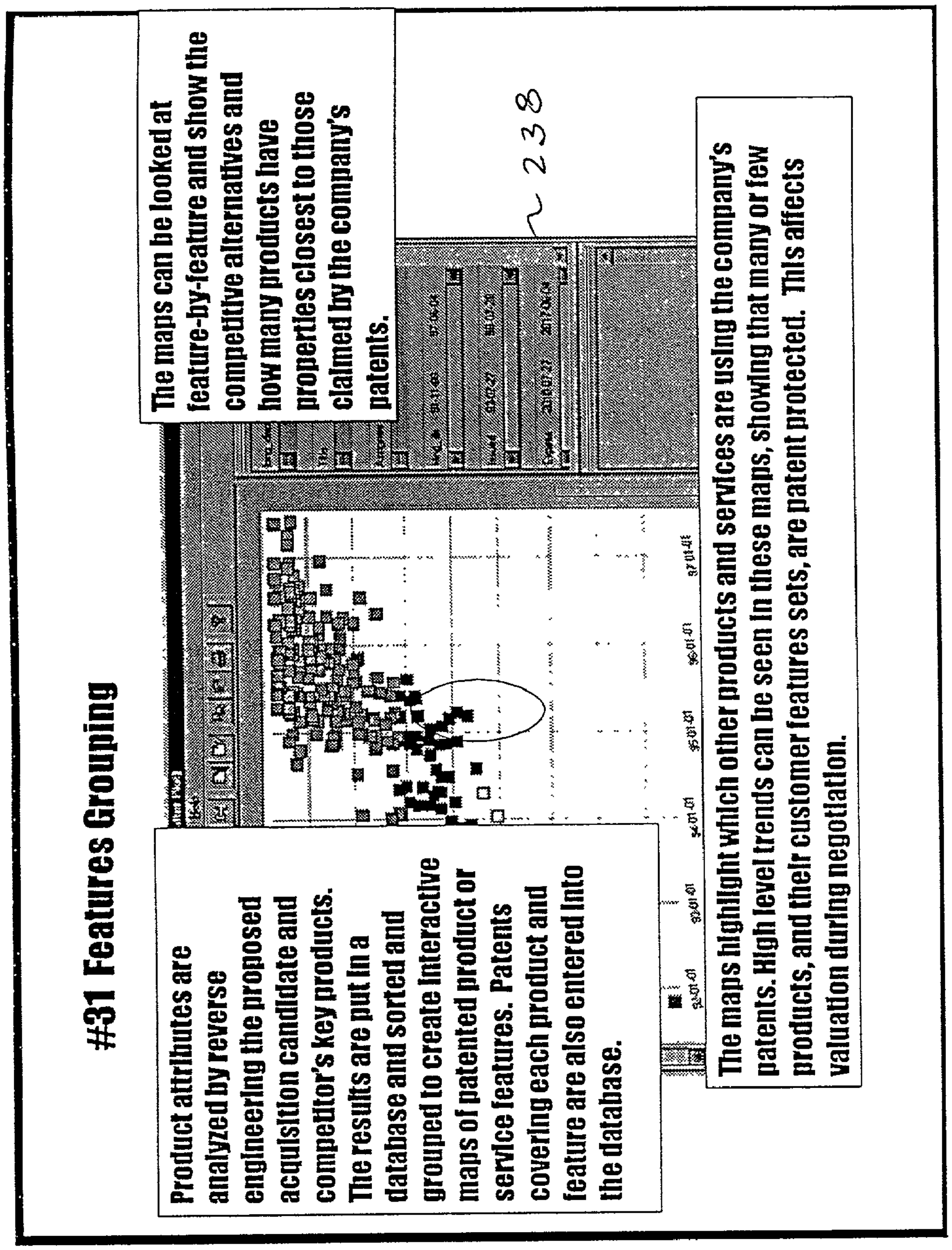
FIG. 53 illustrates the features grouping facilitating the due diligence and negotiation stages according to an embodiment of the present invention.

FIG. 53 illustrates the features grouping 238 used in the due diligence stage 106 and the negotiation stage 108 as Tool 31, entitled "Features Grouping." The purpose of Tool 31 highlights which other products and services are using the company's patents. High level trends can be seen in these maps, showing that many or few products, and their customer features sets, are patent protected. This information affects the valuation during negotiation. In addition, the features grouping 238 produces a map that can be viewed feature-by-feature and show competitive alternatives and how many products have properties closest to those claimed by the company's patents. How the IPAM server works in conjunction with the features grouping 238 to aid in the general management of a business as Tools 31 and 31A is described next with reference to FIG. 54. Typically, Tool 31 is initiated by the user selecting a features grouping function on the computer screen.

Figure 54:
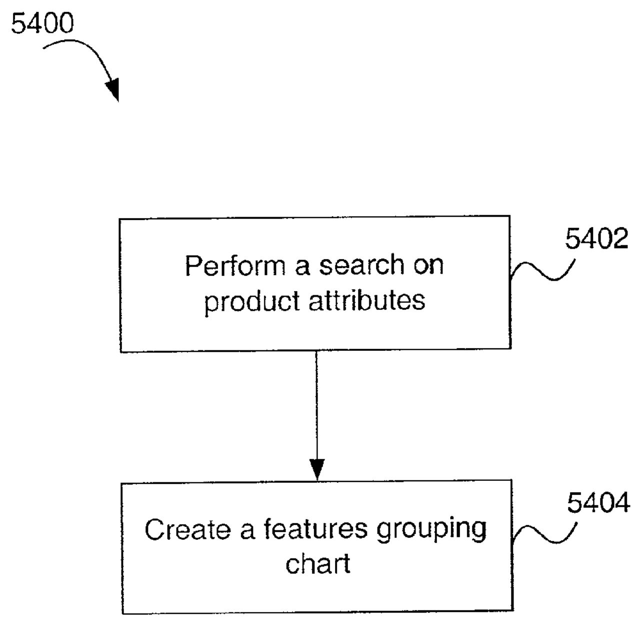
FIG. 54 is a flowchart depicting how the IPAM server works in conjunction with the features grouping to aid in the due diligence and negotiation stages according to an embodiment of the present invention.

In FIG. 54, a flowchart 5400 begins at step 5402. In step 5402, in an embodiment of the present invention a user performs a search on the groups of patents covering the company's own products and competitor's products and/or product attributes analyzed by reverse engineering the company's own products and competitor's products. The present invention is not limited to doing the search on this, but may include other available documents and/or attributes. Here, the search performed is typically a boolean and/or natural language search on product attributes which are sorted and grouped to create interactive maps of patented products or service features. Control passes to step 5404.

In step 5404, the IPAM server is used in conjunction with the features grouping chart 204 to create a chart showing groupings of product and/or service features. Flowchart 5400 ends at this point.

XX. IPAM SERVER AND DOCUMENT ANNOTATION

Referring to FIG. 2, the IPAM server works in conjunction with the document annotation 240 to facilitate the evaluate/analyze stage 104, the due diligence stage 106 and the negotiation stage 108 (as Tool 32). In general, the document annotation 240 allows for the immediate, linked, and searchable documentation of facts and ideas.

Figure 55:
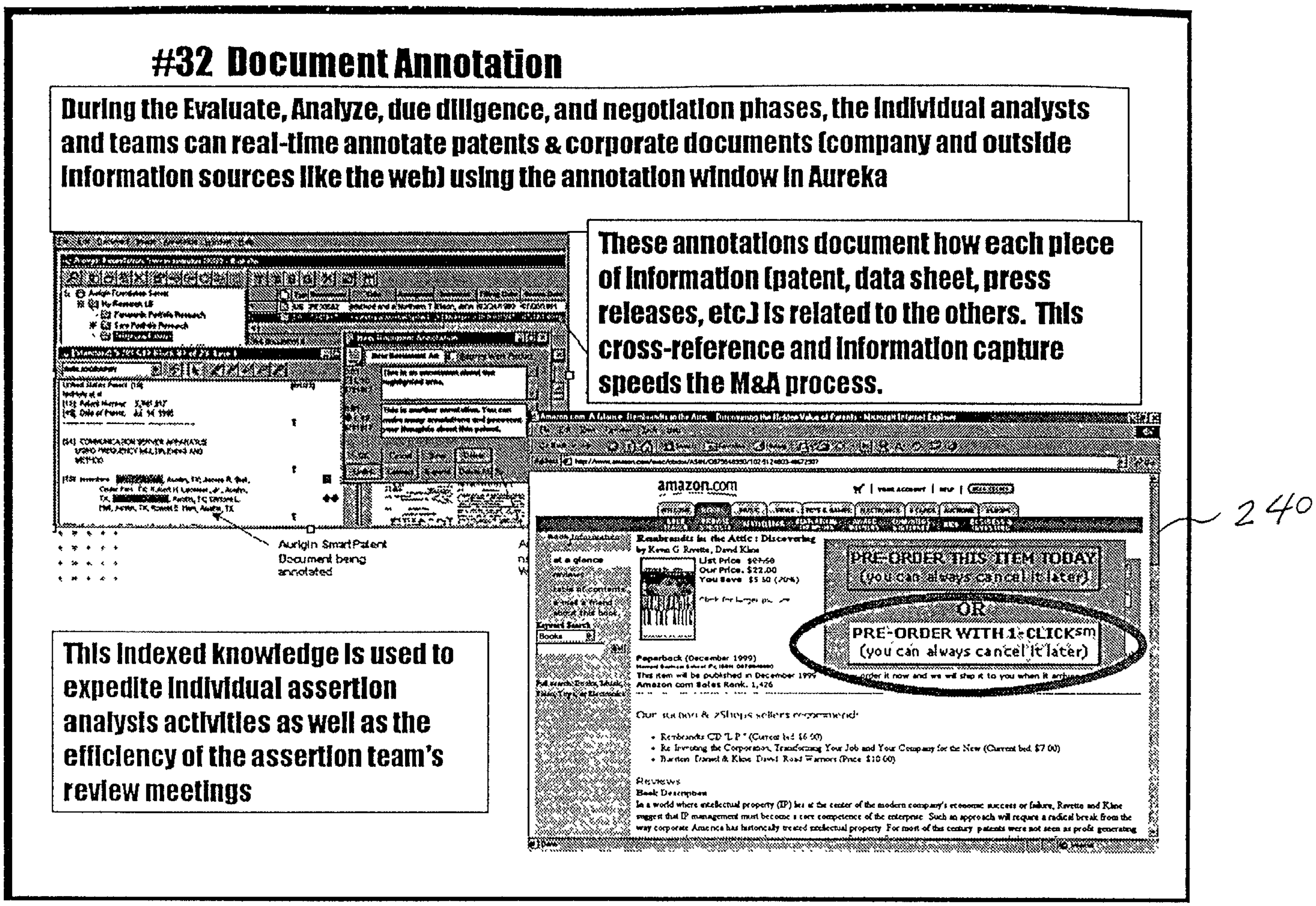
FIG. 55 illustrates the document annotation facilitating the evaluate/analyze, due diligence and negotiation stages according to an embodiment of the present invention.

FIG. 55 illustrates the document annotation 240 used in the evaluate/analyze stage 104, the due diligence stage 106 and the negotiation stage 108 as Tool 32, entitled "Document Annotation." The purpose of Tool 32 is to facilitate indexed knowledge that can be used to expedite individual assertion analysis activities as well as the efficiency of the assertion team's review meetings. These annotations document how each piece of information (patent, data sheet, press release, etc.) is related to the others. This cross-reference and information capture speeds the merger and acquisition process. How the IPAM server works in conjunction with the document annotation 240 to aid in the evaluate/analyze stage 104, the due diligence stage 106 and the negotiation stage 108 is described next with reference to FIG. 56. Typically, Tool 32 is initiated by the user selecting a document annotation function on the computer screen.

Figure 56:
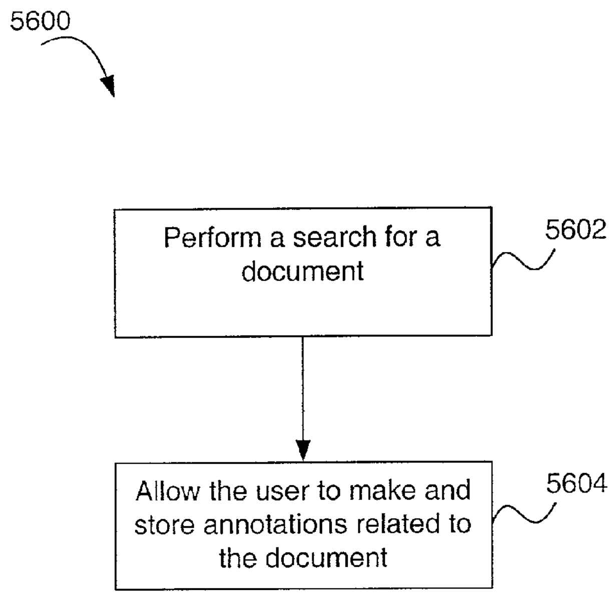
FIG. 56 is a flowchart depicting how the IPAM server works in conjunction with the document annotation to aid in the evaluate/analyze, due diligence and negotiation stages according to an embodiment of the present invention.

In FIG. 56, a flowchart 5600 begins at step 5602. In step 5602, in an embodiment of the present invention a user performs a search on the groups of patents and/or corporate documents, but is not limited to this. The search performed is typically a boolean and/or natural language search on the product, use and/or technology to produce a group of patents and/or corporate documents. Control passes to step 5604.

In step 5604, the IPAM server allows the user to make and store annotations on one or more of the patents and/or corporate documents in the group produced by step 5602. Flowchart 5600 ends at this point.

XXI. IPAM SERVER AND INVENTOR PATENT COUNT/ASSIGNEE

Referring to FIG. 2, the IPAM server works in conjunction with the inventor patent count/assignee 242 to facilitate the evaluate/analyze stage 104 (as Tools 27 and 28), the due diligence stage 106 (as Tools 27 and 28) and the negotiation stage 108 (as Tools 27 and 28). In general, the inventor patent count/assignee 242 determines whether there are joint development agreements/ventures which may impact a possible merger.

Figure 57:
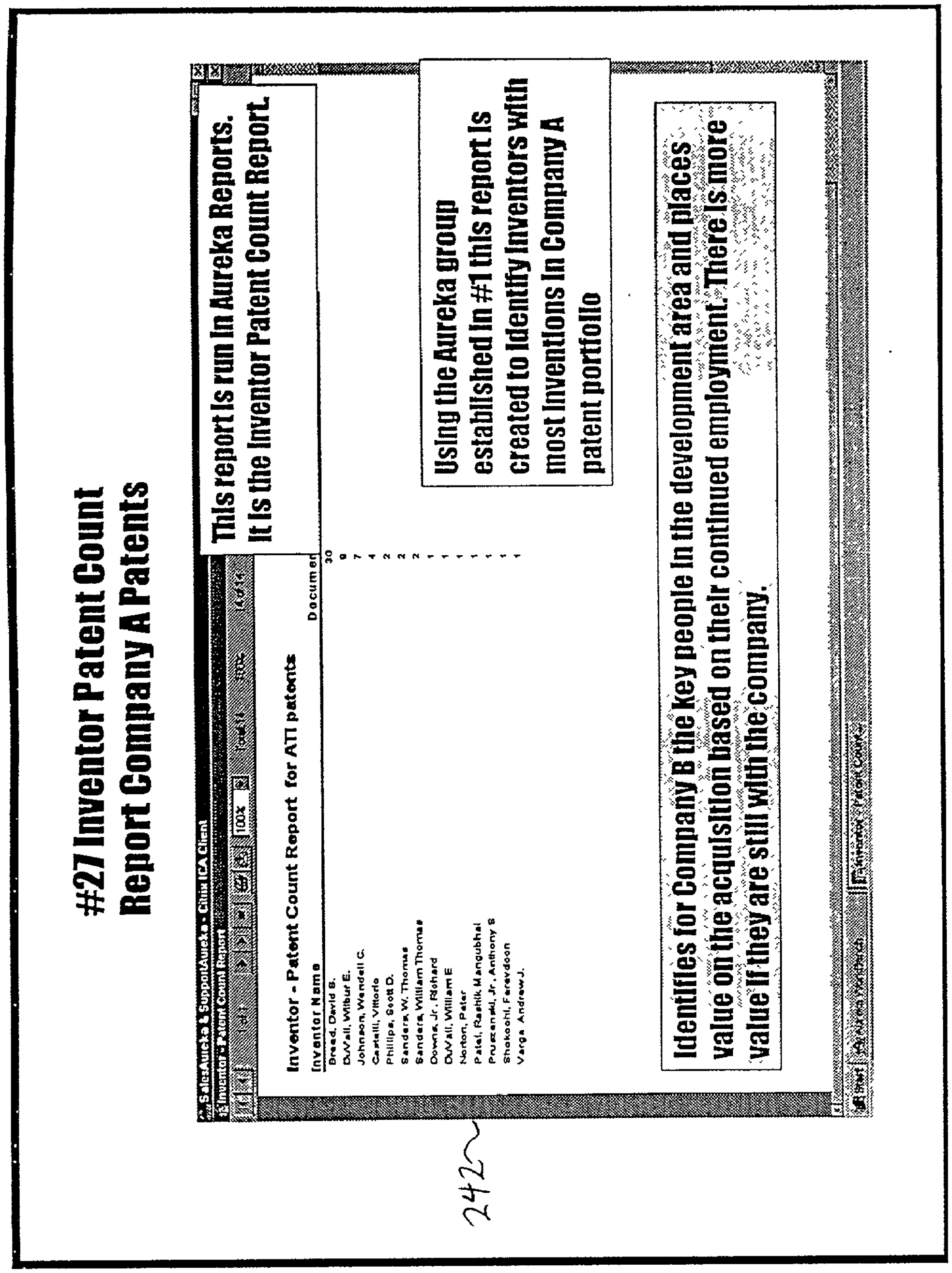
FIG. 57 illustrates the inventor patent count/assignee facilitating the evaluate/analyze, due diligence and negotiation stages according to an embodiment of the present invention.

A. Tool 27 and the Evaluate/analyze Stage, the Due Diligence Stage and the Negotiation Stage FIG. 57 illustrates the inventor patent count/assignee 242 used in the evaluate/analyze stage 104, the due diligence stage 106 and the negotiation stage 108 as Tool 27, entitled "Inventor Patent Count Report Company A Patents." The purpose of Tool 27 is to identify for Company B the key people in the development area. This helps to place value on the acquisition based on the continued employment of the key people identified. How the IPAM server works in conjunction with the inventor patent count/assignee 242 to aid in the evaluate/analyze stage 104, the due diligence stage 106 and the negotiation stage 108 is described next with reference to FIG. 58. Typically, Tool 27 is initiated by the user selecting a inventor patent count/assignee function on the computer screen.

Figure 58:
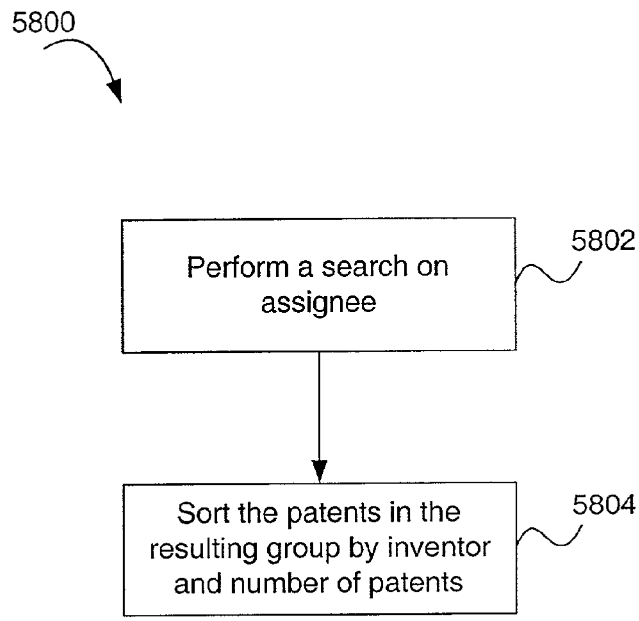
FIG. 58 is a flowchart depicting how the IPAM server works in conjunction with the inventor patent count/assignee to aid in the evaluate/analyze, due diligence and negotiation stages according to an embodiment of the present invention.

In FIG. 58, a flowchart 5800 begins at step 5802. In step 5802, in an embodiment of the present invention a user performs a search on the groups of Company A's patents and corporate documents, but is not limited to this. The search performed is typically a boolean and/or natural language search on assignee. Control passes to step 5804.

In step 5804, the IPAM server sorts the group of resulting patents and/or corporate documents by inventor and number of patents to produce the inventor patent count/assignee 242 requested by the user. Flowchart 5800 ends at this point.

Figure 59:
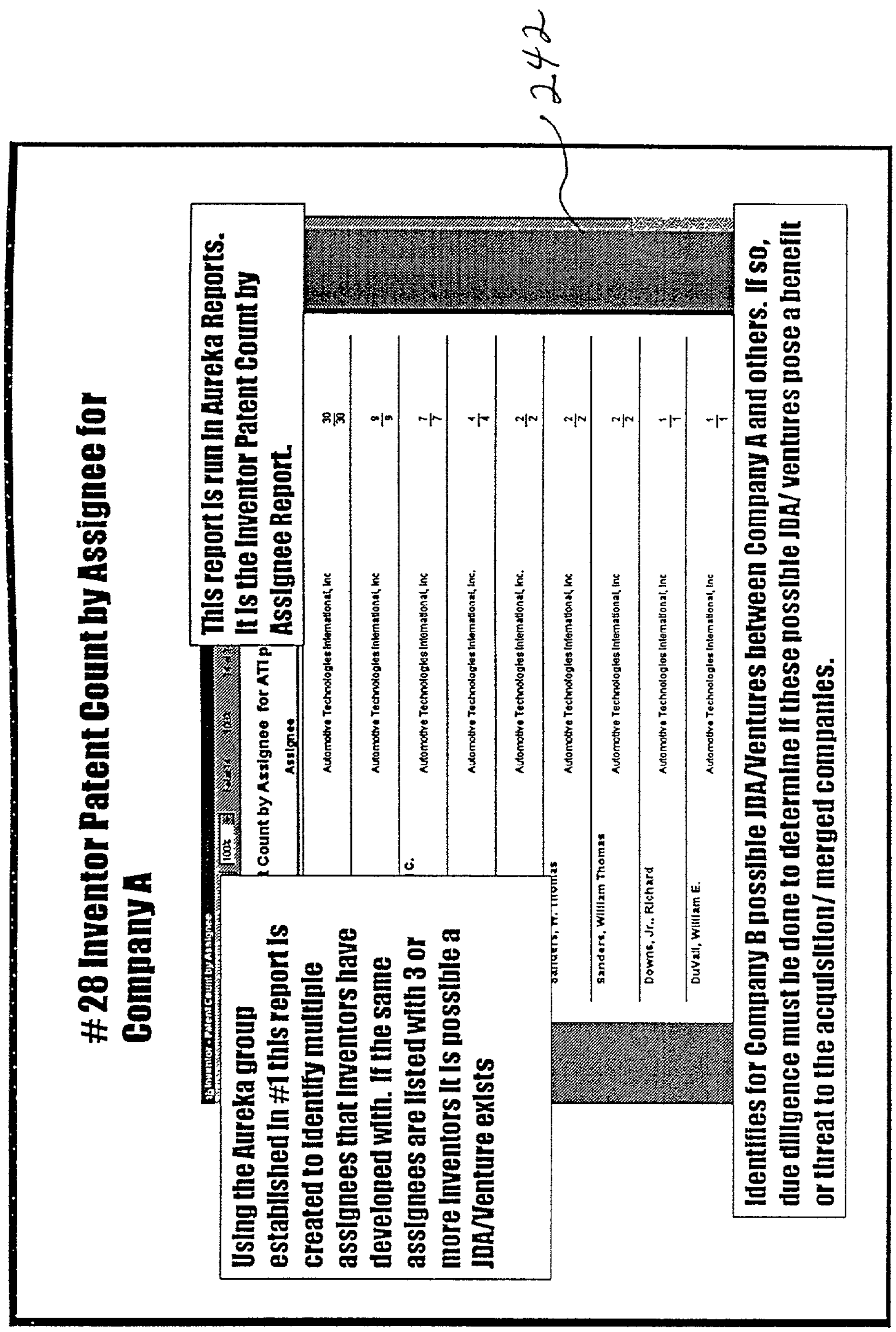
FIG. 59 illustrates the inventor patent count/assignee facilitating the evaluate/analyze, due diligence and negotiation stages according to an embodiment of the present invention.

B. Tool 28 and the Evaluate/analyze Stage, the Due Diligence Stage and the Negotiation Stage FIG. 59 illustrates the inventor patent count/assignee 242 used in the evaluate/analyze stage 104, the due diligence stage 106 and the negotiation stage 108 as Tool 28, entitled "Inventor Patent Count by Assignee for Company A." The purpose of Tool 28 is to identify for Company B possible joint development agreements/ventures between Company A and others. If such joint development agreements/ventures exist, then due diligence must be done to determine if these possible joint development agreements/ventures pose a benefit or threat to the acquisition or merged companies. Here, multiple assignees that an inventor has developed with is revealed. How the IPAM server works in conjunction with Tool 28 is similar to Tool 27, as described above with reference to FIG. 58.

XXII. IPAM SERVER AND INVENTOR PATENT COUNT GRAPH

Referring to FIG. 2, the IPAM server works in conjunction with the inventor patent count graph 244 to facilitate the due diligence stage 106 and the negotiation stage 108 (as Tool 29). In general, the inventor patent count graph 244 identifies inventors with the most inventions in a portfolio.

Figure 60:
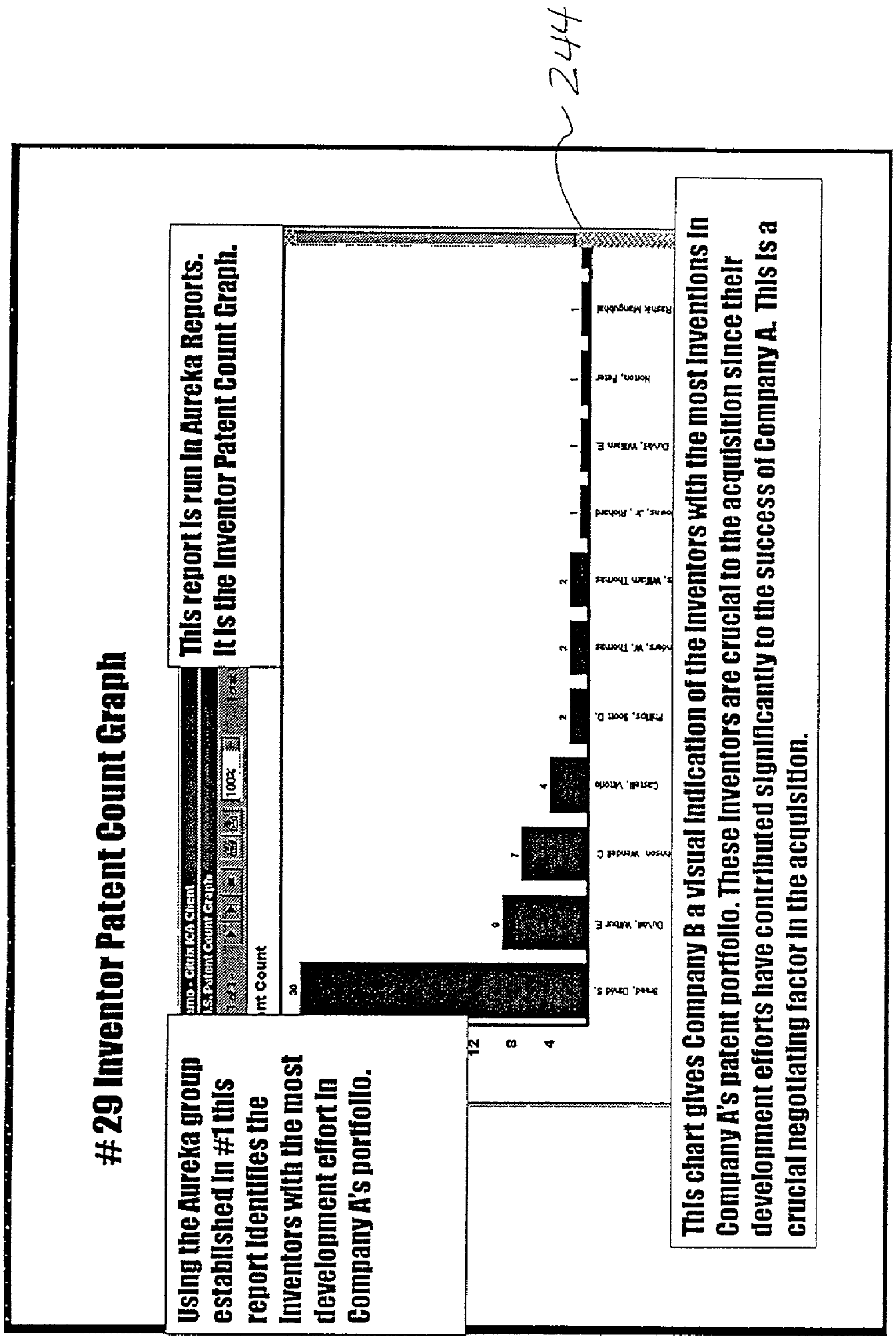
FIG. 60 illustrates the inventor patent count graph facilitating the due diligence and negotiation stages according to an embodiment of the present invention.

FIG. 60 illustrates the inventor patent count graph 244 used in the due diligence stage 106 and the negotiation stage 108, as Tool 29, entitled "Inventor Patent Count Graph." The purpose of Tool 29 is to provide Company B with a visual indication of the inventors with the most inventions in Company A's patent portfolio. These inventors are crucial to the acquisition since their development efforts have contributed significantly to the success of Company A. Many times the retention of key inventors is a crucial negotiating factor in the acquisition. How the IPAM server works in conjunction with the inventor patent count graph 244 to aid in the due diligence stage 106 and the negotiation stage 108 is described next with reference to FIG. 61. Typically, Tool 29 is initiated by the user selecting an inventor patent count graph function on the computer screen.

Figure 61:
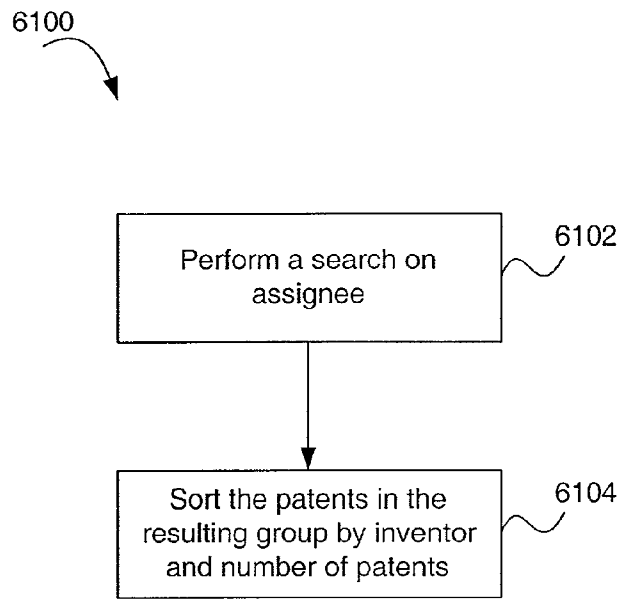
FIG. 61 is a flowchart depicting how the IPAM server works in conjunction with the inventor patent count graph to aid in the due diligence and negotiation stages according to an embodiment of the present invention.

In FIG. 61, a flowchart 6100 begins at step 6102. In step 6102, in an embodiment of the present invention a user performs a search on the group of all U.S. patents. Here, because the user is just pointing at a broad field, the abstract of each U.S. patent is typically the section that is searched, but is not limited to this. The present invention is not limited to doing the search on U.S. patents, but may include European, Japanese (and other available) patents and/or applications. Here, the search performed is typically a boolean and/or natural language search on assignee to produce a group of patents. Exemplary screen shots of the user interface of the IPAM server to assist the user company in searches relating to inventors are shown in FIGS. 72-75. The present invention is not limited to these exemplary user interfaces. Control passes to step 6104.

In step 6104, the IPAM server generates an inventor patent count graph 244 that indicates the top inventors in Company A. Here, the group of patents produced in step 6102 are further subdivided into subgroups by inventor and number of patents. As with assignee information, the IPAM server may store the inventor information of patents in a meta-data field that will also need to be searched to determine the inventor information, but is not limited to this. Flowchart 6100 ends at this point.

XXIII. IPAM SERVER AND INVENTOR DATA

Referring to FIG. 2, the IPAM server works in conjunction with the inventor data 246 to facilitate the due diligence stage 106 and the negotiation stage 108 (as Tool 30). In general, the inventor data 246 identifies the average number of inventors per patent.

Figure 62:
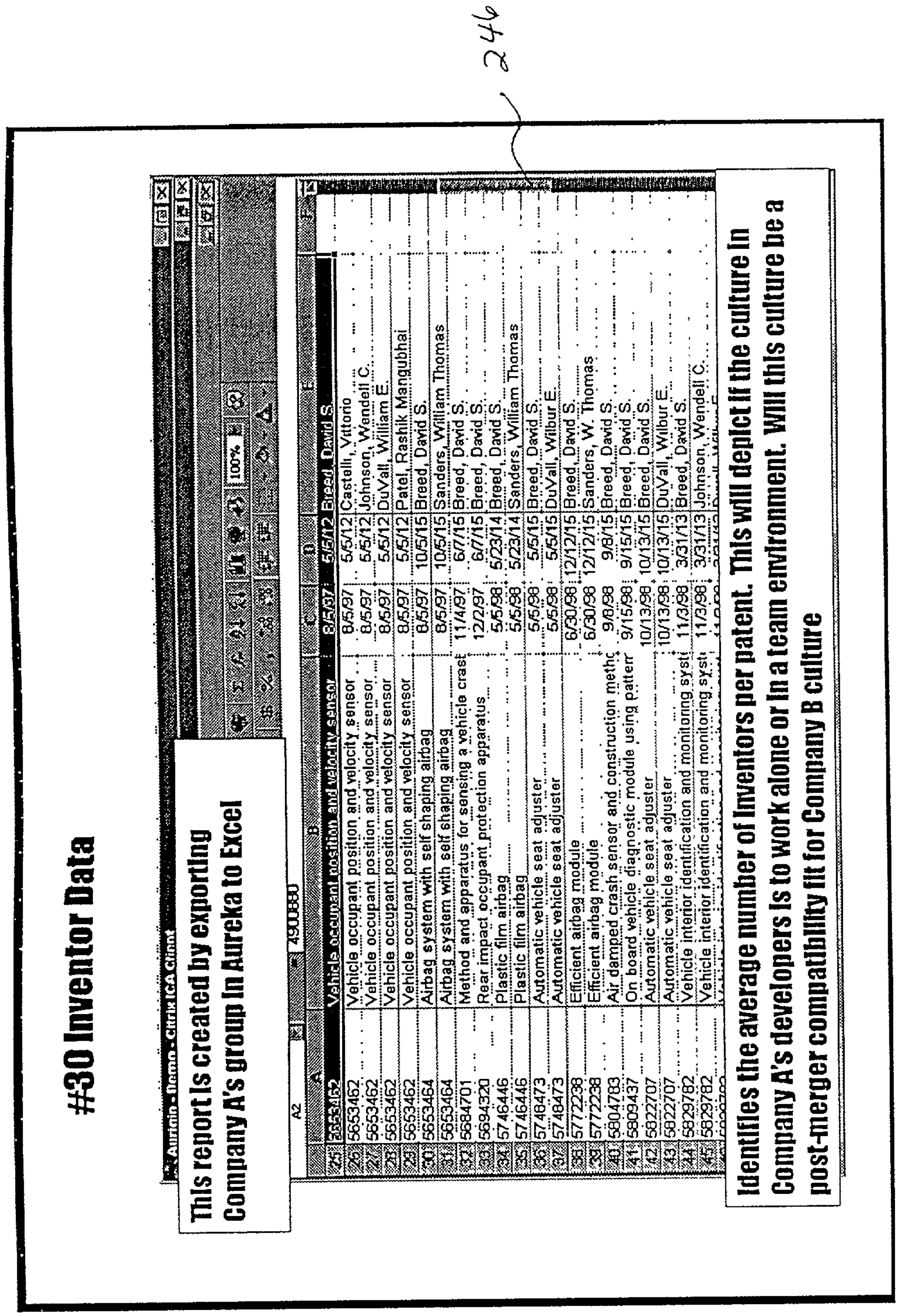
FIG. 62 illustrates the inventor data facilitating the due diligence and negotiation stages according to an embodiment of the present invention.

FIG. 62 illustrates the inventor data 246 used in the due diligence stage 106 and the negotiation stage 108, as Tool 30, entitled "Inventor Data." The purpose of Tool 30 is to identify the average number of inventors per patent. This will depict if the culture in Company A's developers is to work alone or in a team environment. Here, Company B is trying to determine if Company A's culture will be a post-merger compatible fit for Company B's culture. How the IPAM server works in conjunction with the inventor data 246 to aid in the due diligence stage 106 and negotiation stage 108 is described next with reference to FIG. 63. Typically, Tool 30 is initiated by the user selecting an inventor data function on the computer screen.

Figure 63:
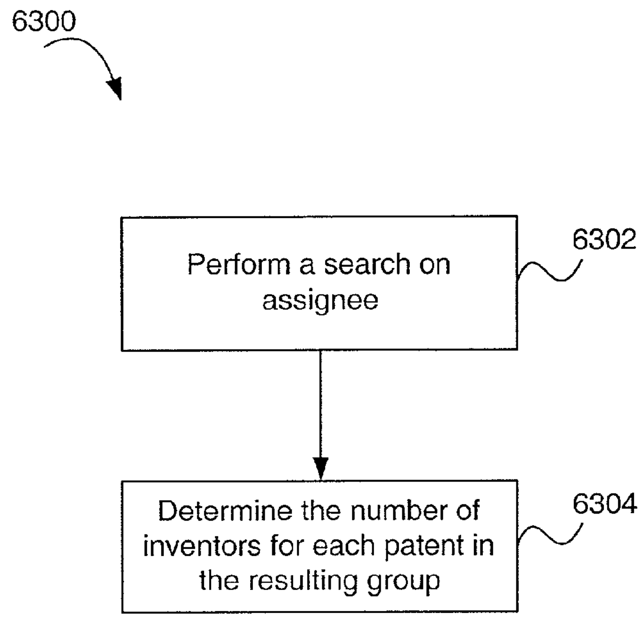
FIG. 63 is a flowchart depicting how the IPAM server works in conjunction with the inventor data to aid in the due diligence and negotiation stages according to an embodiment of the present invention.
Figure 64:
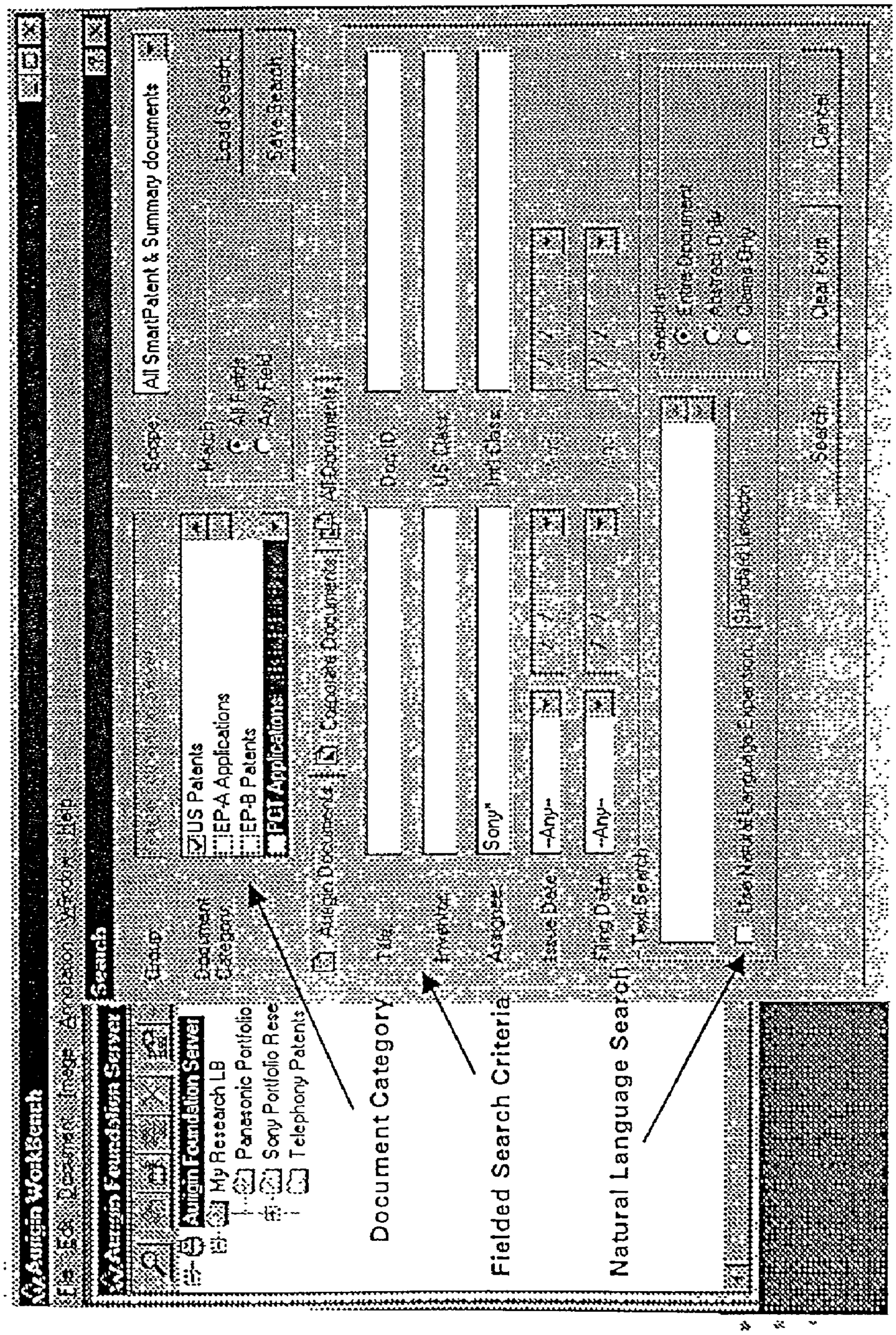
FIGS. 64-67 are exemplary screen shots of the IPAM server's user interface relating to the boolean and/or natural language search according to an embodiment of the present invention.
Figure 65:
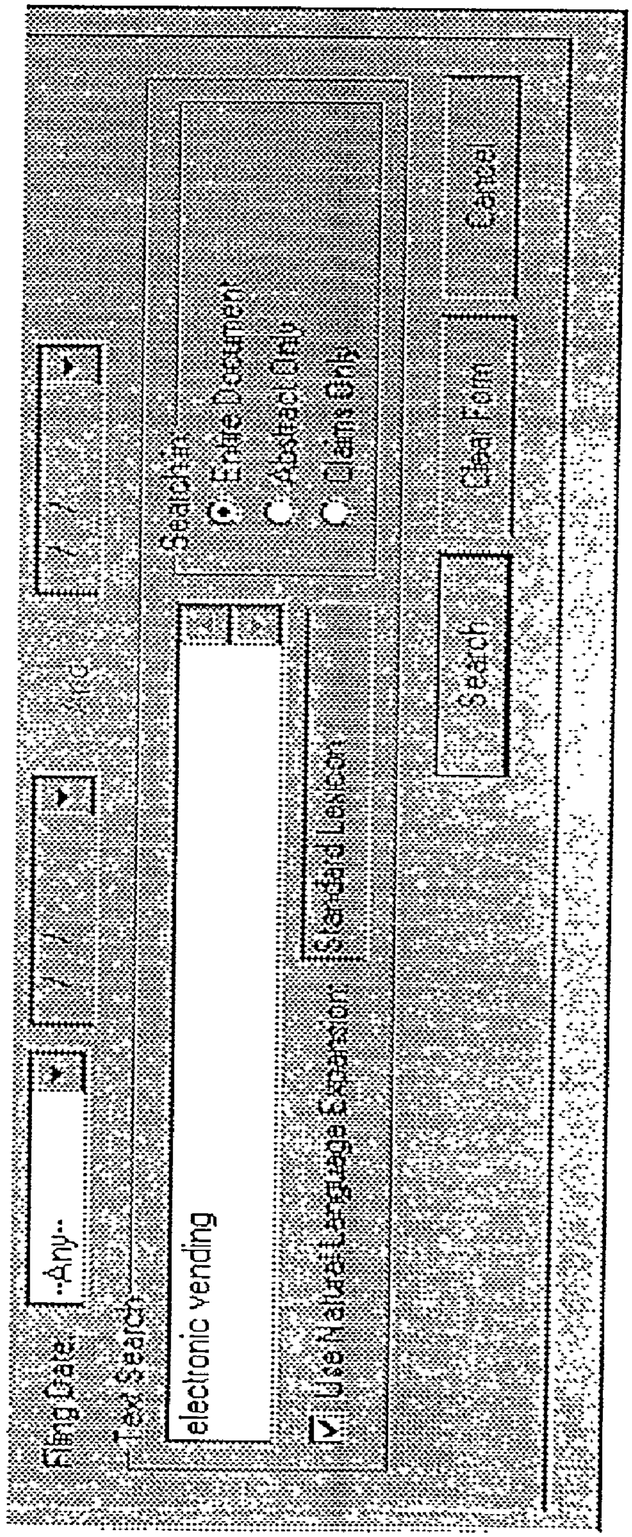
Figure 66:
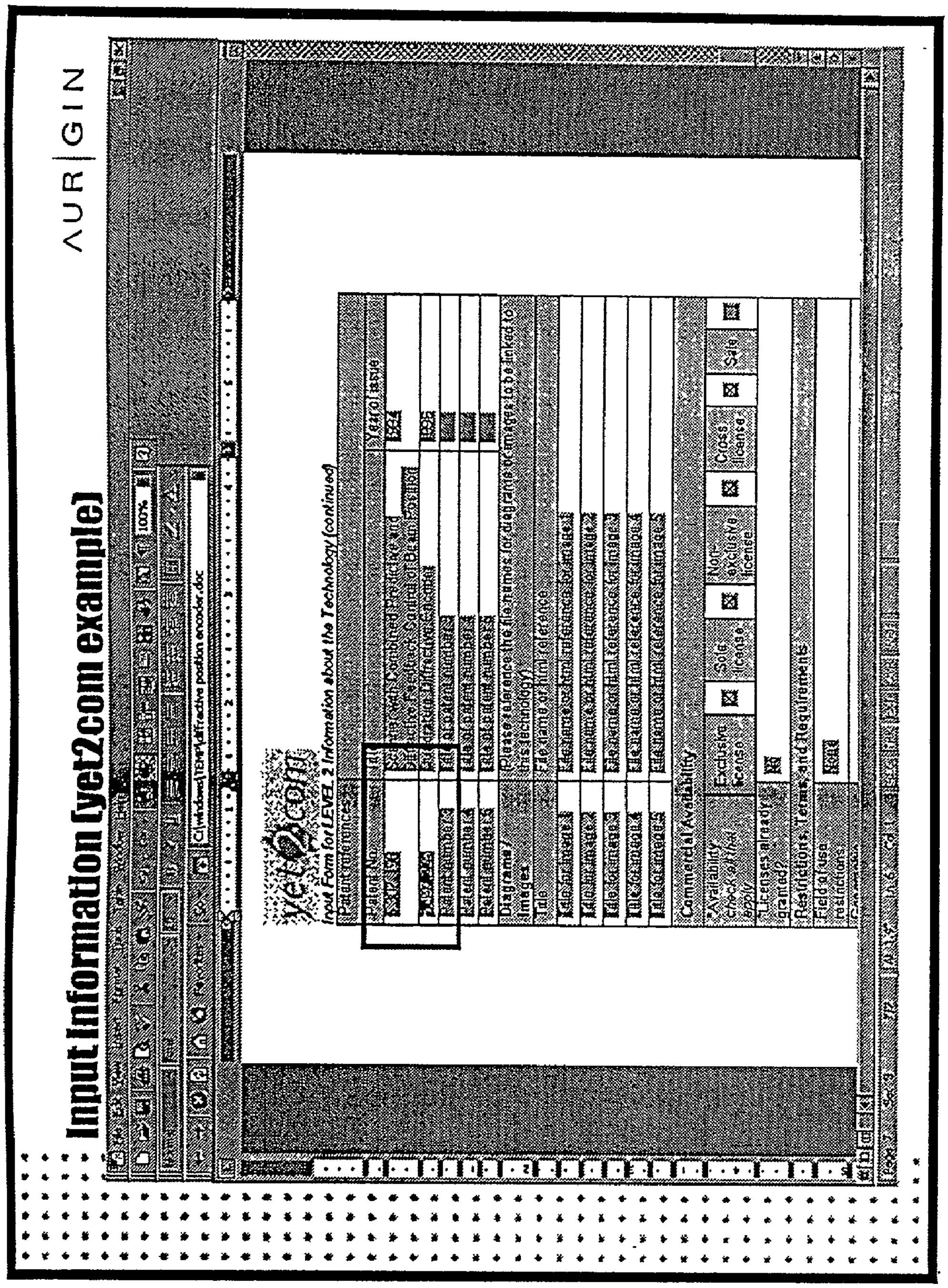
Figure 67:
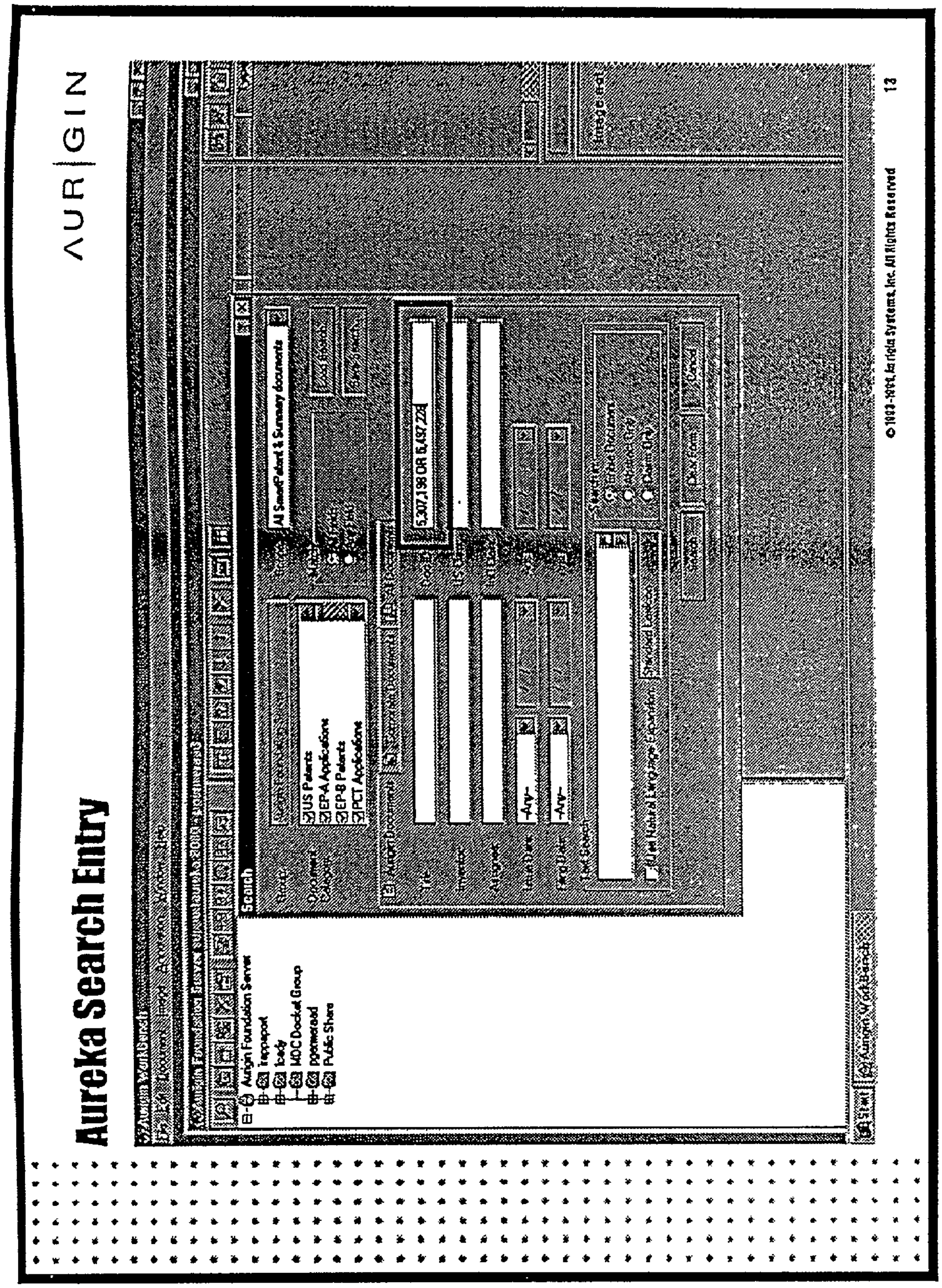
Figure 68:
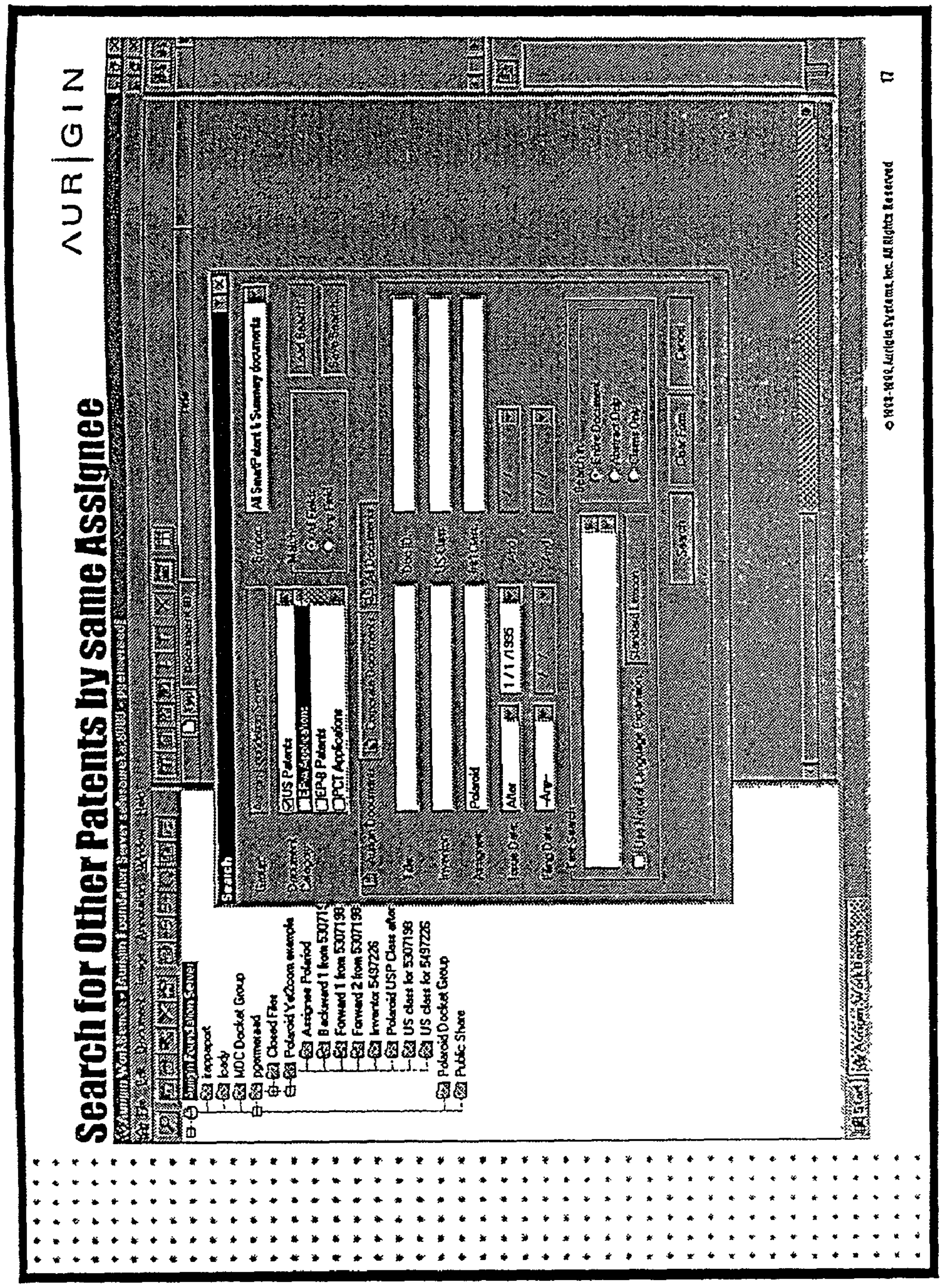
FIGS. 68-71 are exemplary screen shots of the IPAM server's user interface relating to searching patents by the same assignee according to an embodiment of the present invention.
Figure 69:
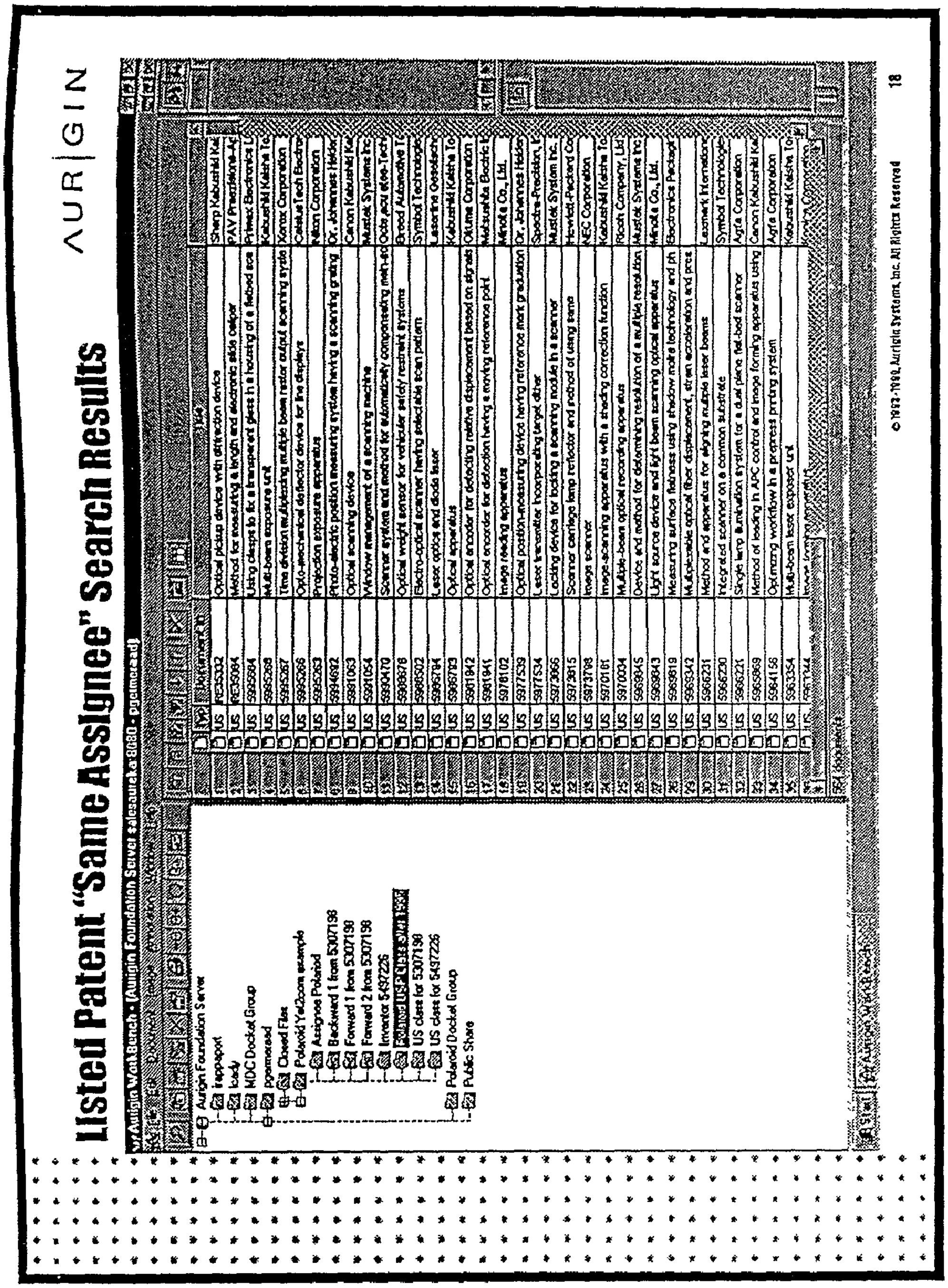
Figure 70:
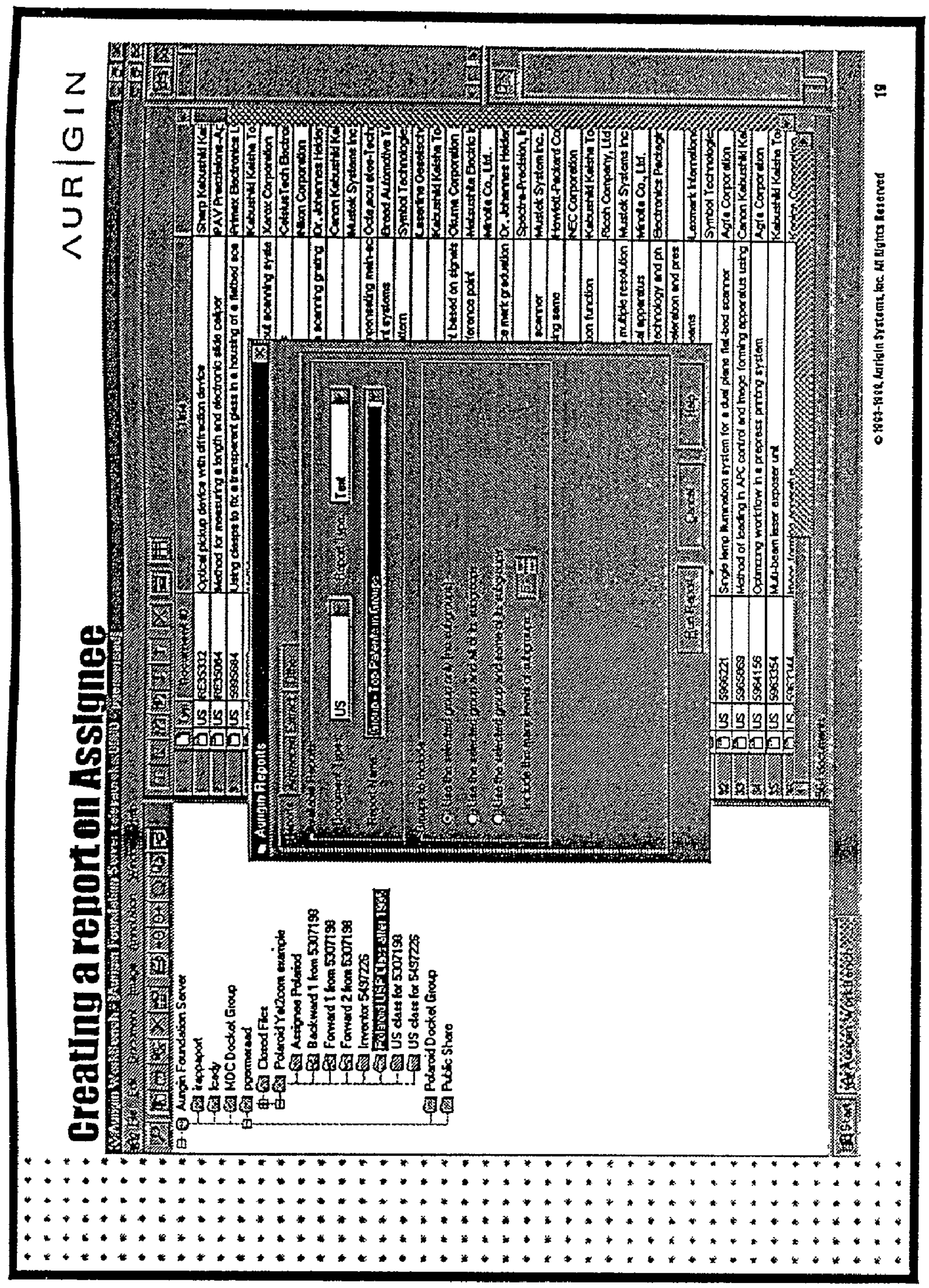
Figure 71:
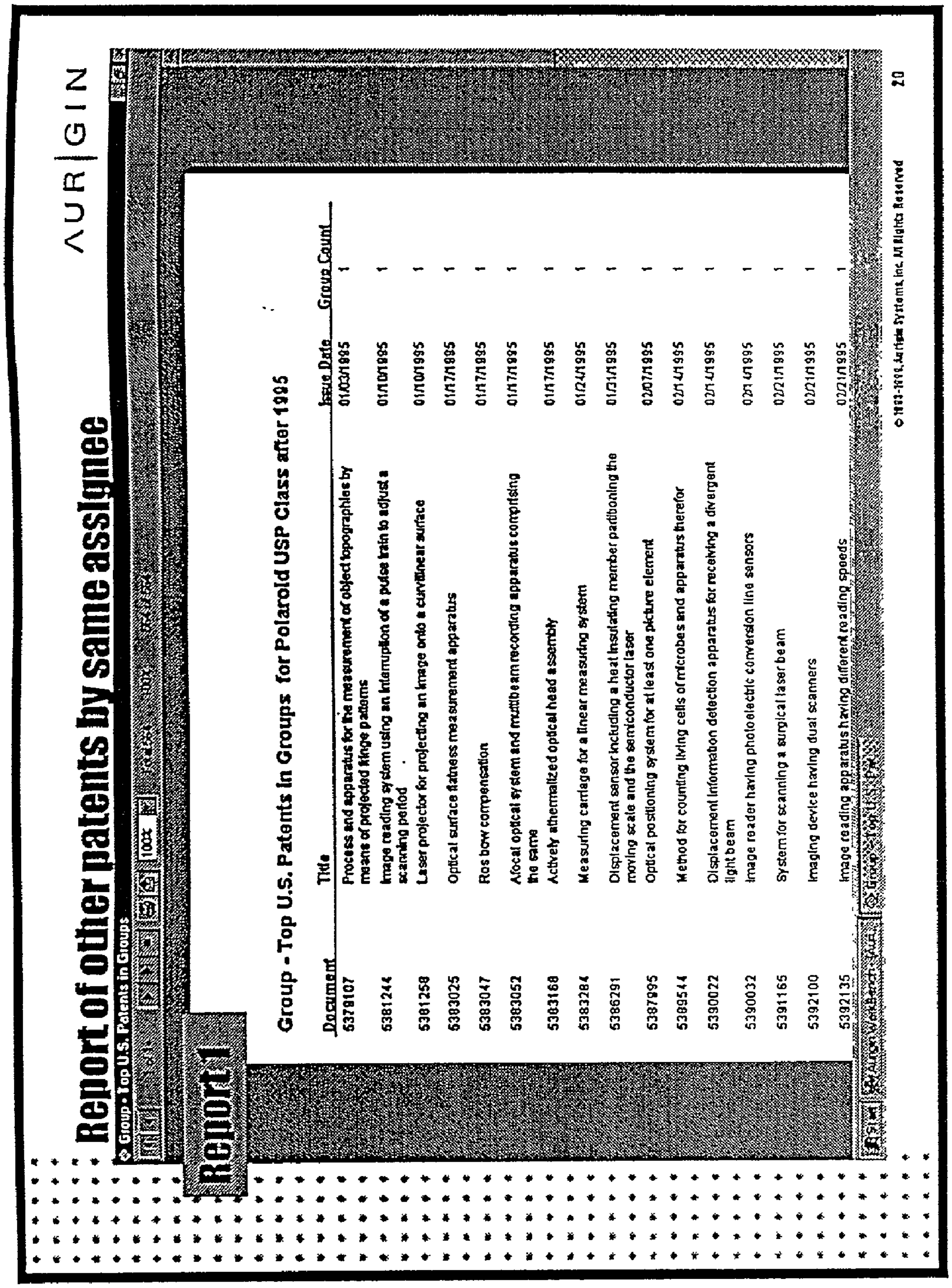
Figure 72:
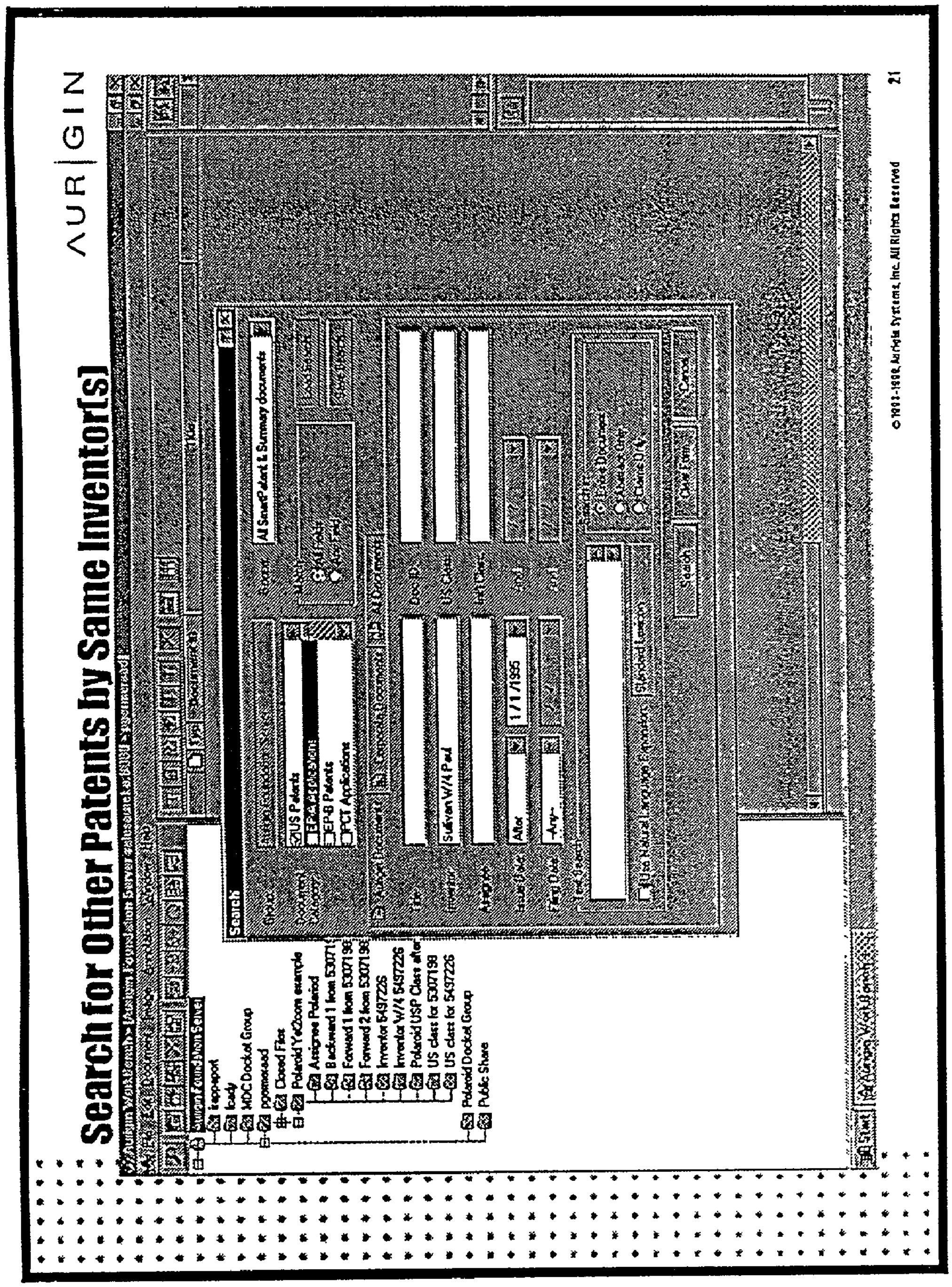
FIGS. 72-75 are exemplary screen shots of the user interface of the IPAM server to assist the user company in searches relating to inventors according to an embodiment of the present invention.
Figure 73:
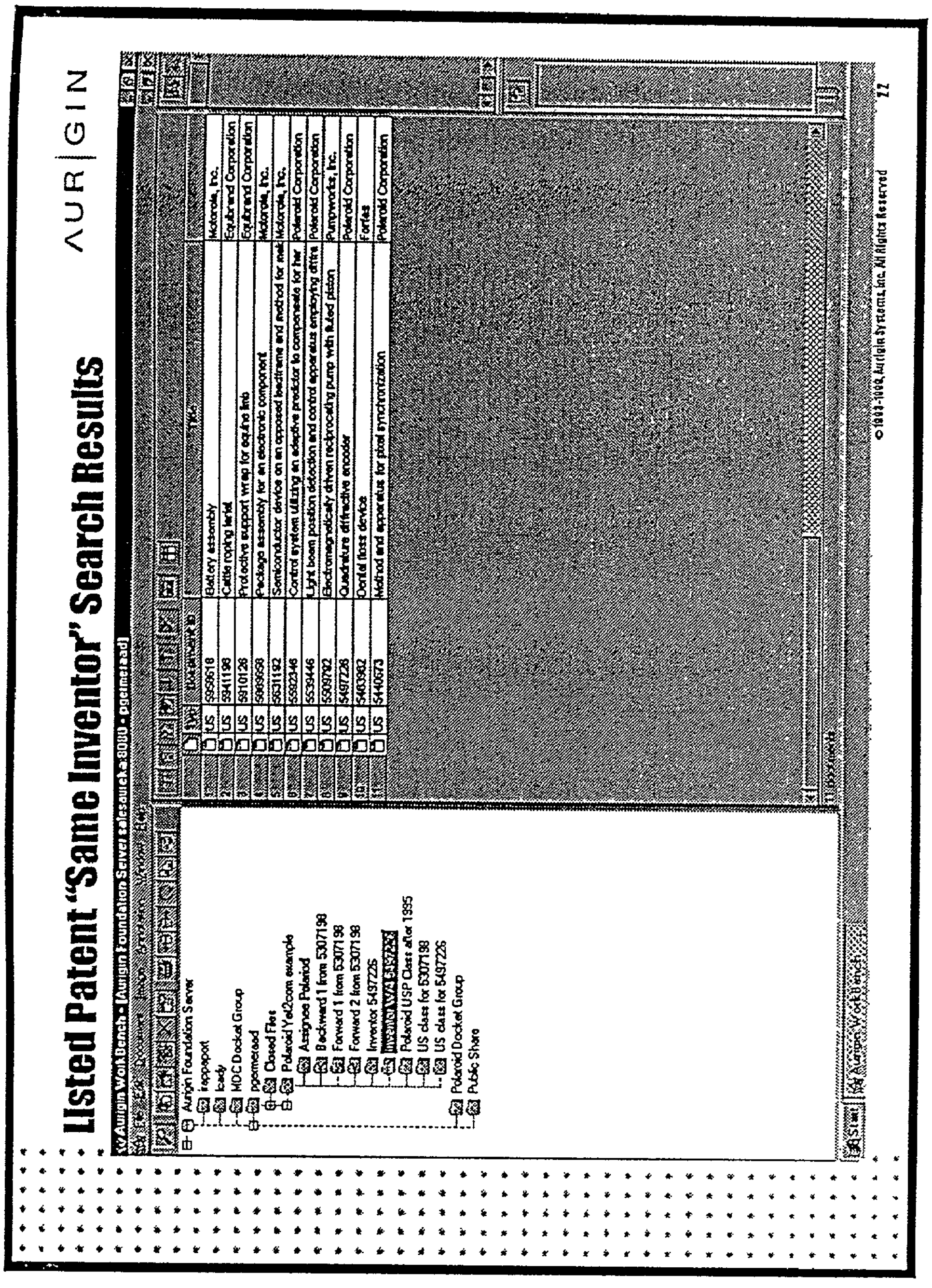
Figure 74:
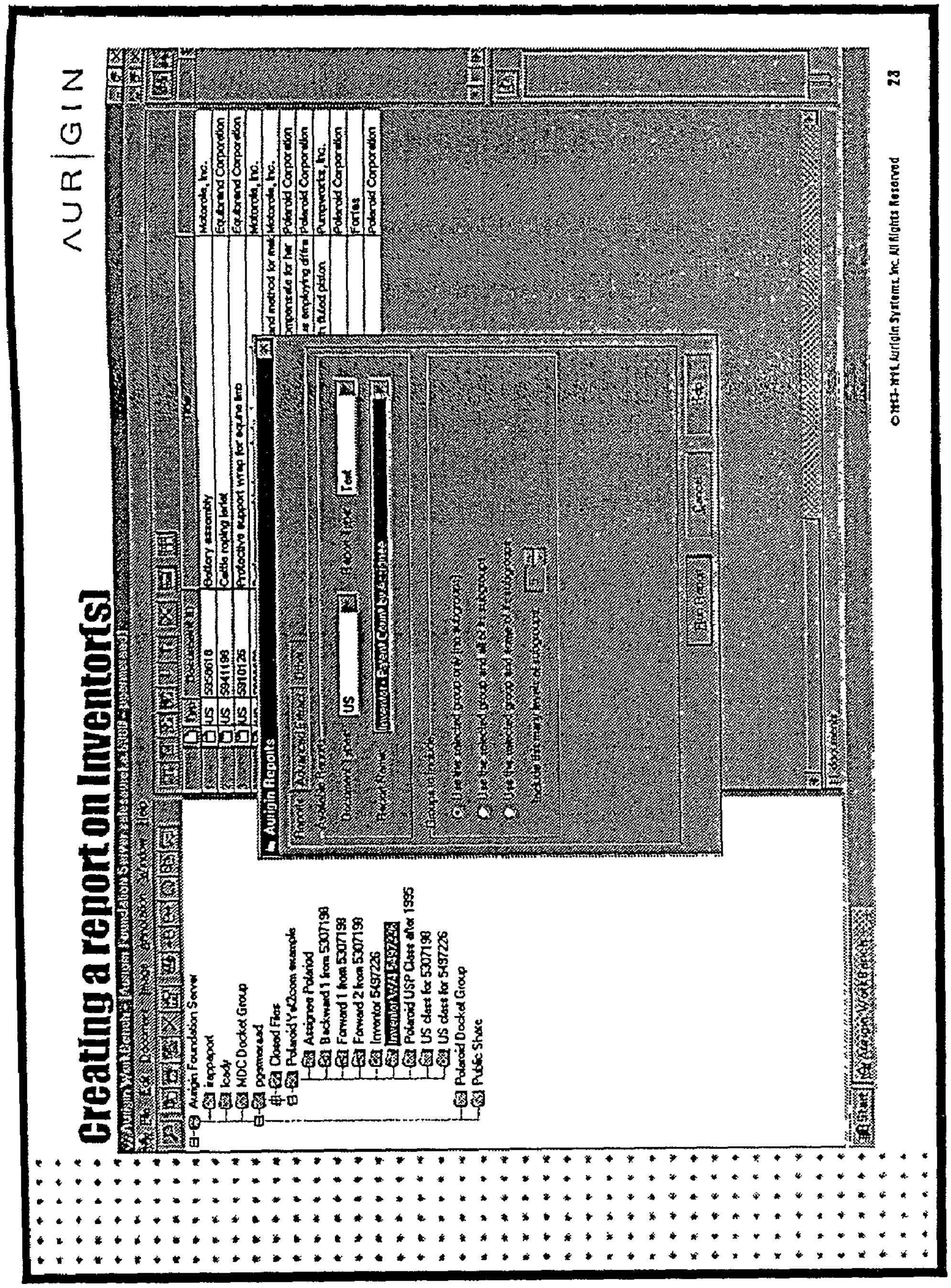
Figure 75:
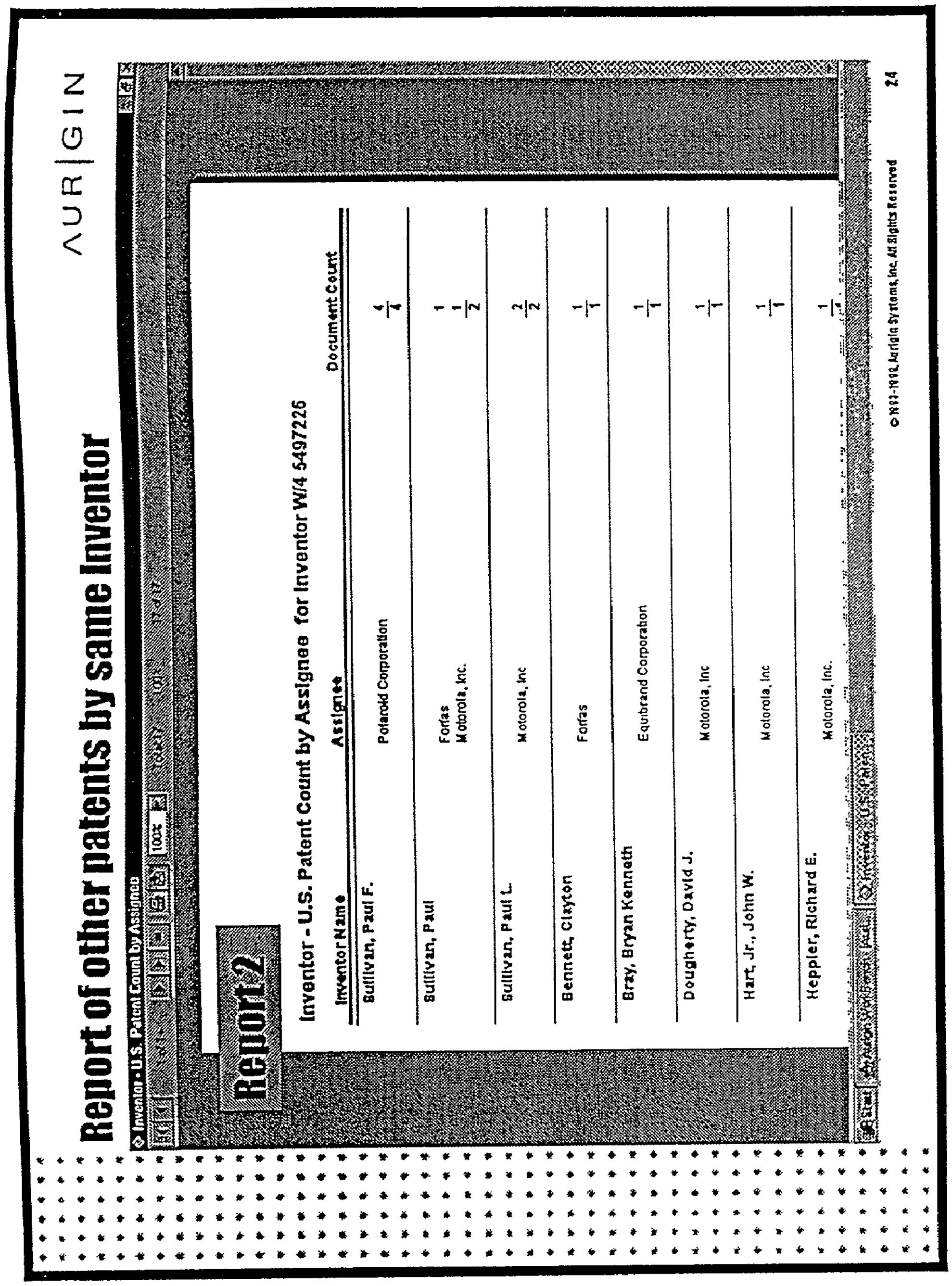
Figure 76:
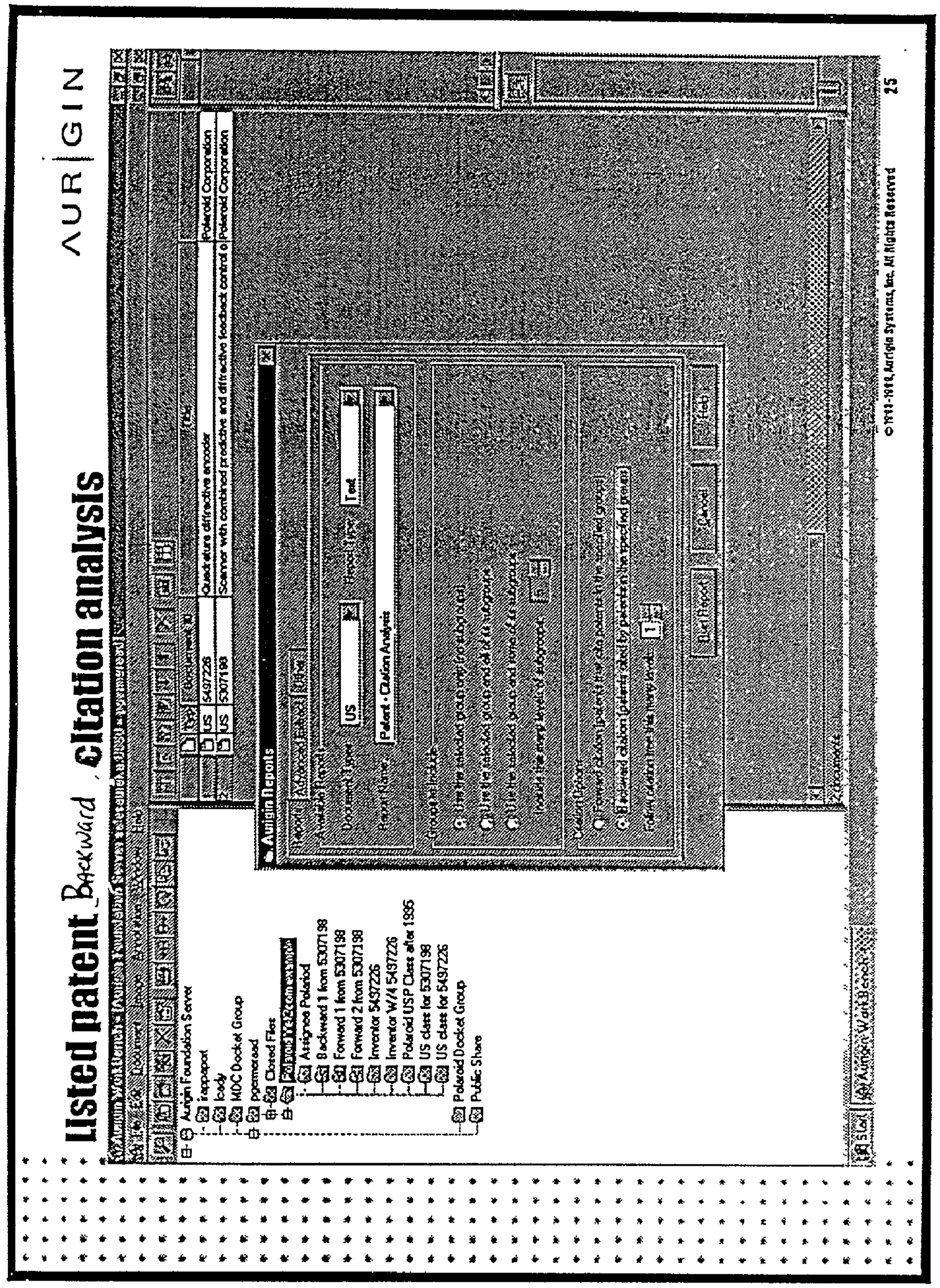
FIGS. 76-80 are exemplary screen shots of the user interface of the IPAM server to assist the user company in searches relating to backward citation according to an embodiment of the present invention.
Figure 77:
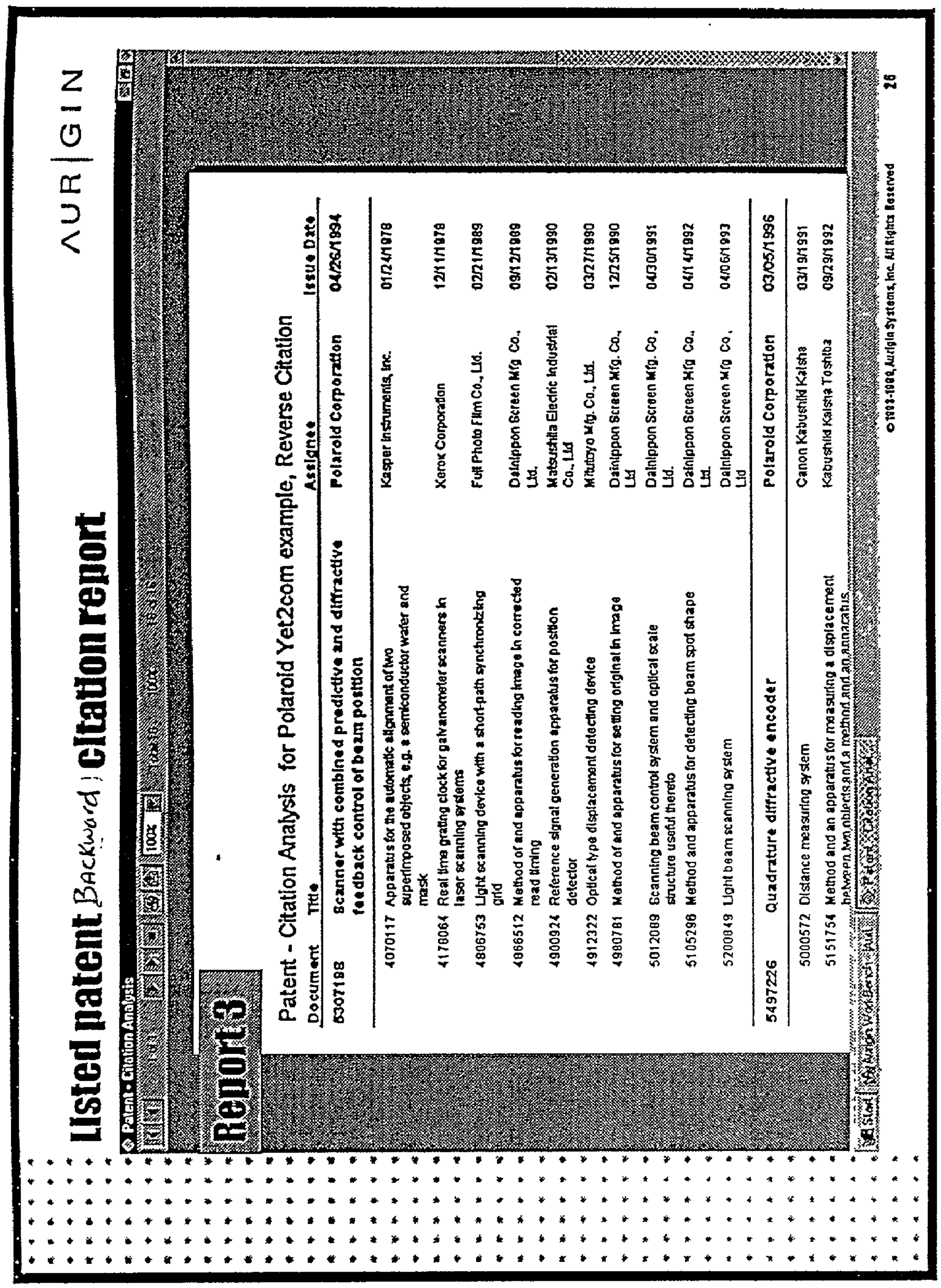
Figure 78:
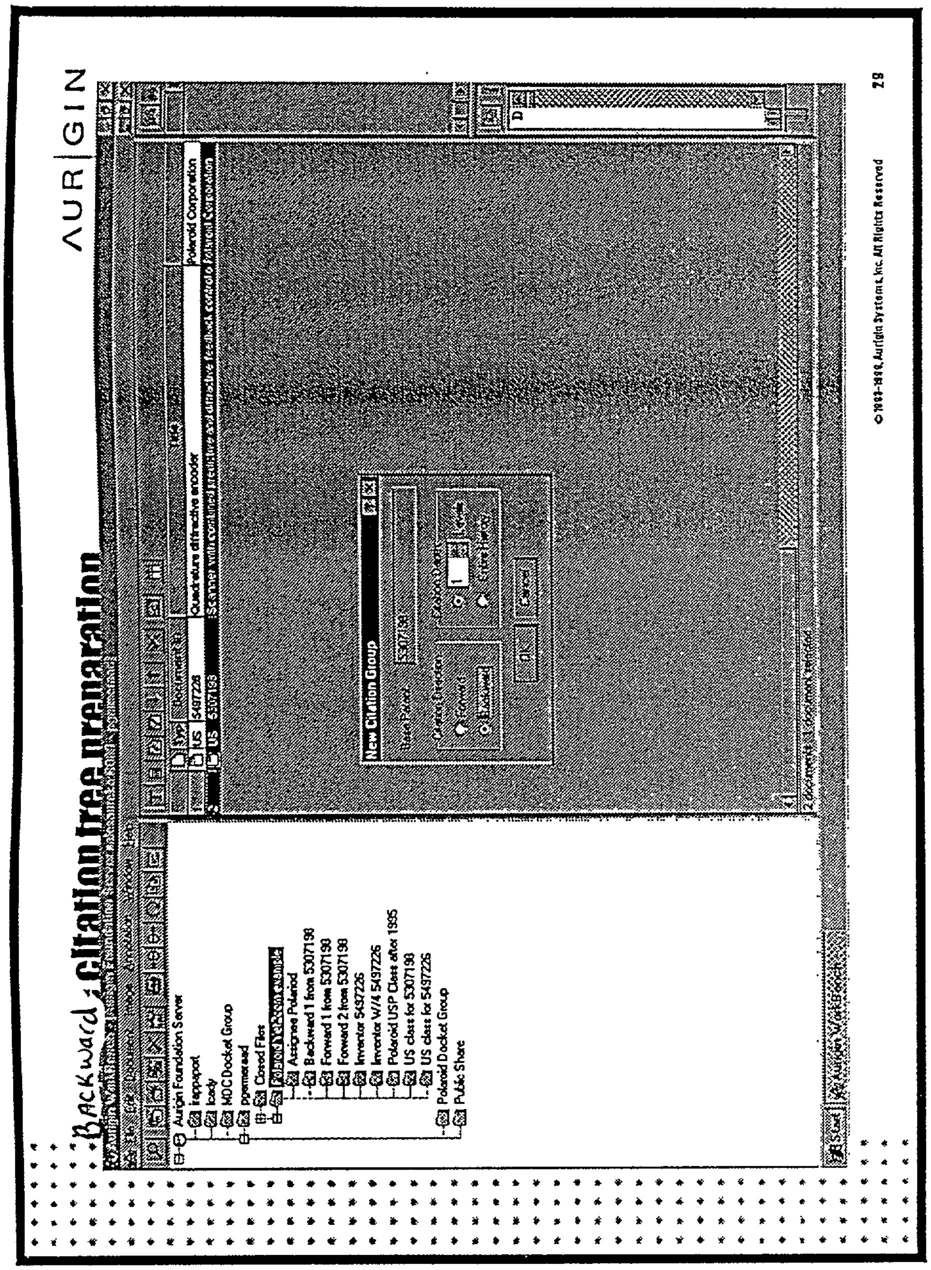
Figure 79:
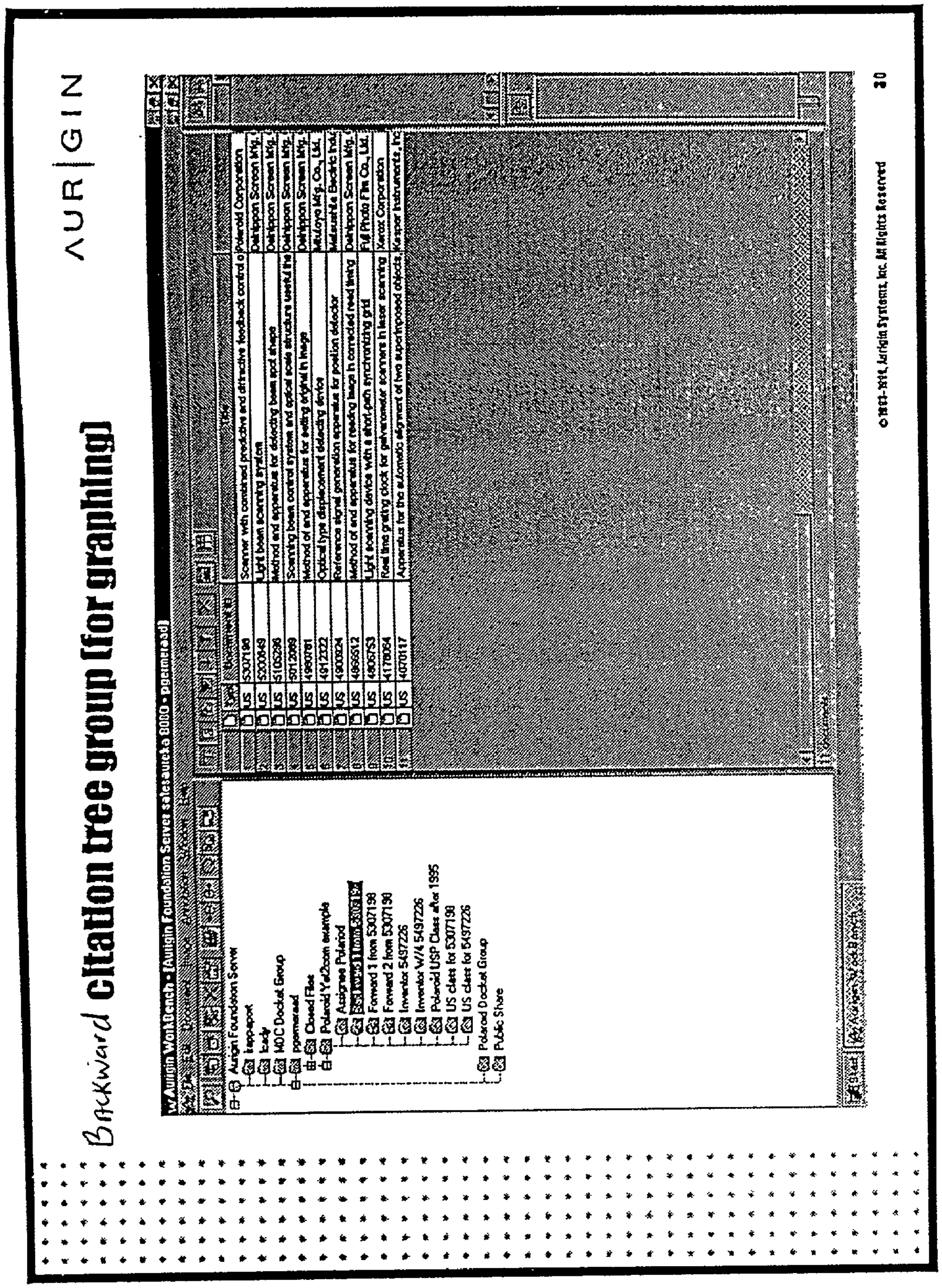
Figure 80:
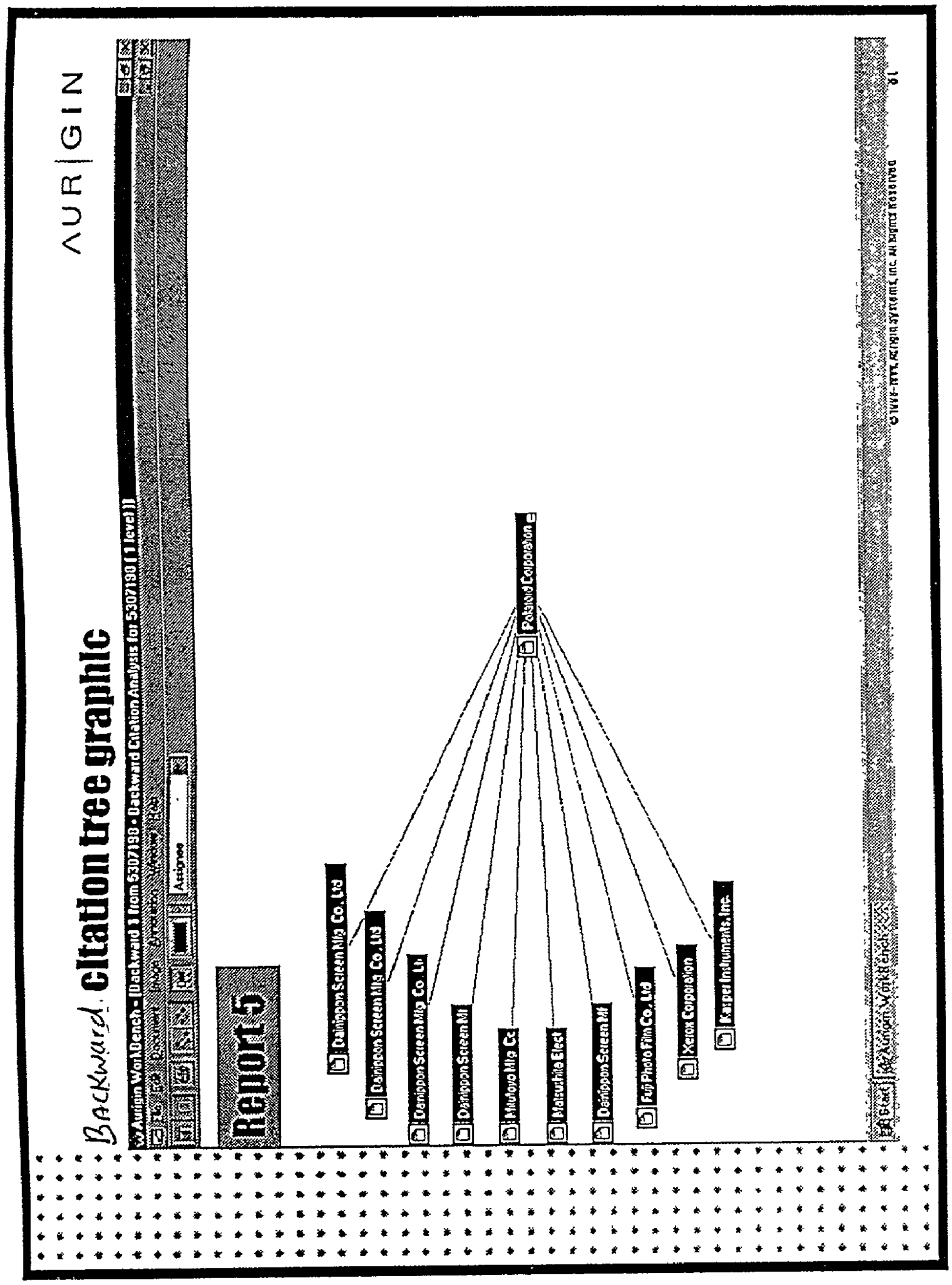
Figure 81:
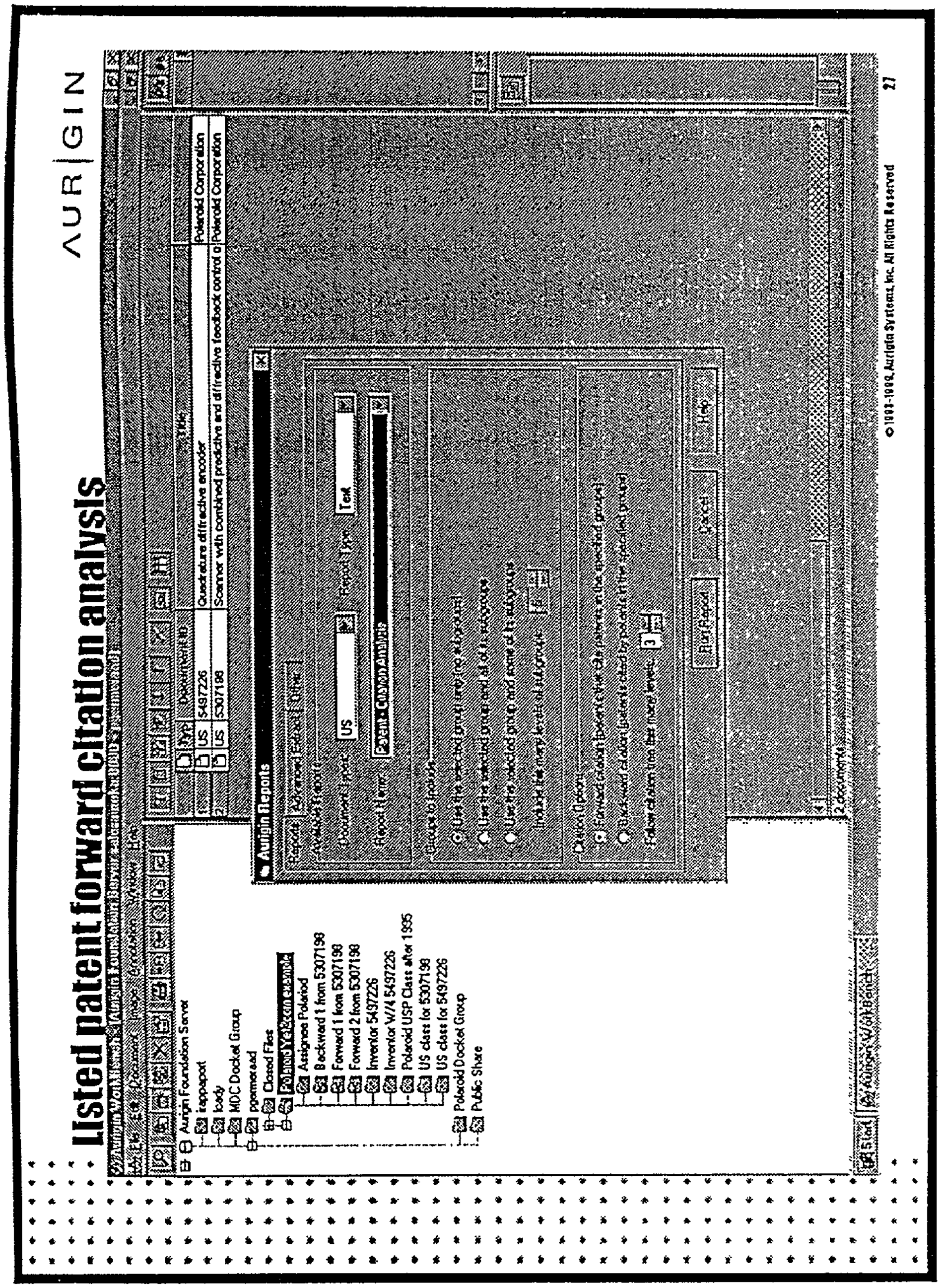
FIGS. 81-85 are exemplary screen shots of the user interface of the IPAM server to assist the user company in searches relating to forward citation according to an embodiment of the present invention.
Figure 82:
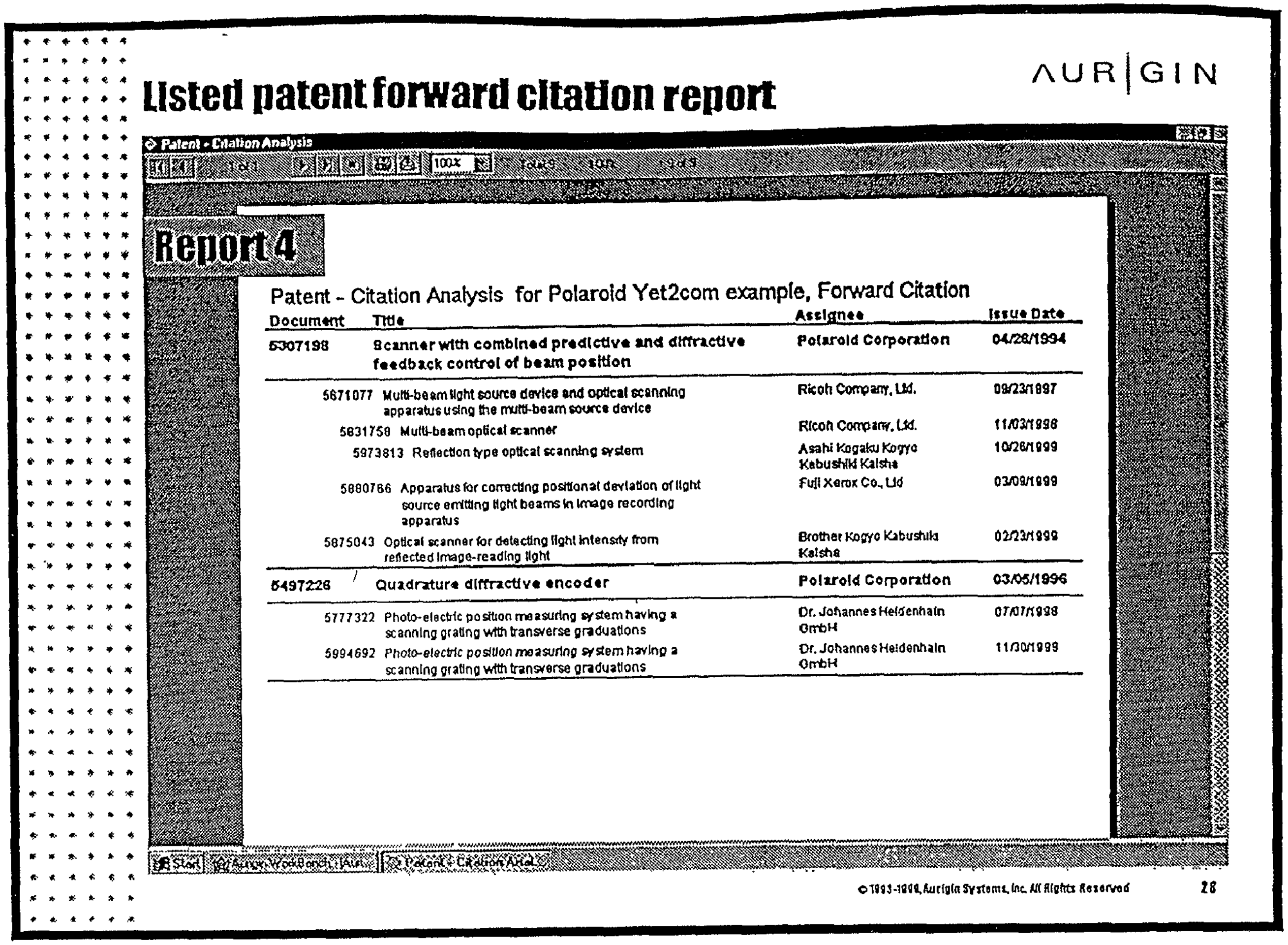
Figure 83:
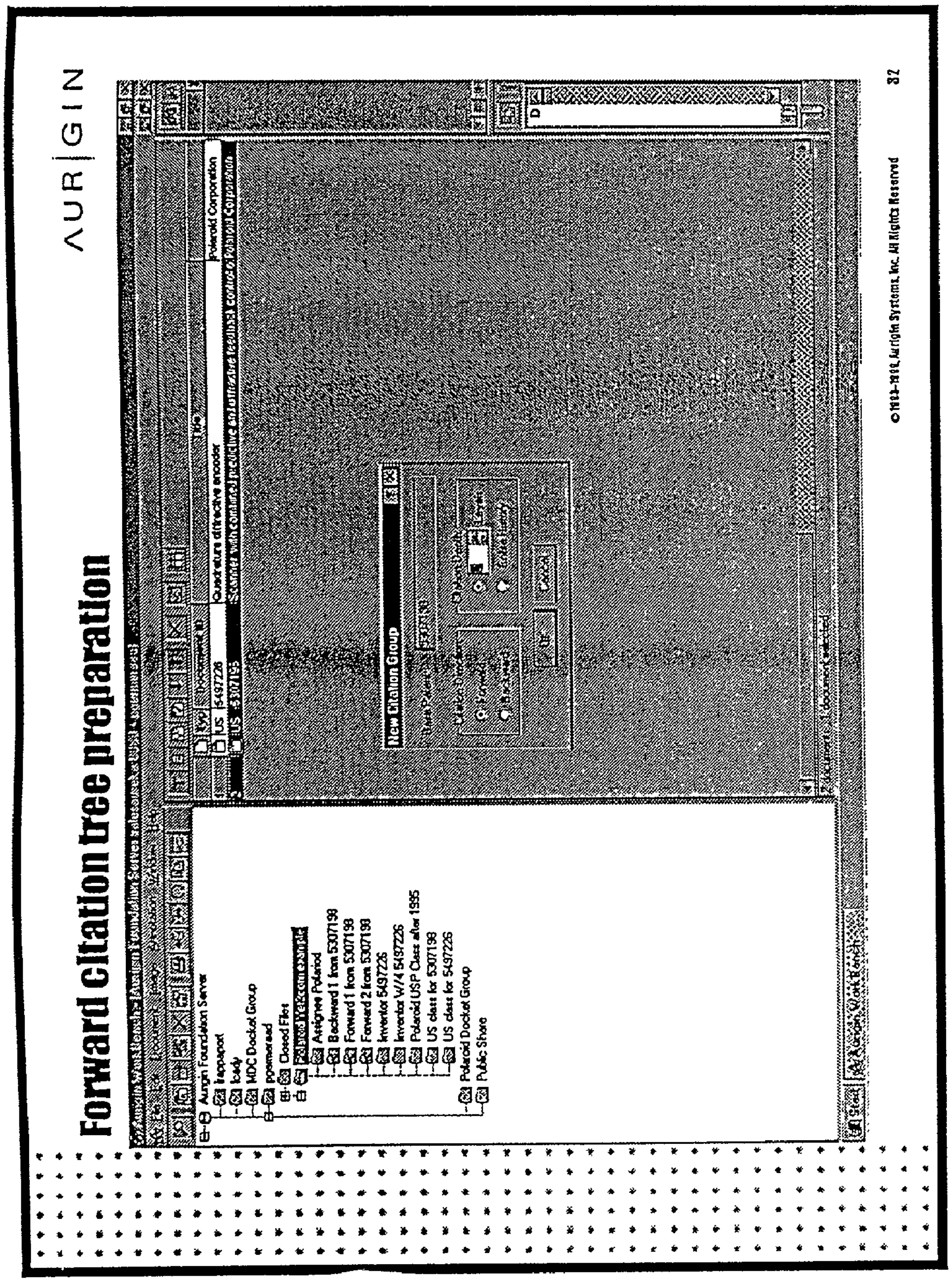
Figure 84:
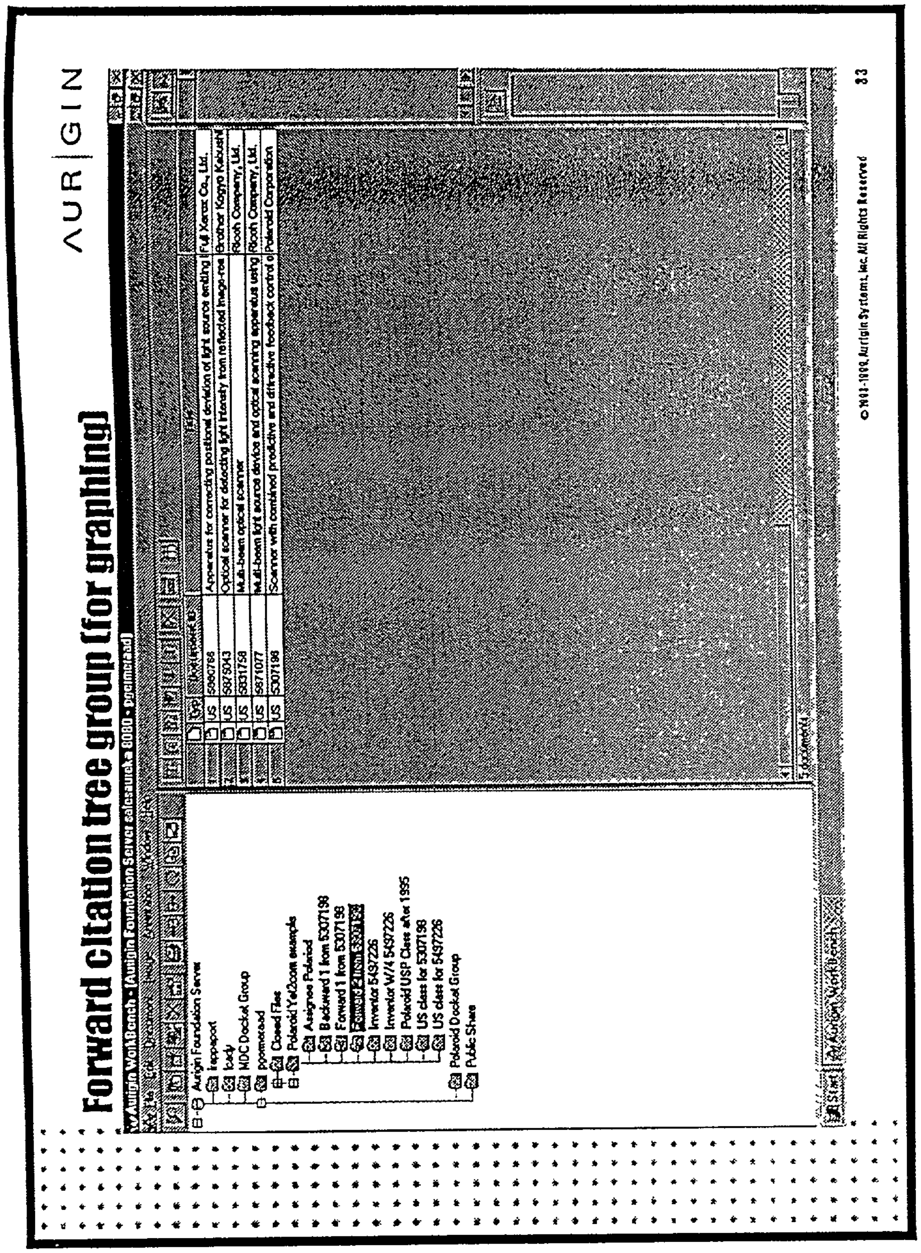
Figure 85:
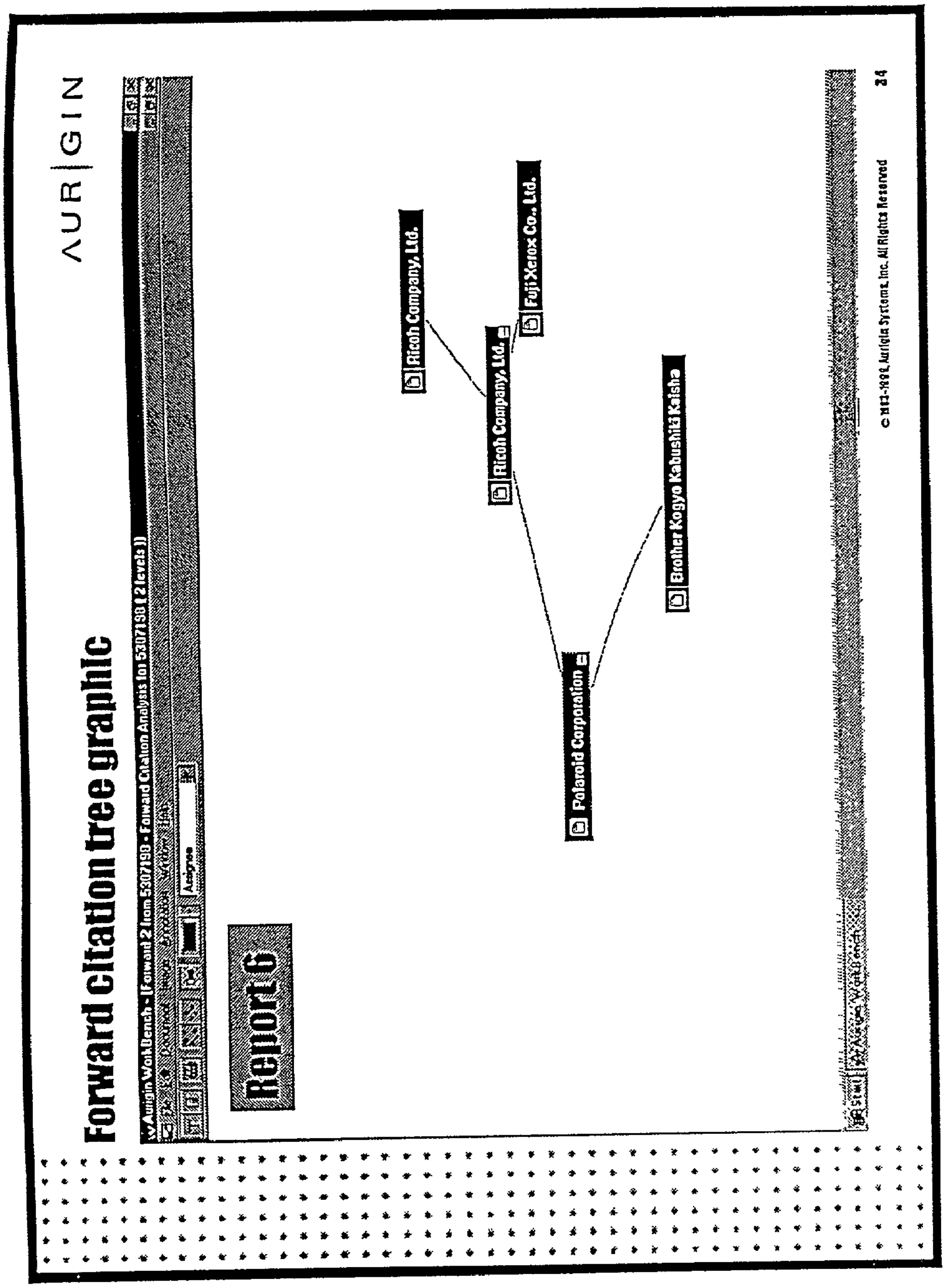
Figure 86:
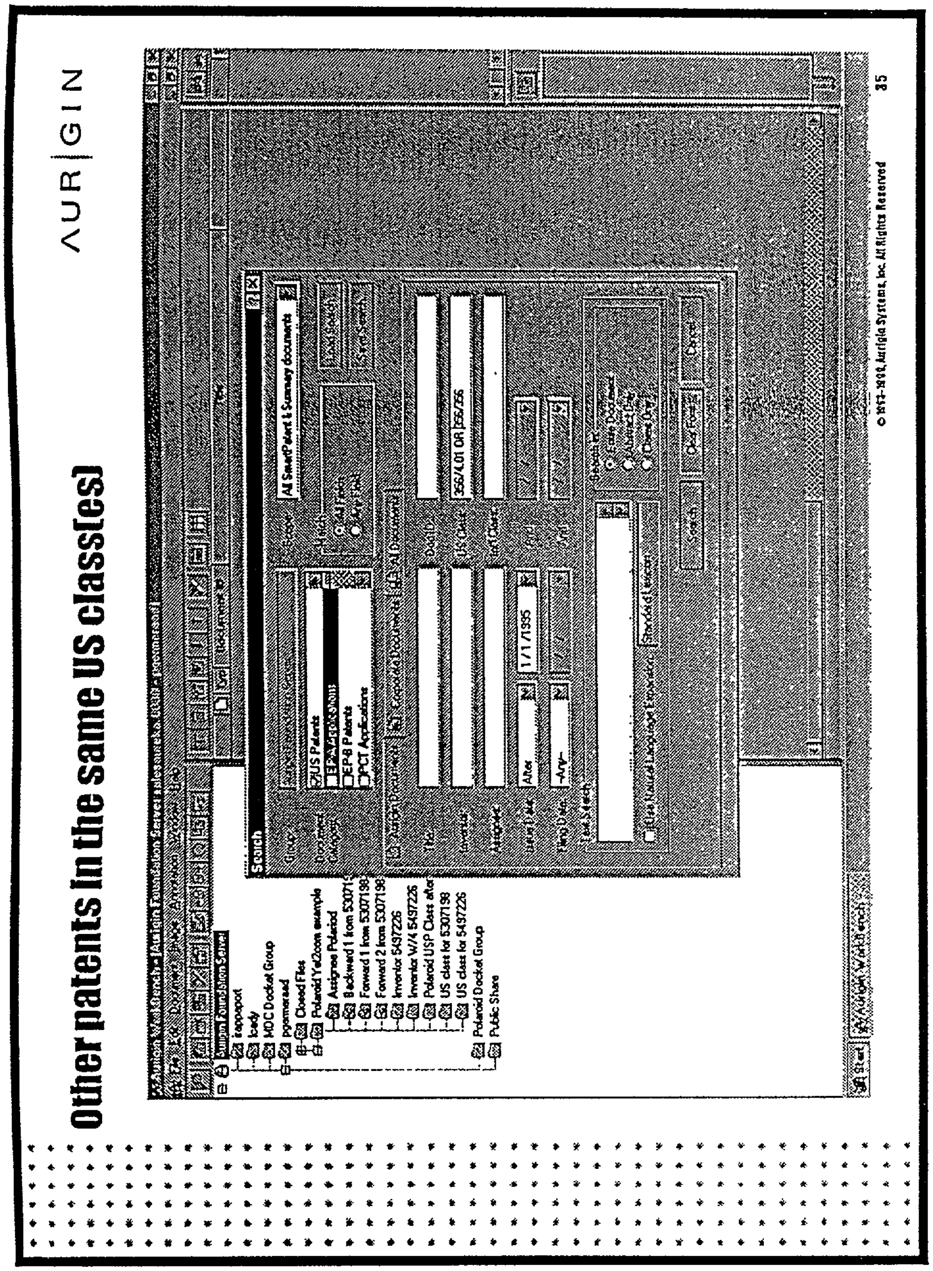
Figure 87:
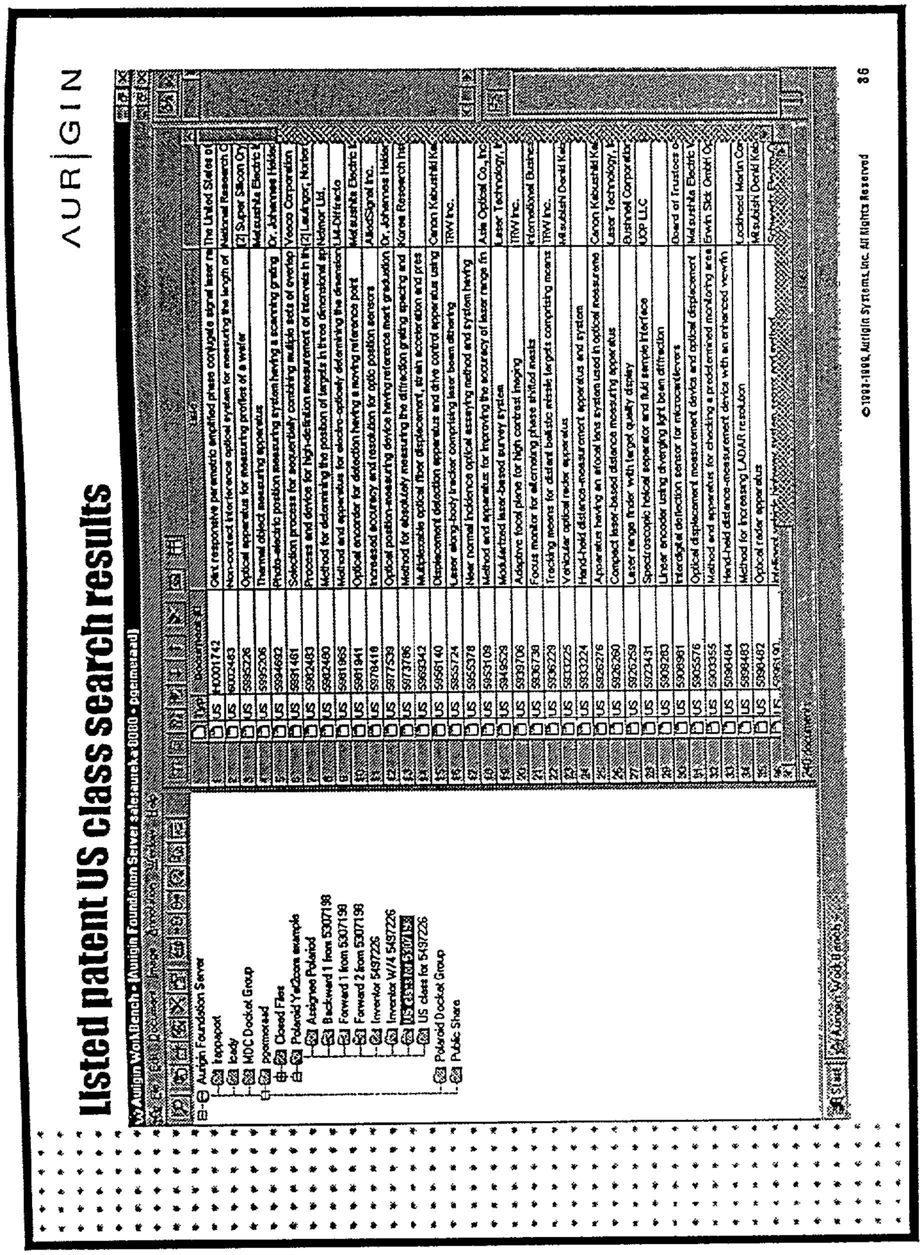
Figure 88:
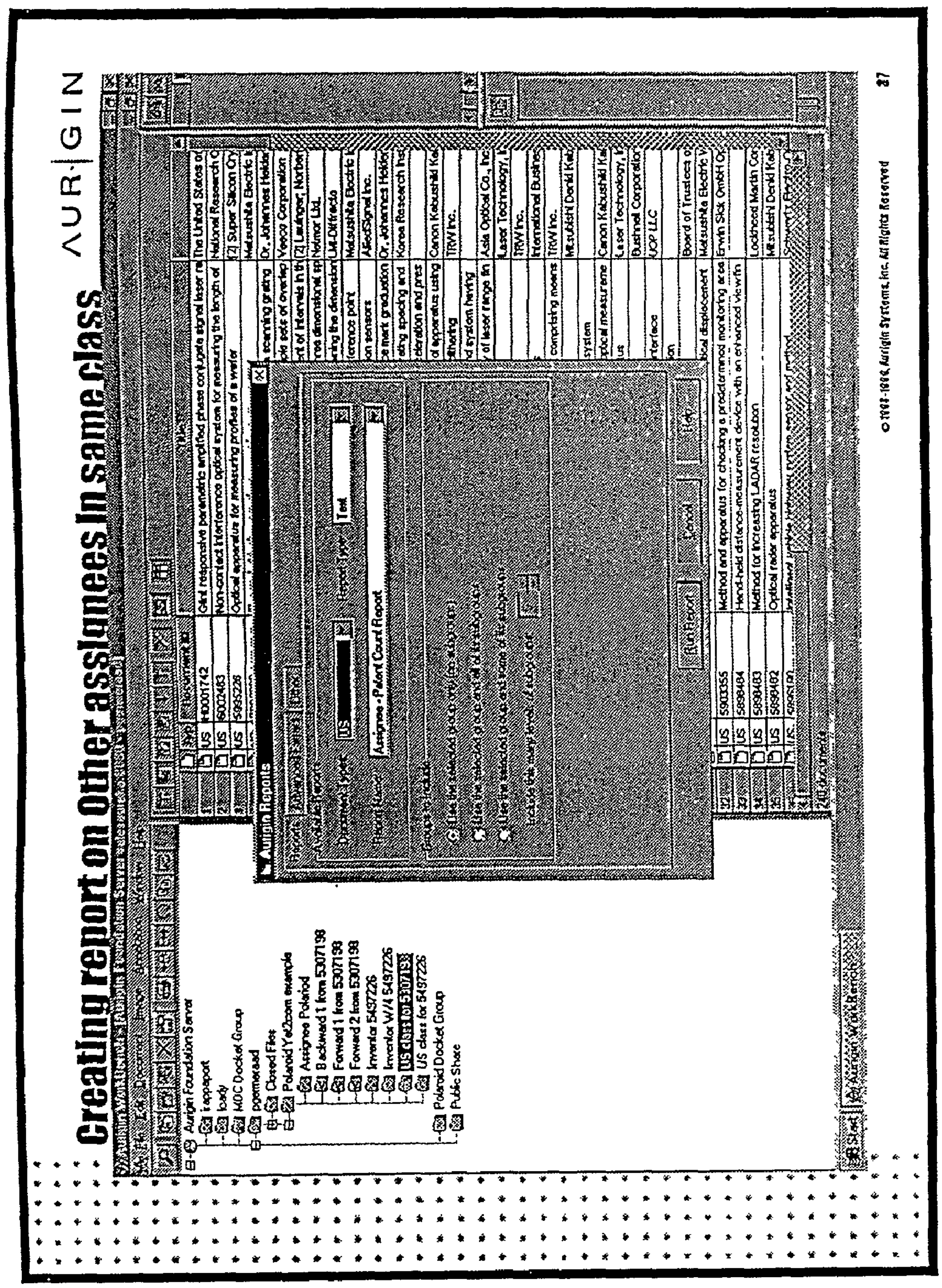
Figure 89:
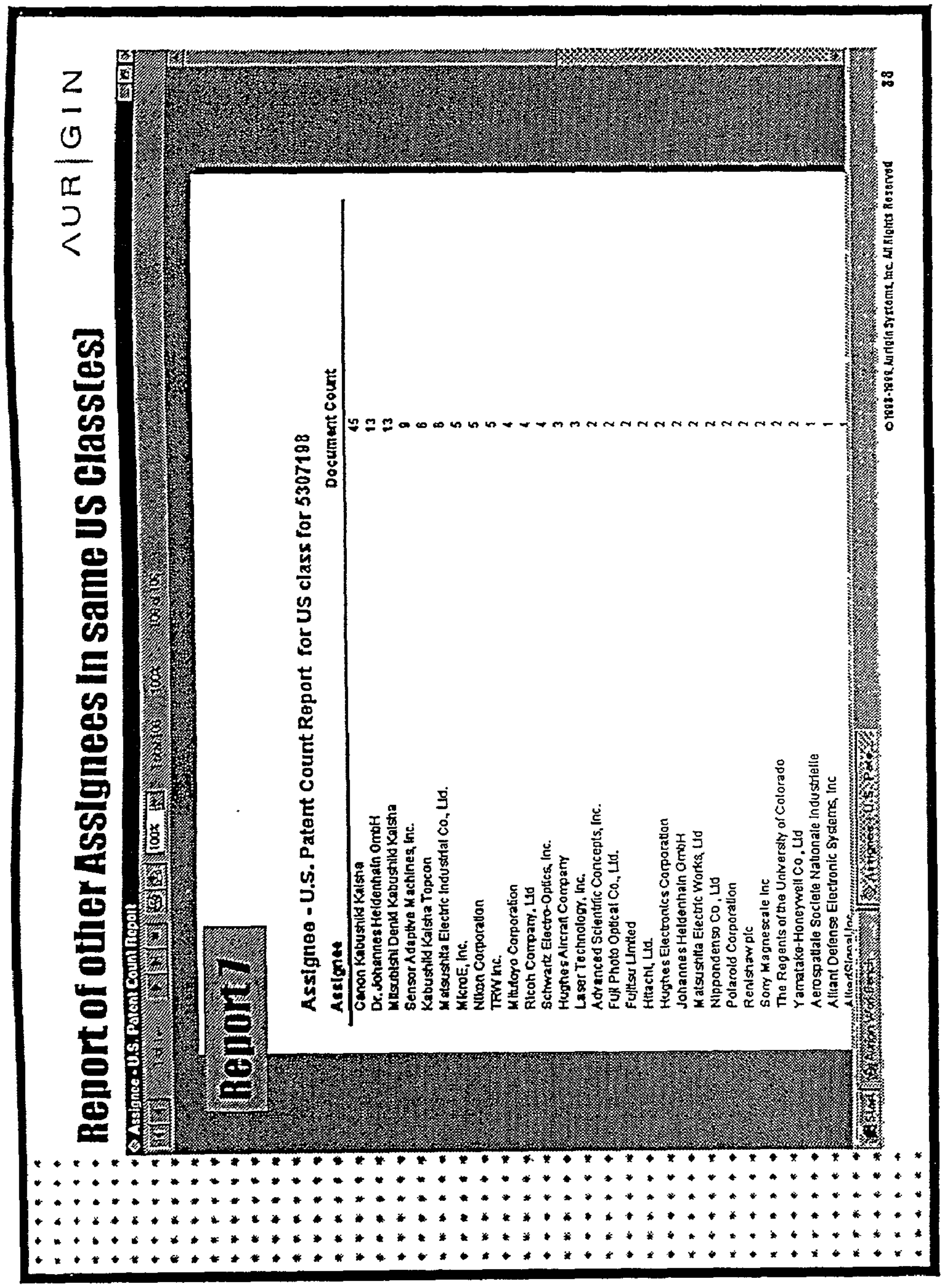
Figure 90:
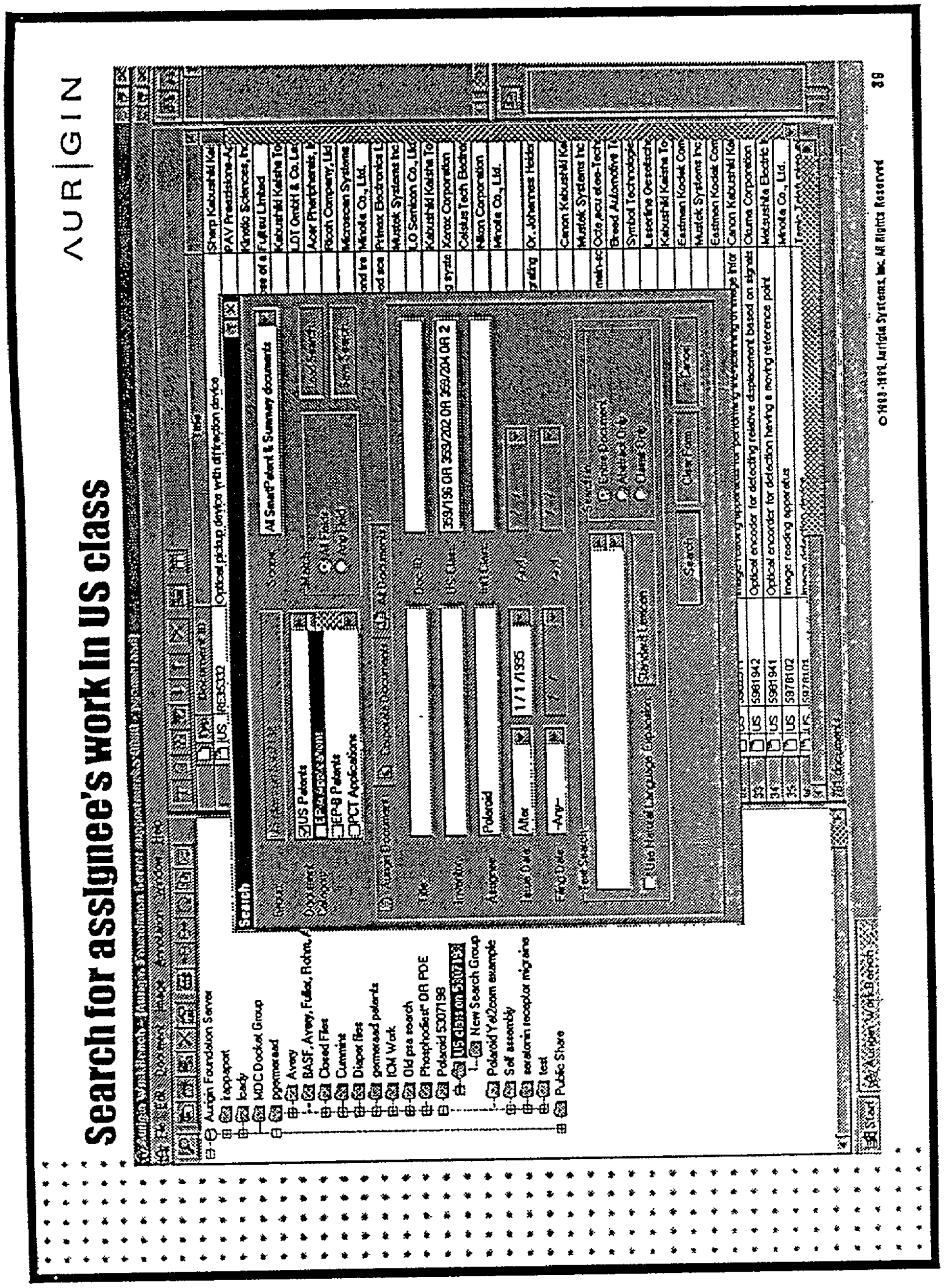
Figure 91:
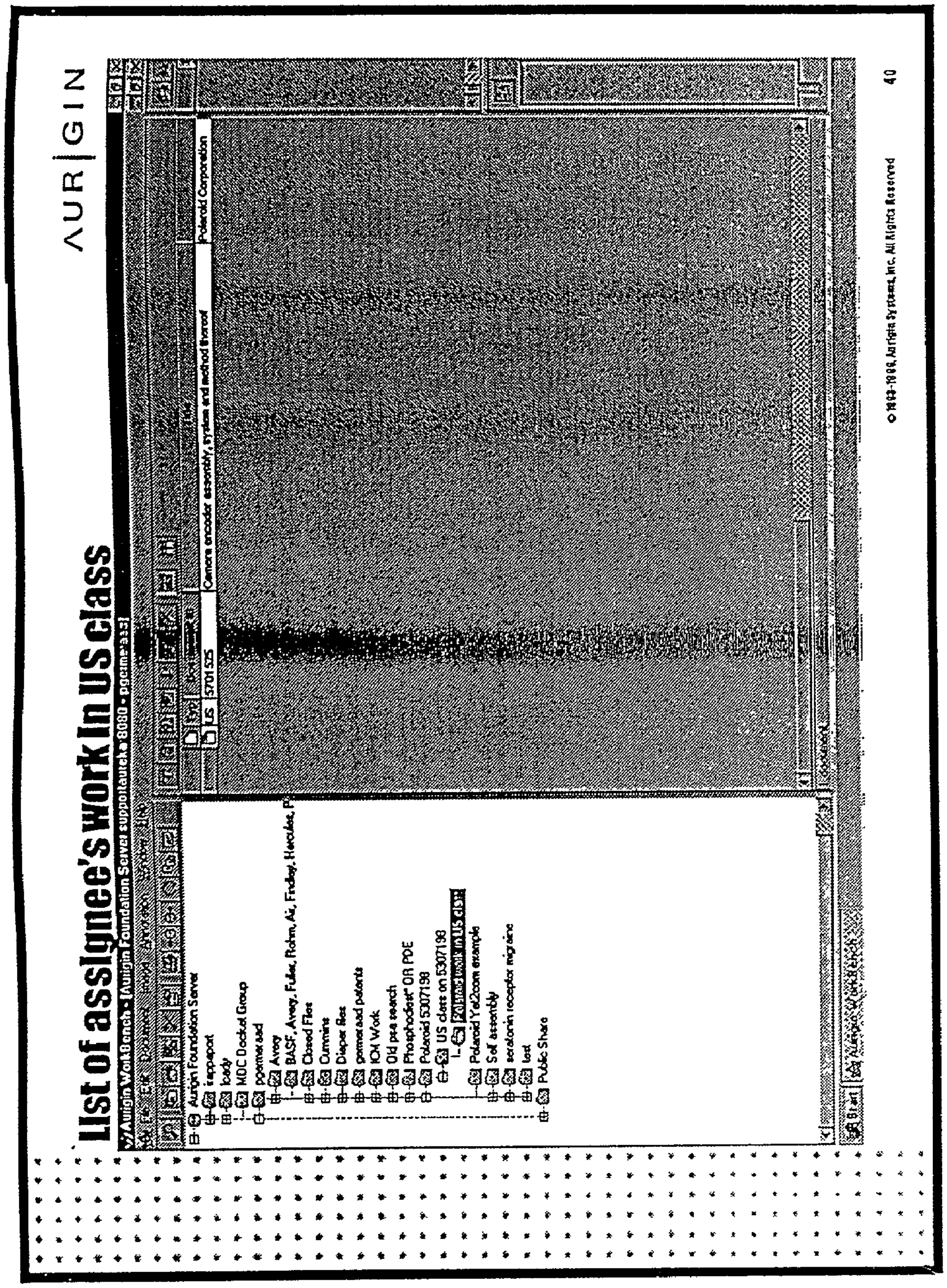
Figure 92:
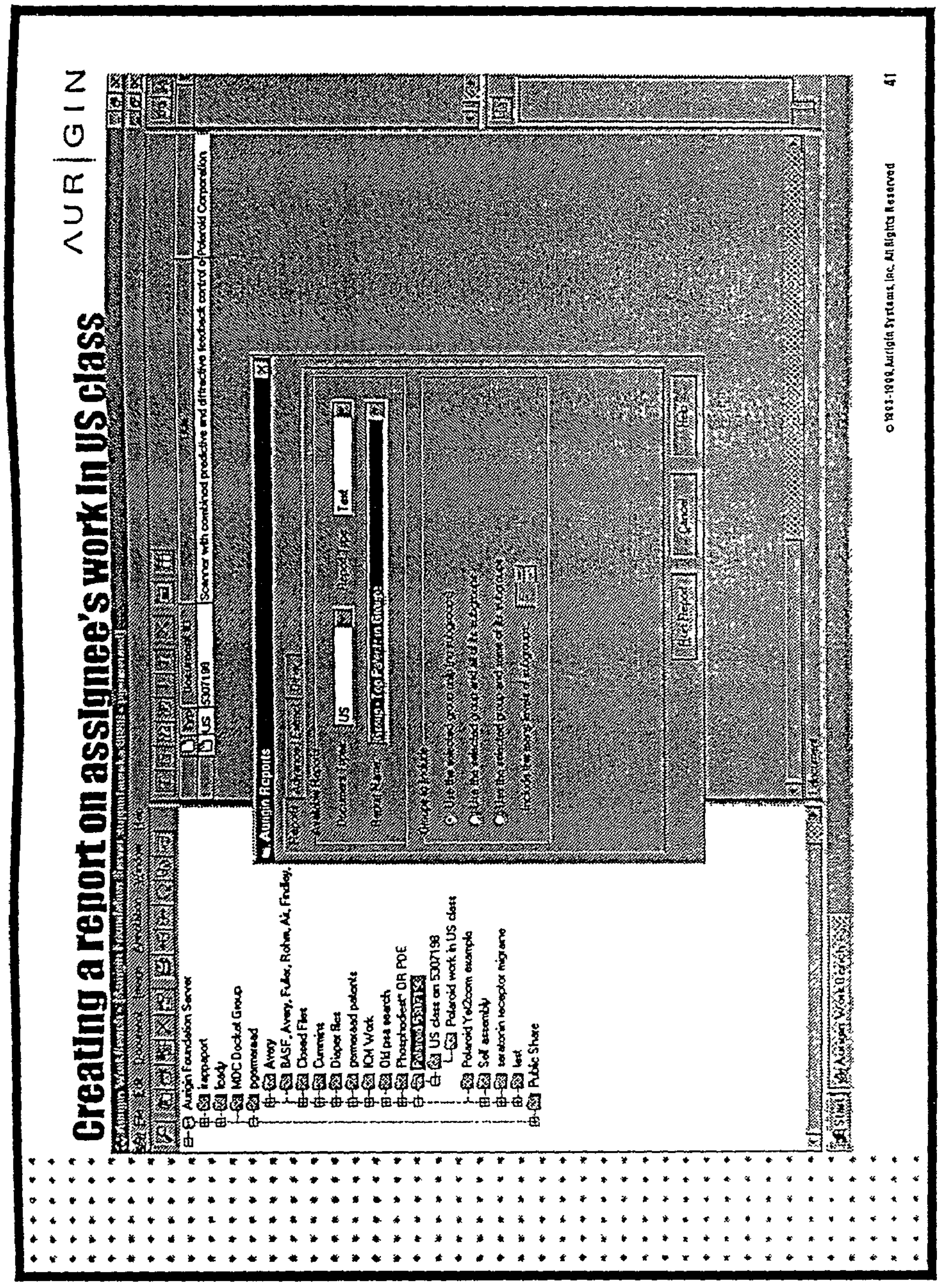
Figure 93:
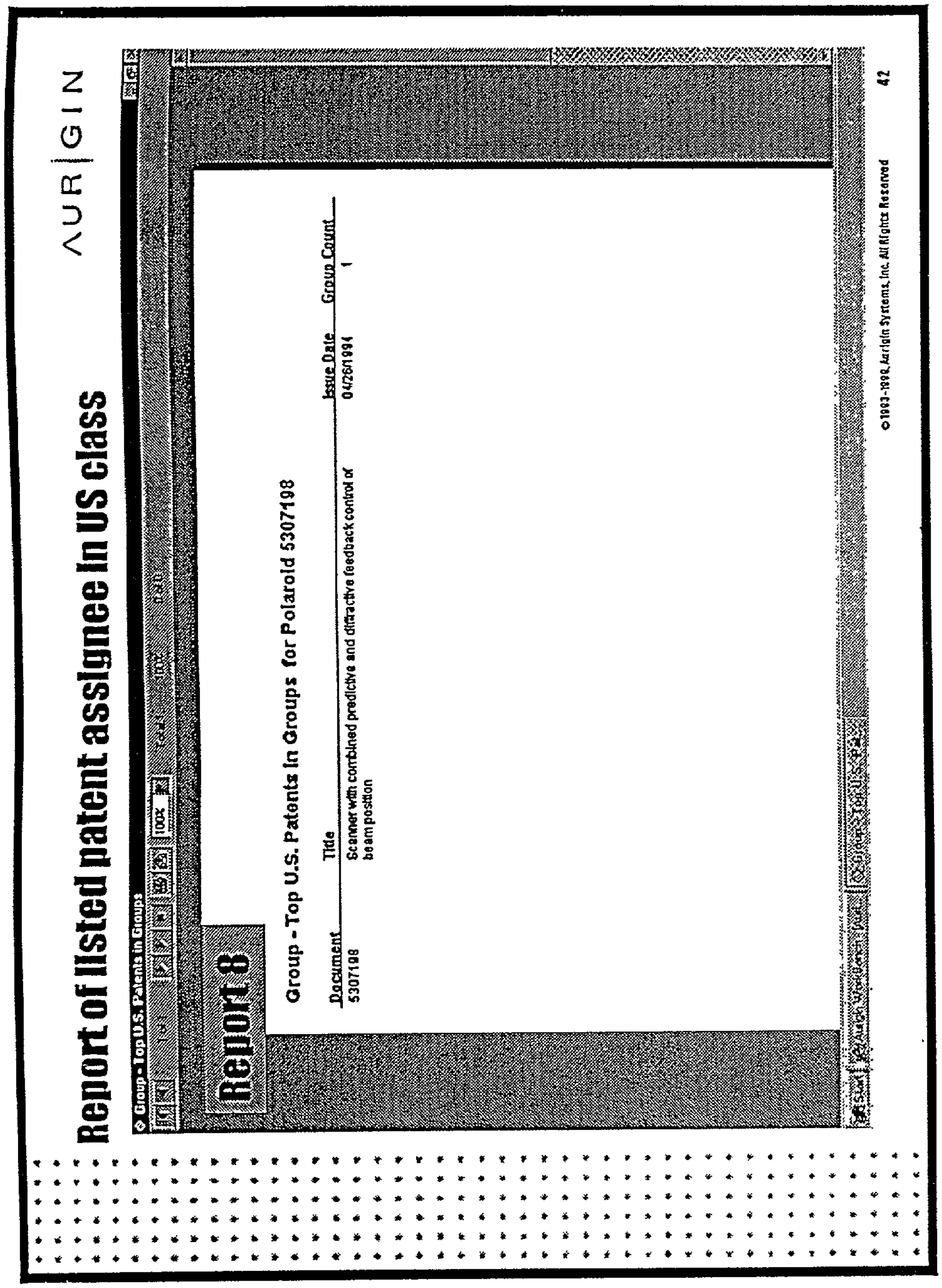
Figure 94:
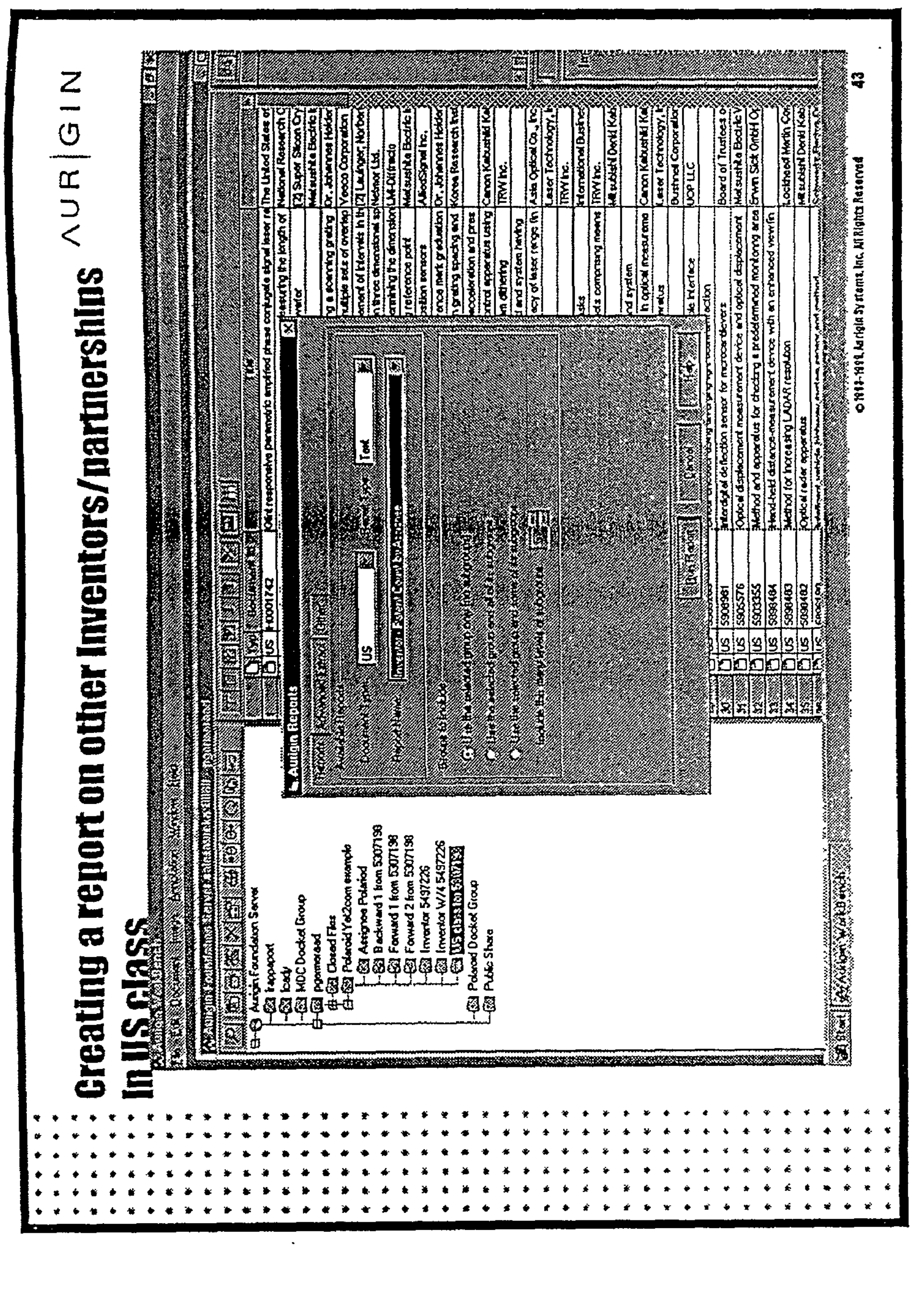
Figure 95:
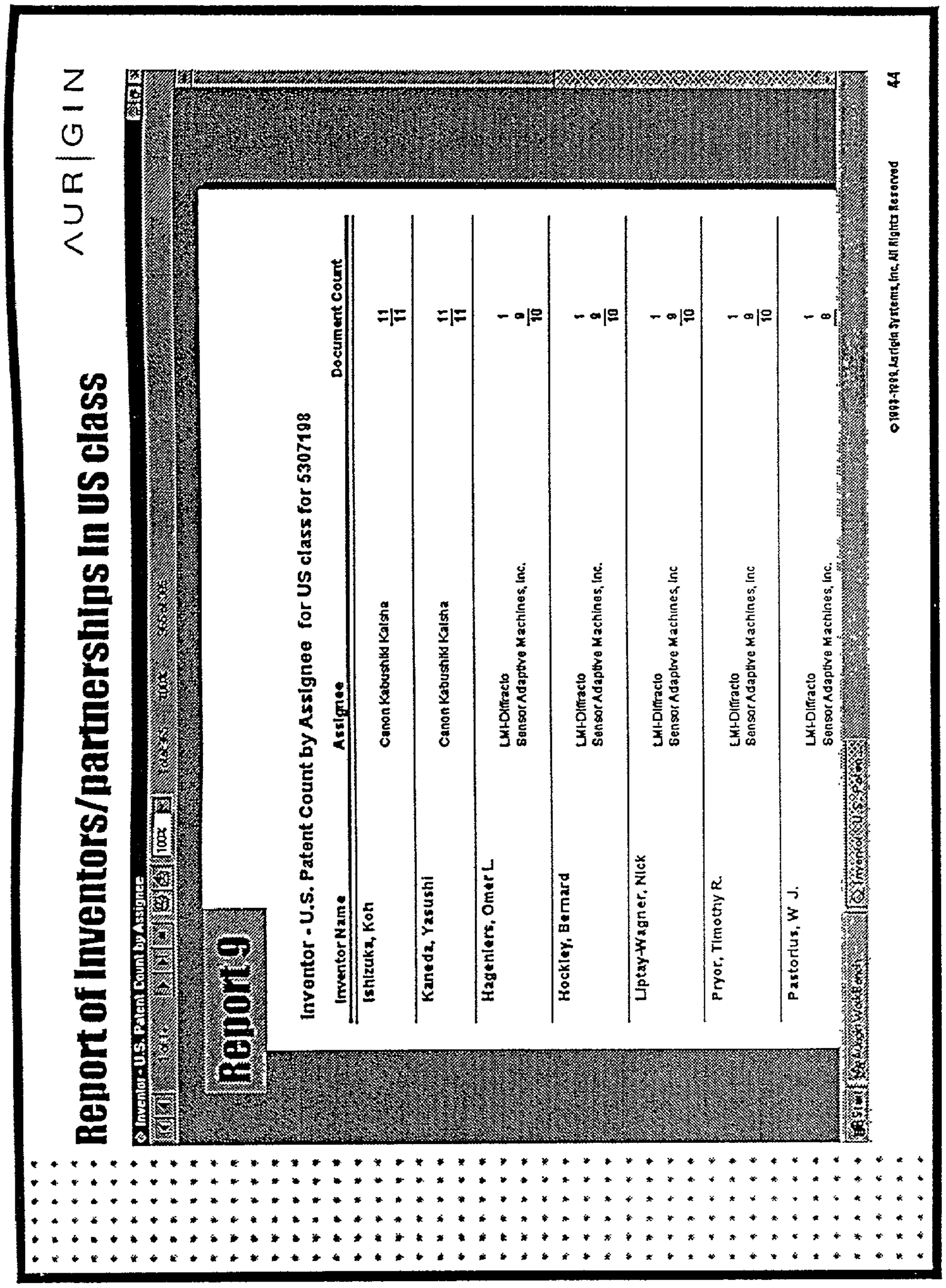
Figure 96:
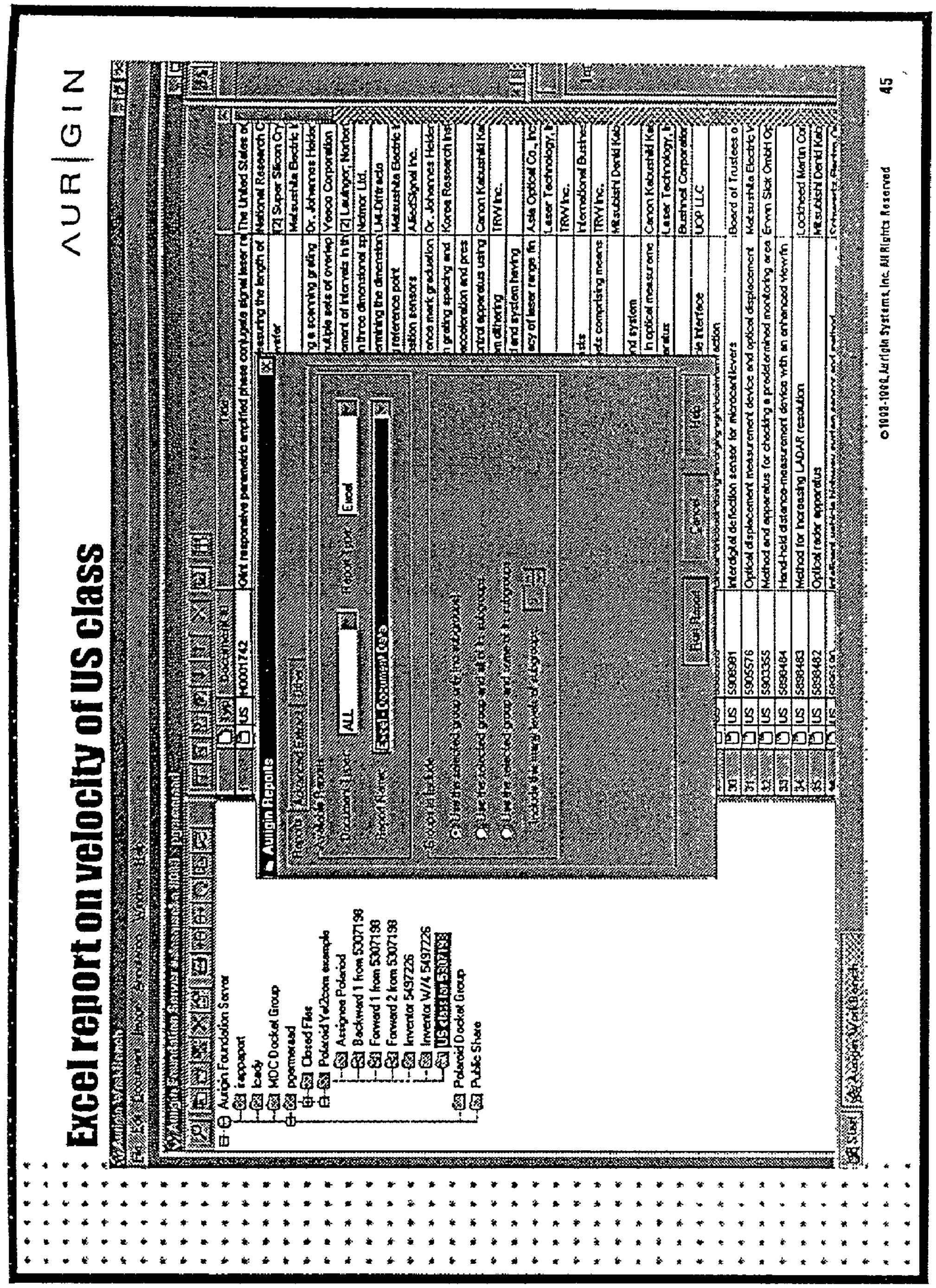

In FIG. 63, a flowchart 6300 begins at step 6302. In step 6302, in an embodiment of the present invention a user performs a search on the group of all U.S. patents. Here, because the user is just pointing at a broad field, the abstract of each U.S. patent is typically the section that is searched, but is not limited to this. The present invention is not limited to doing the search on U.S. patents, but may include European, Japanese (and other available) patents and/or applications. Here, the search performed is typically a boolean and/or natural language search on assignee to produce a group of patents. Control passes to step 6304.

In step 6304, the IPAM server determines the number of inventors for each patent in the resulting group of patents from step 6302. As with assignee information, the IPAM server may store the inventor information of patents in a meta-data field that will also need to be searched to determine the inventor information, but is not limited to this. Flowchart 6300 ends at this point.

XXIV. COMBINATION OF THE TOOLS OR METHODS

It is important to note that most, if not all, of the tools or methods described above may be combined to interactively go back and forth between different tools. The integration of tools discussed herein to facilitate the merger and acquisition process is limitless.

XXV. CONCLUSION

While various application embodiments of the present invention have been described above, it should be understood that they have been presented by way of example only, and not limitation. Thus, the breadth and scope of the present invention should not be limited by any of the above-described exemplary embodiments.

What is claimed is:

1. A computer-implemented method for facilitating a merger and acquisition transaction for an acquiring entity, the merger and acquisition transaction having an identify potential targets stage, an evaluate/analyze stage, a due diligence stage, and a negotiation stage, the computer-implemented method comprising:

receiving identification of a target entity;

receiving a request to invoke a technology classification tool comprising one or more computers;

performing technology classification processing including:

identifying intellectual property assets assigned to the target entity;

determining, by a computer, the number of intellectual property assets assigned to each technology class in a predetermined set of technology classes; and graphically presenting the number of intellectual property assets per technology class;

receiving a request to invoke a patent citation tool comprising one or more computers for a presented technology class; and for each intellectual property asset in the requested technology class, performing patent citation processing in response to the request to invoke the patent citation tool, including:

identifying forward-cite intellectual property assets which cite the intellectual property asset being processed as a reference;

identifying backward-cite intellectual property assets cited by the intellectual property asset being processed;

color-coding the identified forward cite intellectual property assets and the identified backward-cite intellectual property assets according to a freedom-to-practice metric, thereby generating a color-coded citation tree; and graphically presenting the color-coded citation tree; and determining, based on the technology classification processing, whether a strategic fit exists between the acquiring entity and the target entity, wherein criteria for determining a strategic fit includes one or more of:

level of overlap between intellectual property assets assigned to the acquiring entity and the target entity; and number of complimentary intellectual property assets assigned to the target entity.

2. The method of claim 1, further comprising determining which technologies require more research and technologies for which licenses should be sought, wherein said determining is performed by one or more computers.

3. The method of claim 1, wherein graphically presenting the number of intellectual property assets per technology class, during the identify potential targets stage, comprises graphically presenting the intellectual property assets of the target entity per technology class via a radar diagram, wherein said radar diagram provides the acquiring entity with a visual indication of a technology overlap and identifies technology synergy of merger.

4. The method of claim 1, further comprising:

upon receipt of a request, invoking a tool comprising one or more computers, during the evaluate/analyze stage, for generating a Standard Industrial Classification (SIC) based classification, wherein said SIC based classification identifies a scope and magnitude of potential competitors and licensees of patents identified as intellectual property assets assigned to the target entity when performing technology classification processing.

5. The method of claim 1, further comprising:

upon receipt of a request, invoking a tool comprising one or more computers, during the due diligence stage, for generating a citation count report, wherein said report identifies the most valuable patents in a company's portfolio to further investigate in said due diligence stage.

6. The method of claim 1, further comprising:

upon receipt of a request, invoking a tool comprising one or more computers, during the negotiation stage, for generating a patent count/year report, wherein said report identifies companies who have continuously developed technology related to the patents identified as intellectual property assets assigned to the target entity when performing technology classification processing and who have competence to commercialize competing products in a proposed merger.

7. The method of claim 1, further comprising:

upon receipt of a request, invoking a tool comprising one or more computers, during the due diligence stage, for generating a patent application count/year report, wherein said report identifies the intensity of recent development efforts in the target entity.

8. The method of claim 1, further comprising:

upon receipt of a request, invoking a tool comprising one or more computers, during the negotiation stage, for generating a patent aging graph, wherein said graph identifies a number of years until expiration for the intellectual property assets identified as intellectual property assets assigned to the target entity when performing technology classification processing, thereby revealing technologies that are young and have capacity to bring value to a merger between the acquiring entity and the target entity.

9. The method of claim 1, further comprising:

upon receipt of a request, invoking a tool comprising one or more computers, during the due diligence stage, for generating an international class report, wherein said report identifies the international class of intellectual property assets identified as intellectual property assets assigned to the target entity when performing technology classification processing to depict an area of intellectual property concentration.

10. The method of claim 1, further comprising:

upon receipt of a request, invoking a tool comprising one or more computers, during the negotiation stage, for generating an assignee count report, wherein said report provides information relating to where the acquiring entity and the target entity rank in an overall competitive landscape in a primary class area based on number of issued patents and determines whether a proposed merger will broaden a patent portfolio of the target entity or the acquiring entity.

11. The method of claim 1, further comprising:

upon receipt of a request, invoking a tool comprising one or more computers, during the evaluate/analyze stage, for generating an inventor patent count/assignee report, wherein said report identifies possible joint development agreements/ventures whereby said report is used to determine if said possible joint development agreements/ventures pose a risk to a possible merger.

12. The method of claim 1, further comprising:

upon receipt of a request, invoking a tool comprising one or more computers, during the due diligence stage, for generating an inventor patent count graph, wherein said graph an indication of inventors with a majority of inventions in the identified intellectual property assets of the target entity to assist in determining key inventors of said target entity who should be retained by said acquiring entity to continue success obtained by said target entity in an acquisition.

13. The method of claim 1, wherein performing technology classification processing further comprises:

selecting a task related to determining an average number of inventors per patent; and invoking a tool, during the negotiation stage, for generating inventor data, wherein said data is useful for determining whether a corporate culture of the acquiring entity will be a post-merger compatible fit for a corporate culture of the target entity.

14. A computer-implemented system for facilitating merger and acquisition transactions for an acquiring entity, a merger and acquisition transaction having an identify potential targets stage, an evaluate/analyze stage, a due diligence stage, and a negotiation stage, the computer-implemented system comprising:

a plurality of tools, including a first tool comprising one or more computers configured to perform technology classification processing including:

identifying intellectual property assets assigned to an identified target entity;

determining the number of intellectual property assets assigned to each technology class in a predetermined set of technology classes; and graphically presenting the number of intellectual property assets per technology class; and a second tool comprising one or more computers configured to, for each intellectual property asset in the requested technology class, perform patent citation processing including:

identifying forward-cite intellectual property assets which cite the intellectual property asset being processed as a reference;

identifying backward-cite intellectual property assets cited by the intellectual property asset being processed;

color-coding the identified forward cite intellectual property assets and the identified backward-cite intellectual property assets according to a freedom-to-practice metric, thereby generating a color-coded citation tree; and graphically presenting the color-coded citation tree;

an invoking means for invoking a tool from said plurality of tools upon receipt of a request for said tool; and a third tool for determining whether a strategic fit exists between the acquiring entity and the target entity, wherein criteria for determining a strategic fit includes one or more of:

level of overlap between intellectual property assets assigned to the acquiring entity and the target entity; and number of complimentary intellectual property assets assigned to the target entity.

15. The system of claim 14, wherein said plurality of tools comprises at least one of:

a tool for generating a map;

a tool for generating a technology classification;

a tool for generating a Standard Industrial Classification (SIC) based classification;

a tool for generating a diagram;

a tool for generating a report;

a tool for generating a graph;

a tool for generating a class;

a tool for generating a grouping;

a tool for generating an annotation; or a tool for generating inventor data.

16. The system of claim 14, further comprising means for determining which technologies require more research and technologies for which licenses should be sought.

17. The system of claim 14, wherein said invoking means includes presentation means for graphically presenting the intellectual property assets of the target entity per technology class via a radar diagram, wherein said radar diagram provides the acquiring entity with a visual an indication of a technology overlap and identifies technology synergy of merger.

18. The system of claim 14, wherein said invoking means includes means for invoking a Standard Industrial Classification (SIC) based classification tool for generating a SIC based classification, wherein said SIC based classification identifies a scope and magnitude of potential competitors and licensees of patents of a proposed merger.

19. The system of claim 14, wherein said invoking means includes means for invoking a citation count report tool for generating a citation count report, wherein said report identifies the most valuable patents in a company's portfolio to further investigate in said due diligence stage.

20. The system of claim 14, wherein said invoking means includes means for invoking a patent count/year report tool for generating a patent count/year report, wherein said report identifies companies who have continuously developed technology related to patents identified by said first stool and who have competence to commercialize competing products to a proposed merger.

21. The system of claim 14, wherein said invoking means includes means for invoking a patent application count/year report tool for generating a patent application count/year report, wherein said report identifies intensity of recent development efforts in the target entity.

22. The system of claim 14, wherein said invoking means includes means for invoking a patent aging graph tool for generating a patent aging graph, wherein said graph identifies a number of years until patent expiration for the intellectual property assets of the target identity, thereby revealing technologies that are young and have the capacity to bring value to a merger between the acquiring entity and the target entity.

23. The system of claim 14, wherein said invoking means includes means for invoking an international class report tool for generating an international class report, wherein said report identifies international classes of the intellectual property assets identified by the first tool for the target entity to depict an area of intellectual property concentration.

24. The system of claim 14, wherein said invoking means includes means for invoking an assignee patent count tool for generating an assignee patent count report, wherein said report provides information relating to where the acquiring entity and the target entity rank in an overall competitive landscape in a primary class area based on a number of issued patents and determines whether a proposed merger will broaden a patent portfolio of the target entity or the acquiring entity.

25. The system of claim 14, wherein said invoking means includes means for invoking an inventor patent count/assignee report tool for generating an inventor patent count/assignee report, wherein said report identifies possible joint development agreements/ventures whereby said report is used to determine if said possible joint development agreement/ventures pose a risk to a possible merger.

26. The system of claim 14, wherein said invoking means includes means for invoking an inventor patent count graph tool for generating an inventor patent count graph, wherein said graph provides an indication of inventors with the most inventions in the intellectual property assets of the target entity identified by the first tool to assist in determining key inventors of said target entity who should be retained by said acquiring entity to continue success obtained by said target entity in an acquisition.

27. The system of claim 14, wherein said invoking means includes means for invoking an inventor data tool for generating inventor data, wherein said inventor data is useful for determining whether a corporate culture of the acquiring entity will be a post-merger compatible fit for a corporate culture of the target entity.

28. A computer-readable storage medium having stored thereon, computer-executable instructions that if executed by an apparatus, causes the apparatus to facilitate a merger and acquisition transaction for an acquiring entity by a method, the merger and acquisition transaction having an identify potential targets stage, an evaluate/analyze stage, a due diligence stage, and a negotiation stage, the method comprising:

receiving identification of a target entity;

receiving a request to invoke a technology classification tool;

performing technology classification processing including:

identifying intellectual property assets assigned to the target entity;

determining the number of intellectual property assets assigned to each technology class in a predetermined set of technology classes; and graphically presenting the number of intellectual property assets per technology class;

receiving a request to invoke a patent citation tool for a presented technology class; and for each intellectual property asset in the requested technology class, performing patent citation processing in response to the request to invoke the patent citation tool, including:

identifying forward-cite intellectual property assets which cite the intellectual property asset being processed as a reference;

identifying backward-cite intellectual property assets cited by the intellectual property asset being processed;

color-coding the identified forward cite intellectual property assets and the identified backward-cite intellectual property assets according to a freedom-to-practice metric, thereby generating a color-coded citation tree; and graphically presenting the color-coded citation tree; and determining, based on the technology classification processing, whether a strategic fit exists between the acquiring entity and the target entity, wherein criteria for determining a strategic fit includes one or more of:

level of overlap between intellectual property assets assigned to the acquiring entity and the target entity; and number of complimentary intellectual property assets assigned to the target entity.

29. An apparatus comprising:

a processor; and a memory storing control logic, that when executed by the processor, causes the processor to:

receive identification of a target entity;

receive a request to invoke a technology classification tool;

perform technology classification processing including:

identifying intellectual property assets assigned to the target entity;

determining the number of intellectual property assets assigned to each technology class in a predetermined set of technology classes; and graphically presenting the number of intellectual property assets per technology class;

receive a request to invoke a patent citation tool for a presented technology class; and for each intellectual property asset in the requested technology class, perform patent citation processing in response to the request to invoke the patent citation tool, including:

identifying forward-cite intellectual property assets which cite the intellectual property asset being processed as a reference;

identifying backward-cite intellectual property assets cited by the intellectual property asset being processed;

color-coding the identified forward cite intellectual property assets and the identified backward-cite intellectual property assets according to a freedom-to-practice metric, thereby generating; and graphically presenting the color-coded citation tree; and determine, based on the technology classification processing, whether a strategic fit exists between the acquiring entity and the target entity, wherein criteria for determining a strategic fit includes one or more of:

level of overlap between intellectual property assets assigned to the acquiring entity and the target entity; and number of complimentary intellectual property assets assigned to the target entity.

30. A system for facilitating a merger and acquisition transaction for an acquiring entity, the merger and acquisition transaction having an identify potential targets stage, an evaluate/analyze stage, a due diligence stage, and a negotiation stage, the system comprising:

a first receiving means for enabling a computer to receive identification of a target entity;

a second receiving means for enabling a computer to receive a request to invoke a technology classification tool;

classification means for enabling a computer to perform technology classification processing including:

identifying intellectual property assets assigned to the target entity;

determining the number of intellectual property assets assigned to each technology class in a predetermined set of technology classes; and graphically presenting the number of intellectual property assets per technology class;

a third receiving means for enabling a computer to receive a request to invoke a patent citation tool for a presented technology class; and a processing means for enabling a computer to, for each intellectual property asset in the requested technology class, perform patent citation processing in response to the request to invoke the patent citation tool, including:

identifying forward-cite intellectual property assets which cite the intellectual property asset being processed as a reference;

identifying backward-cite intellectual property assets cited by the intellectual property asset being processed;

color-coding the identified forward cite intellectual property assets and the identified backward-cite intellectual property assets according to a freedom-to-practice metric, thereby generating a color-coded citation tree; and graphically presenting the color-coded citation tree; and a determining means for enabling a computer to determine, based on the technology classification processing, whether there is a strategic fit between the acquiring entity and the target entity, wherein criteria for determining a strategic fit includes one or more of:

level of overlap between intellectual property assets assigned to the acquiring entity and the target entity; and number of complimentary intellectual property assets assigned to the target entity.

* * * * *

UNITED STATES PATENT AND TRADEMARK OFFICE

CERTIFICATE OF CORRECTION

PATENT NO. : 7,716,060 B2
APPLICATION NO. : 09/790897
DATED : May 11, 2010
INVENTOR(S) : Paul B. Germeraad It is certified that error appears in the above-identified patent and that said Letters Patent is hereby corrected as shown below:

In column 33, line 12, "with a visual an indication" should be --with a visual indication--.
In column 35, line 23, "forward cite intellectual" should be --forward-cite intellectual--.
In column 36, line 26, "forward cite intellectual" should be --forward-cite intellectual--.
In column 31, line 67, "graph an indication" should be --graph provides an indication--.

Signed and Sealed this

Twenty-eighth Day of September, 2010

David J. Kappos
*Director of the United States Patent and Trademark Office*